US008685875B2

(12) United States Patent
Garcia-Martinez et al.

(10) Patent No.: US 8,685,875 B2
(45) Date of Patent: Apr. 1, 2014

(54) METHODS FOR ENHANCING THE MESOPOROSITY OF ZEOLITE-CONTAINING MATERIALS

(75) Inventors: Javier Garcia-Martinez, Alicante (ES); Lawrence B. Dight, Wall Township, NJ (US); Barry K. Speronello, Montgomery Township, NJ (US)

(73) Assignee: Rive Technology, Inc., Boston, MA (US)

( * ) Notice: Subject to any disclaimer, the term of this patent is extended or adjusted under 35 U.S.C. 154(b) by 372 days.

(21) Appl. No.: 12/907,643

(22) Filed: Oct. 19, 2010

(65) Prior Publication Data

US 2011/0118107 A1    May 19, 2011

Related U.S. Application Data

(60) Provisional application No. 61/253,281, filed on Oct. 20, 2009.

(51) Int. Cl.
*B01J 29/06* (2006.01)
*C01B 39/00* (2006.01)

(52) U.S. Cl.
USPC .......... 502/60; 502/63; 502/64; 502/71; 502/77; 502/78; 502/79; 423/700; 423/716

(58) Field of Classification Search
USPC ........ 502/60, 63, 64, 71, 77, 78, 79; 423/700, 423/716
See application file for complete search history.

(56) References Cited

U.S. PATENT DOCUMENTS

| | | | |
|---|---|---|---|
| 3,709,853 A | 1/1973 | Karapinka | |
| 3,864,280 A | 2/1975 | Schneider | |
| 4,016,218 A | 4/1977 | Haag et al. | |
| 4,088,671 A | 5/1978 | Kobylinski | |
| 4,196,182 A | 4/1980 | Willermet et al. | |
| 4,205,055 A | 5/1980 | Maire et al. | |
| 4,263,268 A | 4/1981 | Knox et al. | |
| 4,318,824 A | 3/1982 | Turner | |
| 4,439,349 A | 3/1984 | Everett et al. | |
| 4,564,207 A | 1/1986 | Russ et al. | |
| 4,609,972 A | 9/1986 | Edeling et al. | |
| 4,637,623 A | 1/1987 | Bubik | |
| 4,689,314 A | 8/1987 | Martinez et al. | |
| 4,704,375 A | 11/1987 | Martinez et al. | |
| 4,761,272 A | 8/1988 | Hucke | |

(Continued)

FOREIGN PATENT DOCUMENTS

| | | |
|---|---|---|
| JP | 2004143026 | 5/2004 |
| WO | 2001017901 | 3/2001 |

(Continued)

OTHER PUBLICATIONS

Al-Khattaf, S. et al., The Role of Diffusion in Alkyl-Benzenes Catalytic Cracking, Appl. Catal. A: Gen. 226; 139-153, (2002).

(Continued)

*Primary Examiner* — Elizabeth Wood
(74) *Attorney, Agent, or Firm* — Hovey Williams LLP

(57) ABSTRACT

Methods for enhancing the mesoporosity of a zeolite-containing material. Such methods may comprise contacting a composite shaped article containing at least one zeolite and at least one non-zeolitic material with at least one pH controlling agent and at least one surfactant. Such methods may be performed under conditions sufficient to increase the pore volume of at least one 10 angstrom subset of mesoporosity.

27 Claims, 26 Drawing Sheets

(56) References Cited

U.S. PATENT DOCUMENTS

| | | |
|---|---|---|
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk et al. |
| 2005/0214539 A1 | 9/2005 | Ying et al. |
| 2006/0078487 A1 | 4/2006 | Endo et al. |
| 2007/0244347 A1 | 10/2007 | Ying et al. |

(56) References Cited

U.S. PATENT DOCUMENTS

| | | |
|---|---|---|
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2011/0171121 A1 | 7/2011 | Senderov |

FOREIGN PATENT DOCUMENTS

| | | |
|---|---|---|
| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Bagri, R. et al.; Catalytic Pyrolysis of Polyethylene; Anal. Pyrolysis, 63:29-41 (2002).

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

CSIC NM014-Method of Preparation of Mesoporous Alumina with High Thermal Stability, http://www.serina.es/escaparate/verproducto.cgi?idproducto=4980&refcompra=NULO, downloaded May 9, 2007, 2 pages.

Davis, M.E., Ordered Porous Materials for Emerging Applications, Nature, 417:813-821 (2002).

Davis, M.E., Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical $CO_2$, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

(56) References Cited

OTHER PUBLICATIONS

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of The Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434, 2001.

Tao et al., ZSM-5 Monolith of Uniform Mesoporous Channels, Material Sciences, Chiba University, J. AM. Chem. Soc., Japan 2003, pp. 6044-6045.

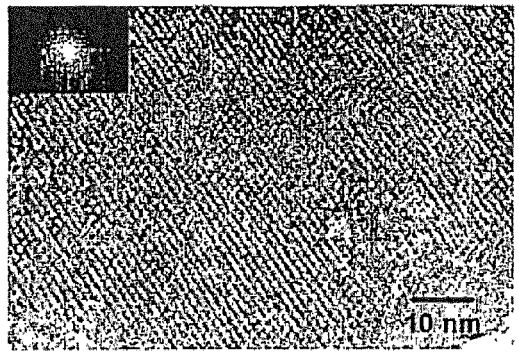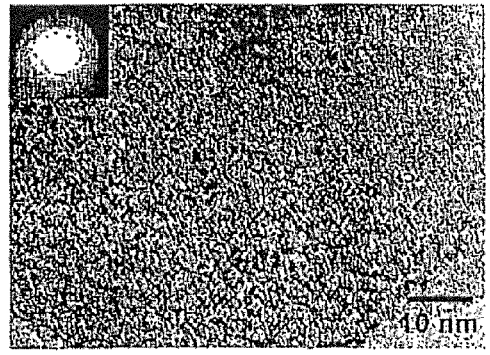
FIG. 10a  FIG. 10b
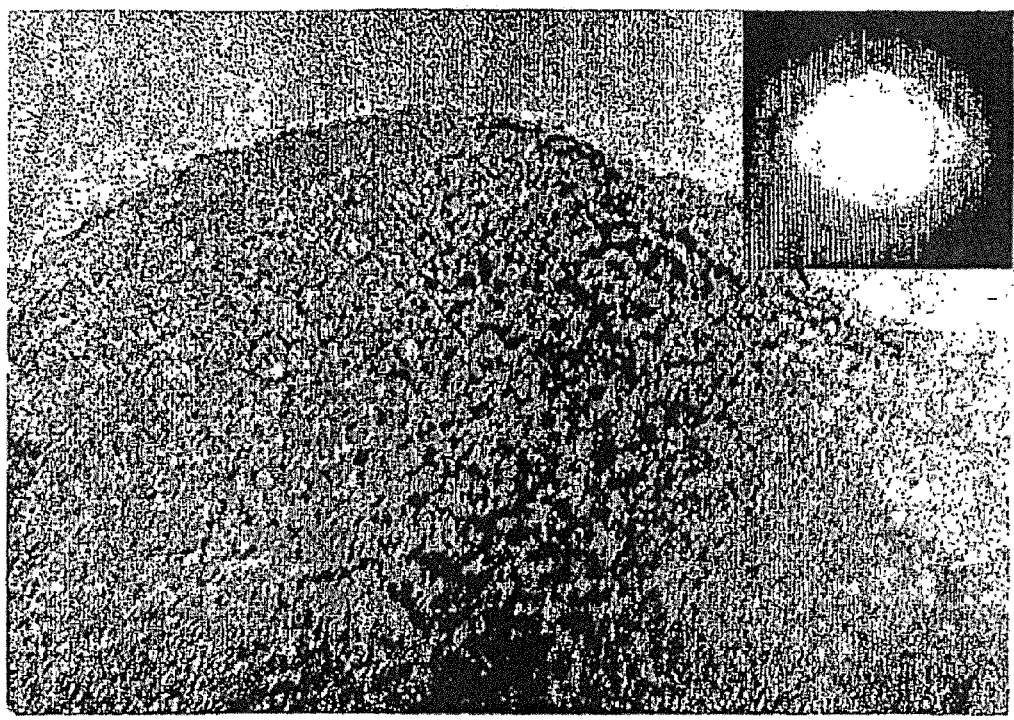
FIG. 11

METHODS FOR ENHANCING THE MESOPOROSITY OF ZEOLITE-CONTAINING MATERIALS

RELATED APPLICATIONS

This application claims the priority benefit under 35 U.S.C. §119(e) of U.S. Provisional Patent Application Ser. No. 61/253,281 entitled "RIVING OF ZEOLITE-CONTAINING CATALYST," filed Oct. 20, 2009, the entire disclosure of which is incorporated herein by reference.

BACKGROUND

1. Field of the Invention

Various embodiments of the present invention relate generally to enhancing the mesoporosity of a zeolite-containing material. More particularly, various embodiments relate to methods for riving a zeolite-containing catalyst.

2. Description of the Related Art

Zeolites and related crystalline molecular sieves are widely used due to their regular microporous structure, strong acidity, and ion-exchange capability. However, their applications are limited by their small pore openings, which are typically narrower than 1 nm. The discovery of MCM-41, with tuneable mesopores of 2 to 10 nm, overcomes some of the limitations associated with zeolites. However, unlike zeolites, MCM-41-type materials are not crystalline, and do not possess strong acidity, high hydrothermal stability, and high ion-exchange capability.

Over the past 10 years, a great deal of effort has been devoted to understanding and improving the structural characteristics of MCM-41. It was found that the properties of Al-MCM-41 could be improved through (1) surface silylation, (2) Al grafting on the pore walls to increase acidity, (3) salt addition during synthesis to facilitate the condensation of aluminosilicate groups, (4) use of organics typically employed in zeolite synthesis to transform partially the MCM-41 wall to zeolite-like structures, (5) preparation of zeolite/MCM-41 composites, (6) substitution of cationic surfactants by tri-block copolymers and Gemini amine surfactants to thicken the walls, and (7) assembly of zeolite nanocrystals into an ordered mesoporous structure. In the latter approach, the first steam-stable hexagonal aluminosilicate (named MSU-S) was prepared using zeolite Y nanoclusters as building blocks. Pentasil zeolite nanoclusters were also used to produce MSU-S$_{(MFI)}$ and MSU-S$_{(BEA)}$.

FIG. 1A is a schematic illustration of a prior art amorphous mesoporous material 100. As shown in FIG. 1A, zeolite nuclei 105a, 105b, 105c were aggregated around surfactant micelles under controlled conditions to form a solid. Thereafter, the aggregated nuclei 105a, 105b, 105c were washed in water and dried and the surfactant was extracted to provide a desired mesopore-sized pore volume 110, forming amorphous mesoporous zeolite nuclei material 100. Each of the zeolite nuclei, for example, 105a, 105b, 105c, is a nanosized crystal. When they are aggregated, the material 100 is polycrystalline because the nuclei material is lacking the long-range regular lattice structure of the crystalline state (i.e., the aggregated nuclei are not fully crystalline or truly crystalline).

Some strategies have managed to improve appreciably the acidic properties of Al-MCM-41 materials. However, due to the lack of long-range crystallinity in these materials, their acidity is not as strong as those exhibited by zeolites. For example, semicrystalline mesoporous materials, such as nanocrystalline aluminosilicate PNAs and Al-MSU-S$_{(MFI)}$, being even more active than conventional Al-MCM-41, showed significantly lower activity than H-ZSM-5 for cumene cracking; the catalyst activity for this reaction has usually been correlated to the Bronsted acid strength of the catalyst.

Previous attempts to prepare mesostructured zeolitic materials have been ineffective, resulting in separate zeolitic and amorphous mesoporous phases. Moreover, some authors have pointed out the difficulty of synthesizing thin-walled mesoporous materials, such as MCM-41, with zeolitic structure, due to the surface tension associated with the high curvature of the mesostructure.

SUMMARY OF THE INVENTION

One embodiment of the invention concerns a method of preparing a shaped zeolitic material with enhanced mesoporosity. The method of this embodiment comprises: (a) forming a composite shaped article comprising at least one zeolite and at least one non-zeolitic material; and (b) contacting the composite shaped article with at least one pH controlling agent and at least one surfactant under conditions sufficient to increase the pore volume of at least one 10 angstrom subset of mesoporosity in the composite shaped article, thereby forming the shaped zeolitic material with enhanced mesoporosity.

Figure 7:
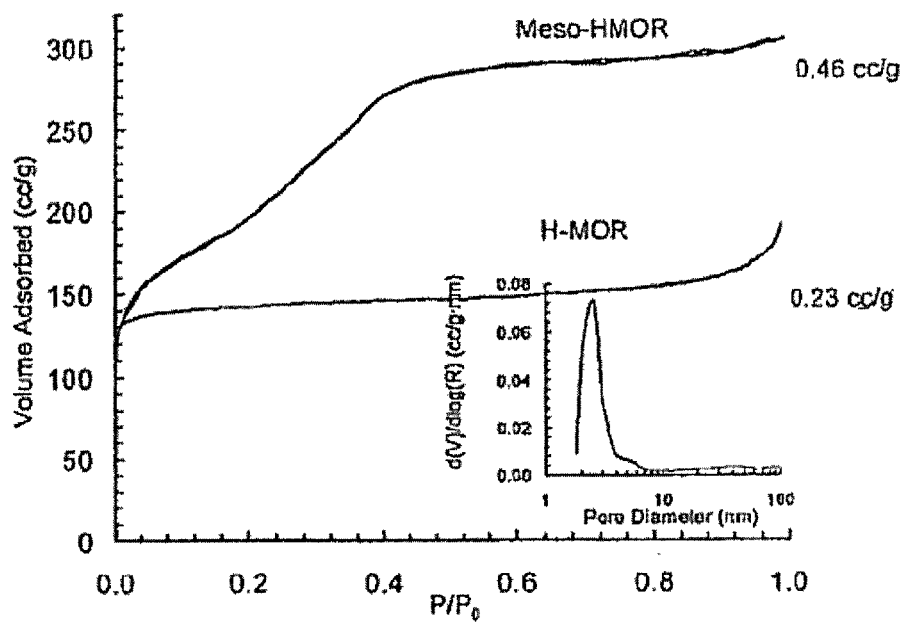
Figure 8:
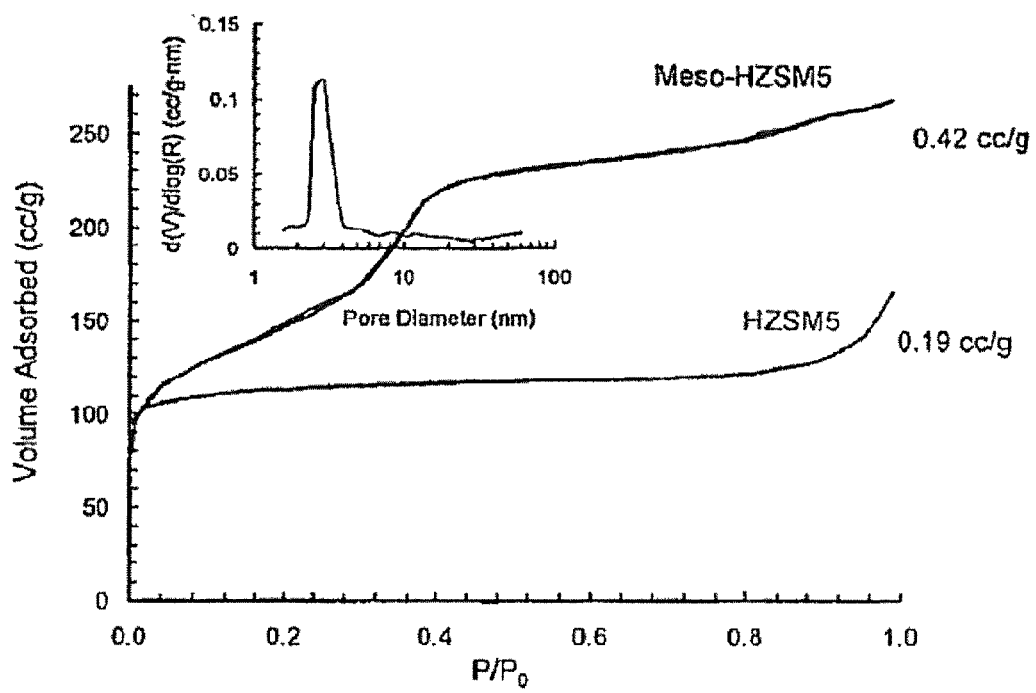
Figure 9:
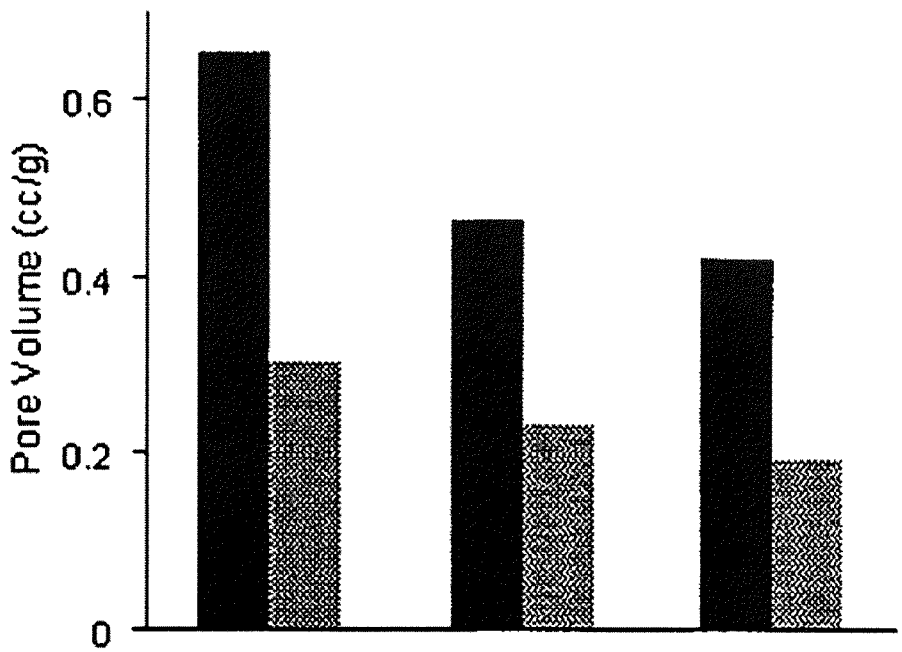
Figure 12:
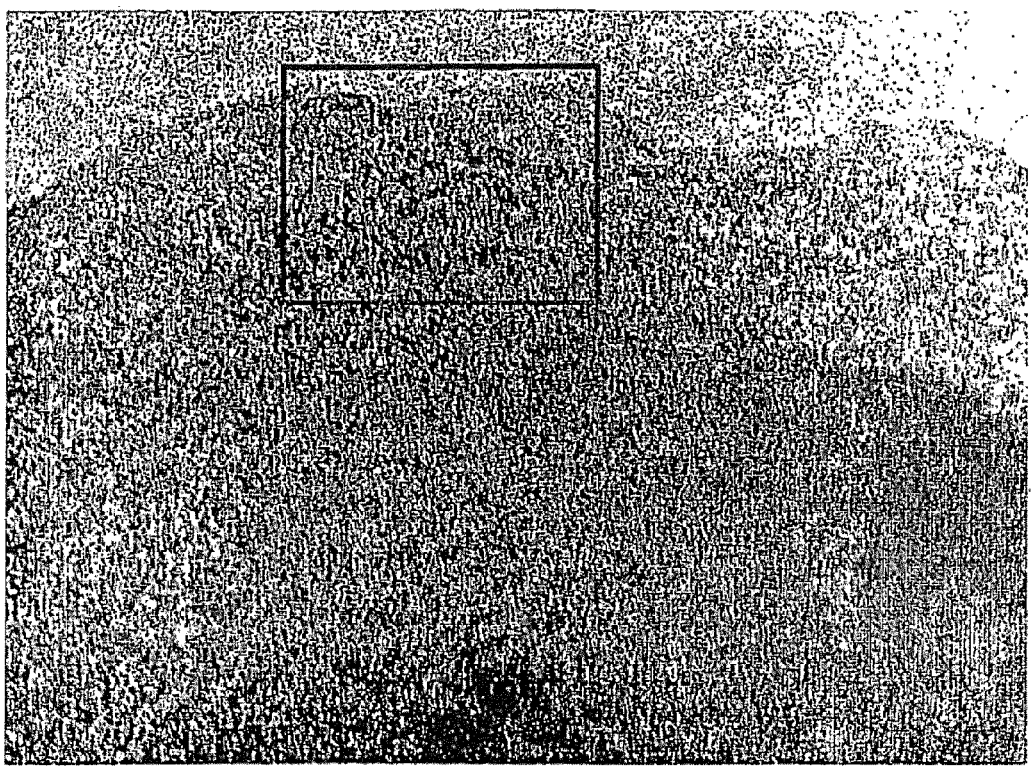
Figure 13:
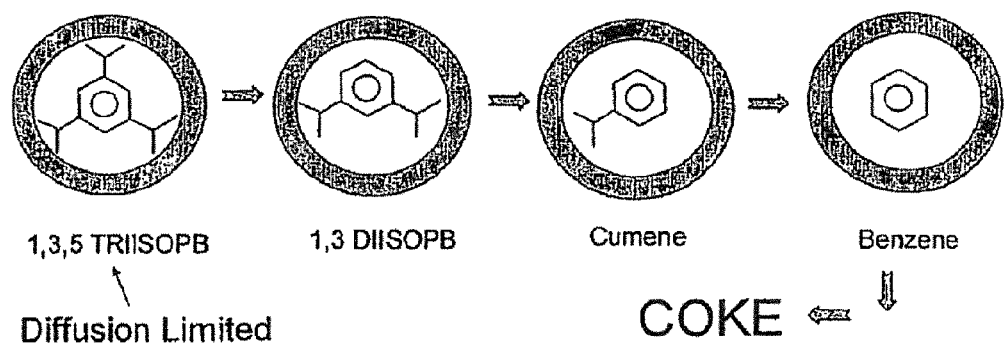
Figure 14:
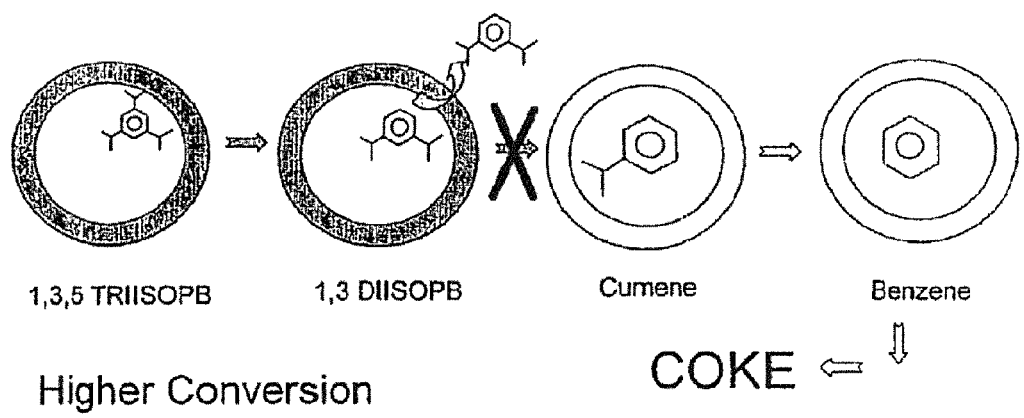
Figure 15:
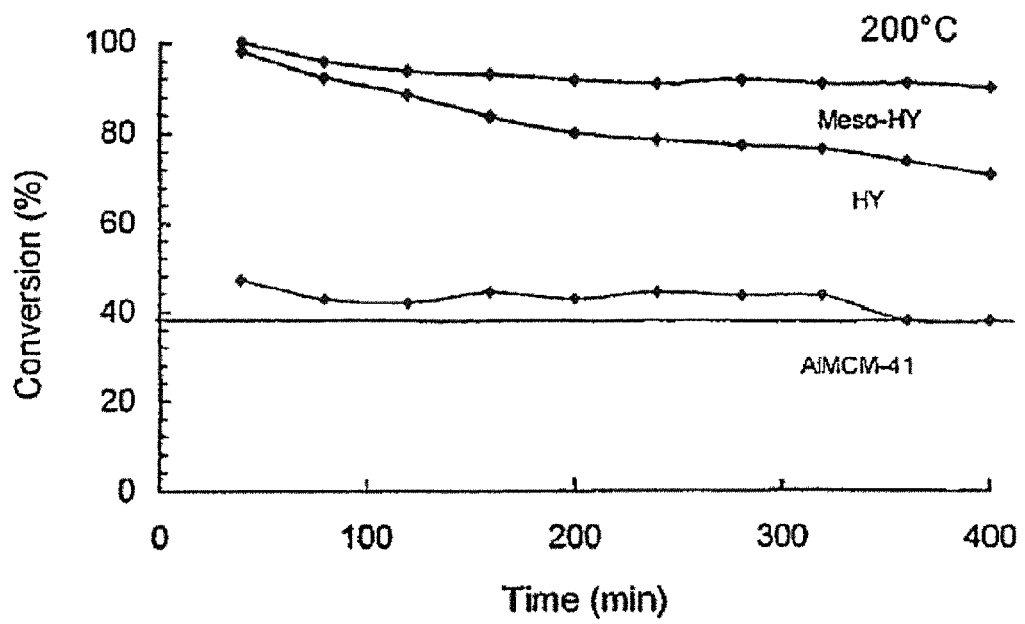
Figure 16:
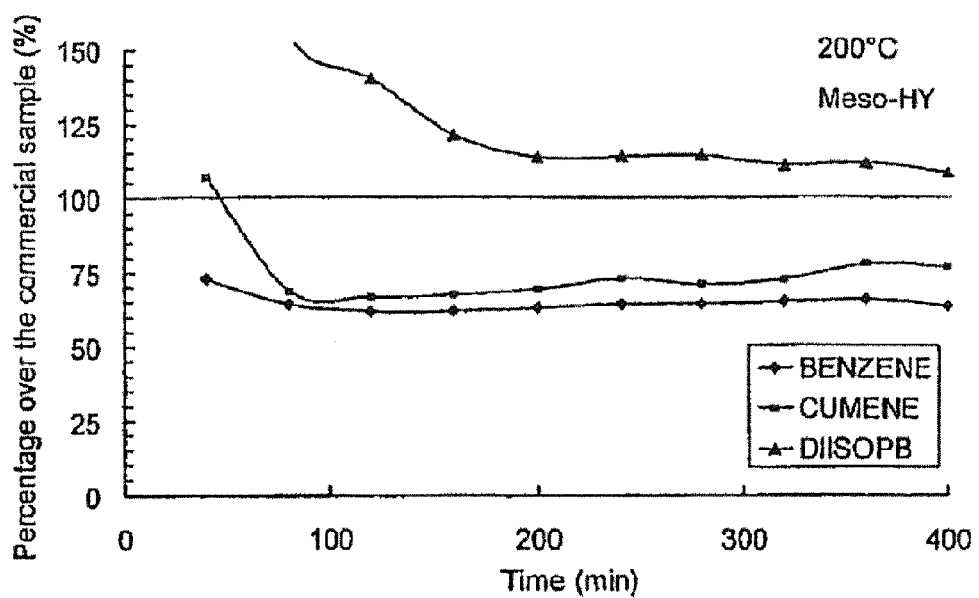
Figure 17:
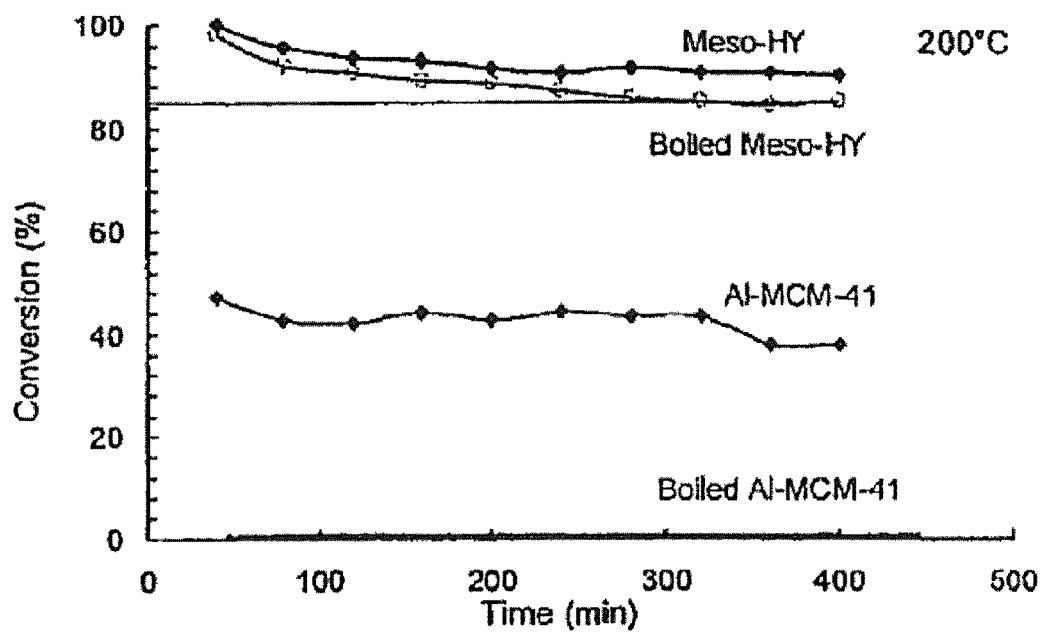
Figure 18:
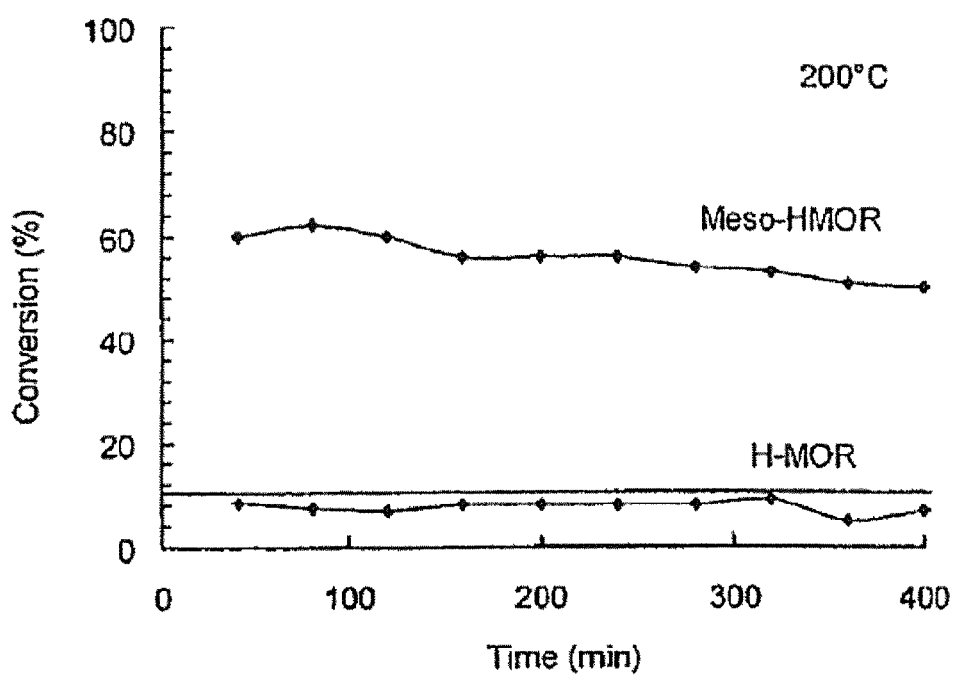
Figure 19:
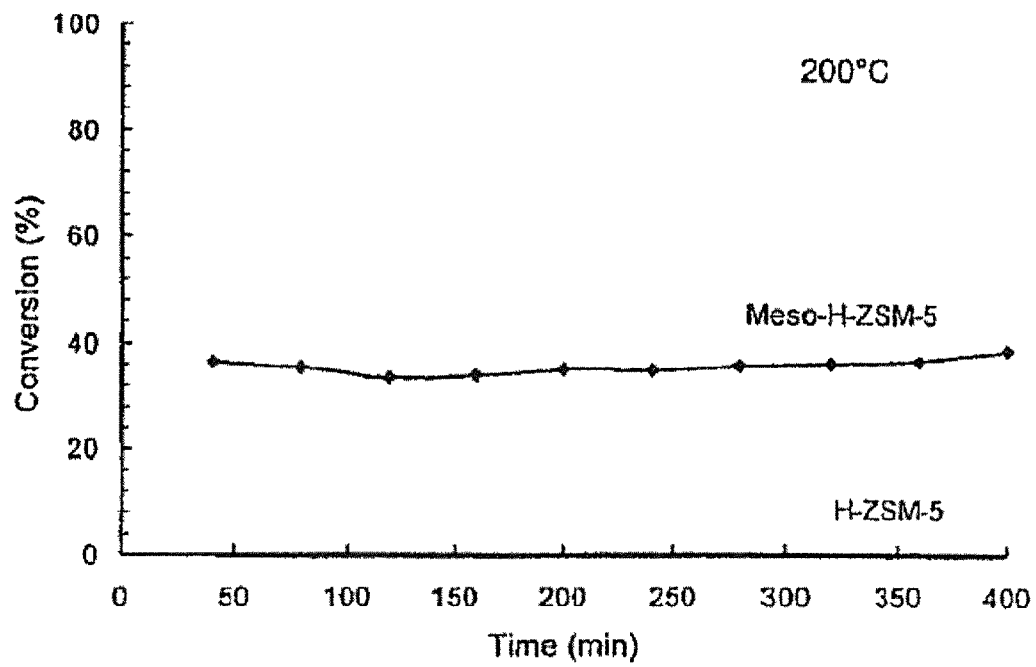
Figure 20A:
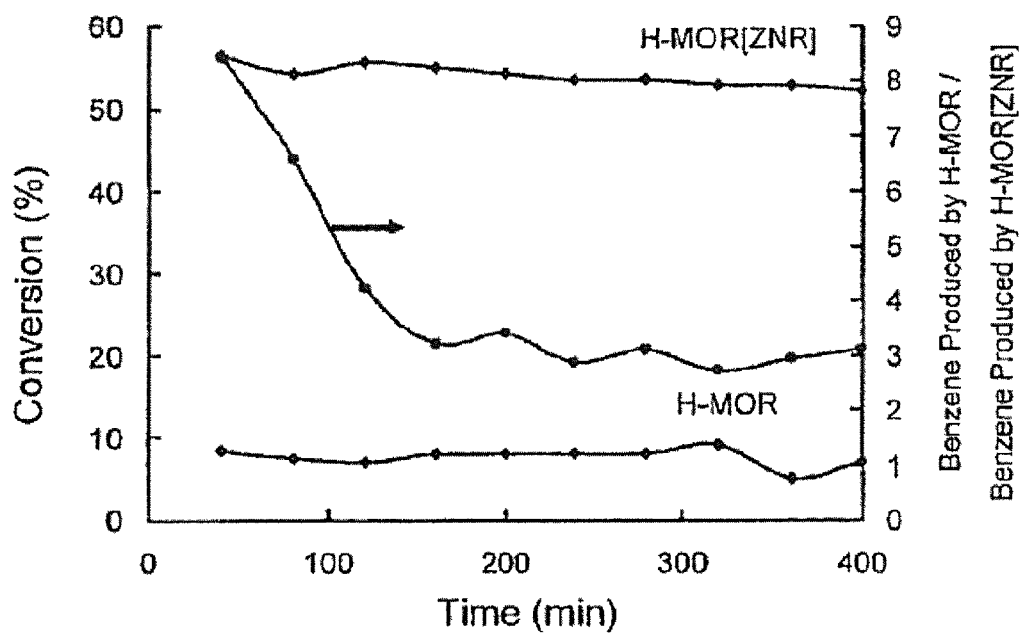
Figure 20B:
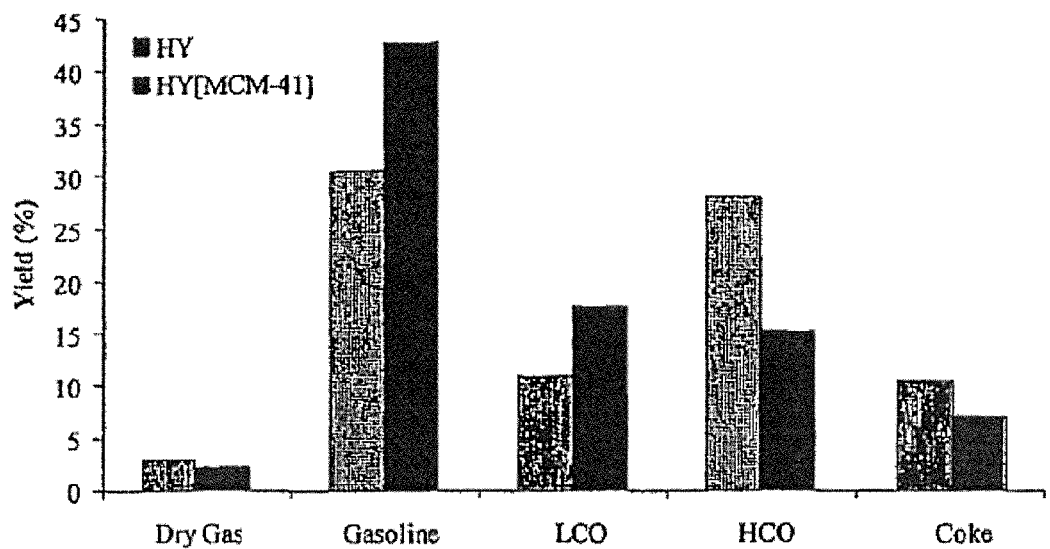
Figure 20C:
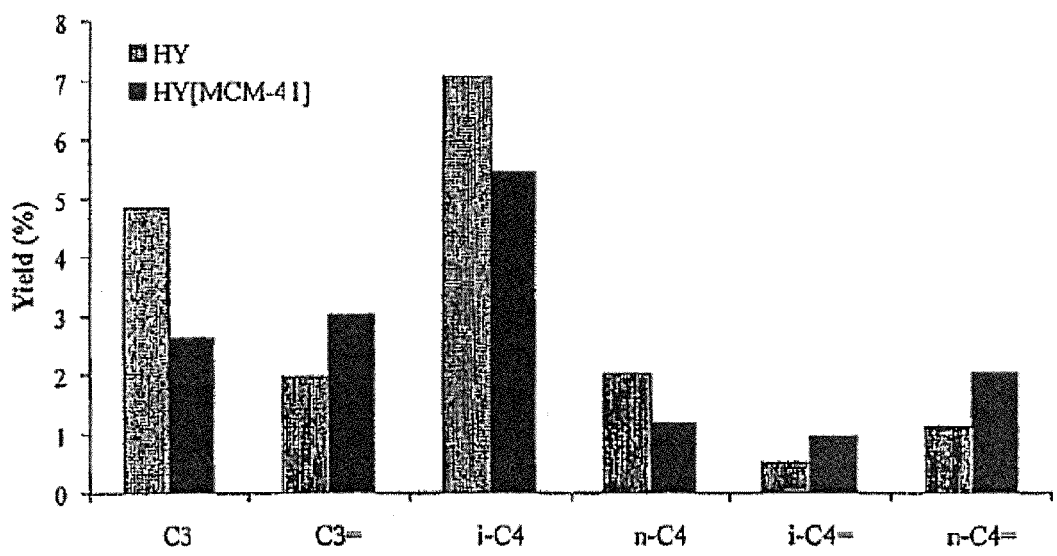
Figure 21:
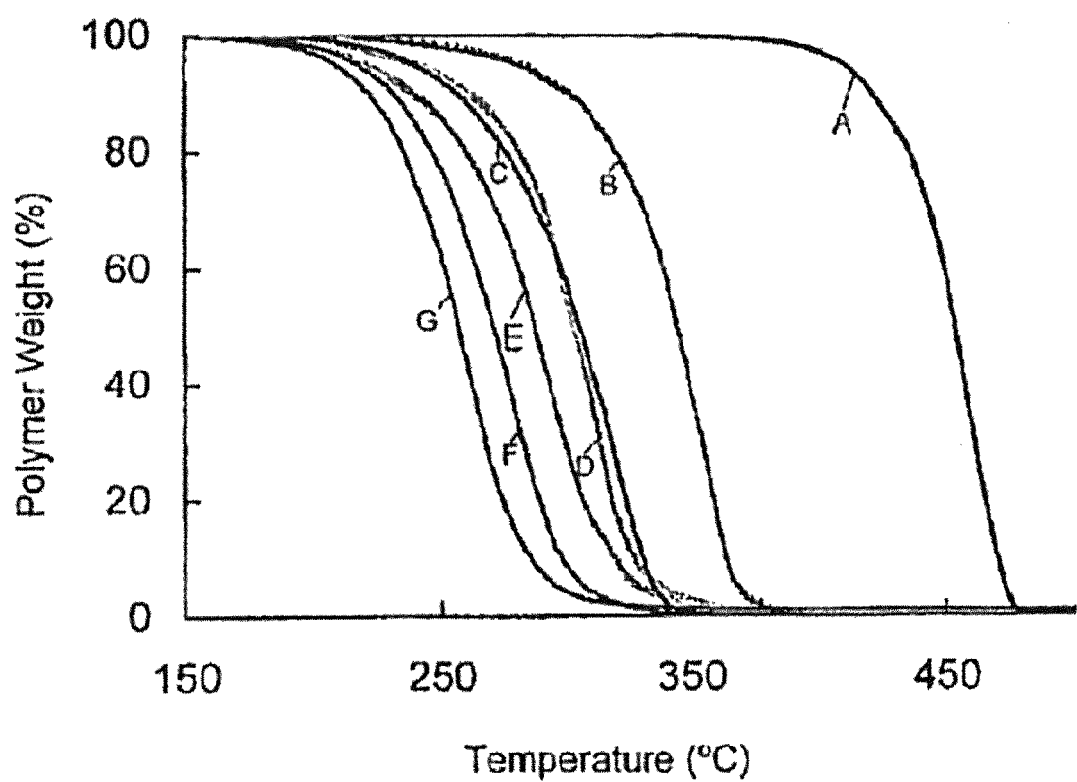
Figure 22:
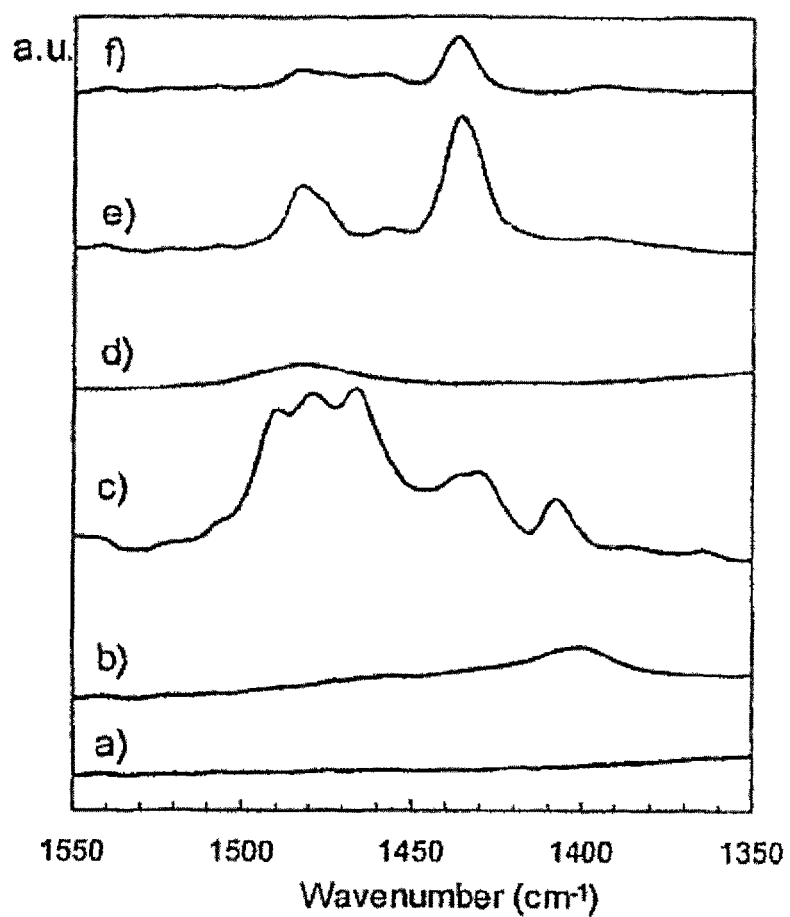
Figure 23:
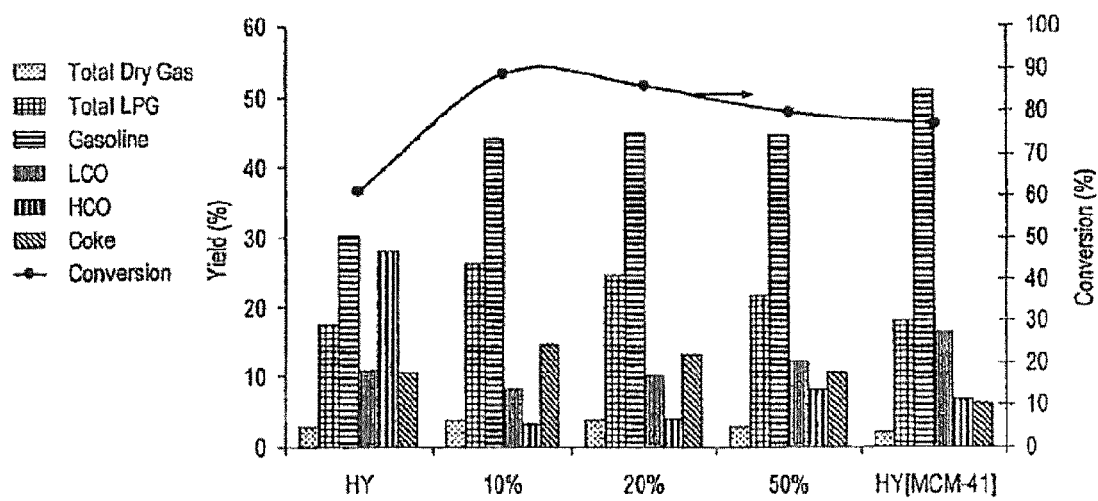
Figure 24:
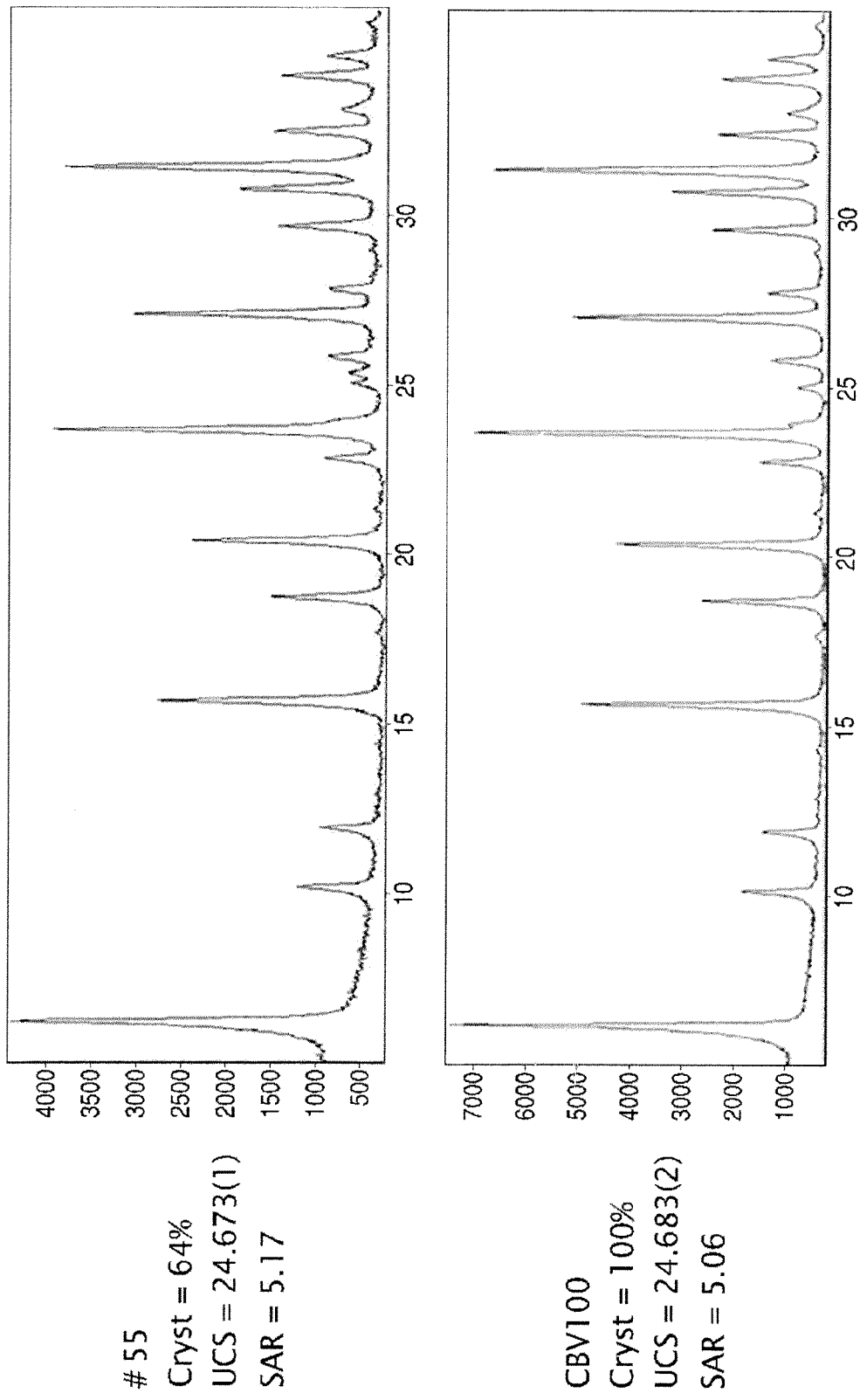
Figure 25:
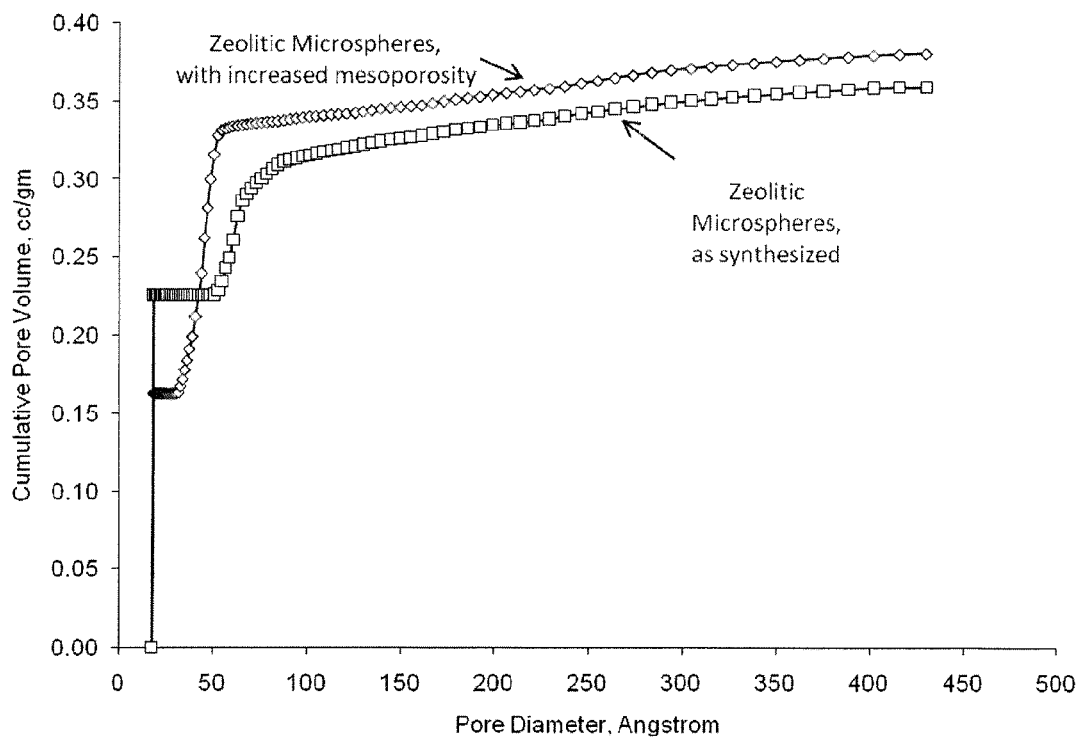
Figure 26:
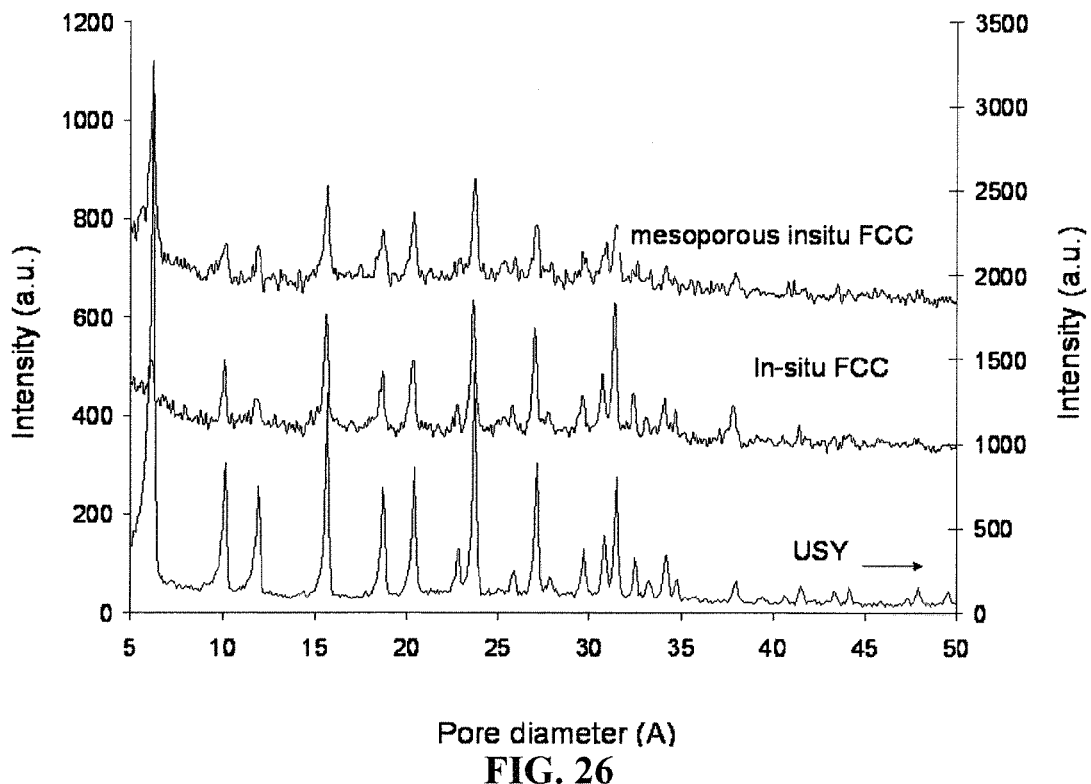
Figure 27A:
Figure 27B:
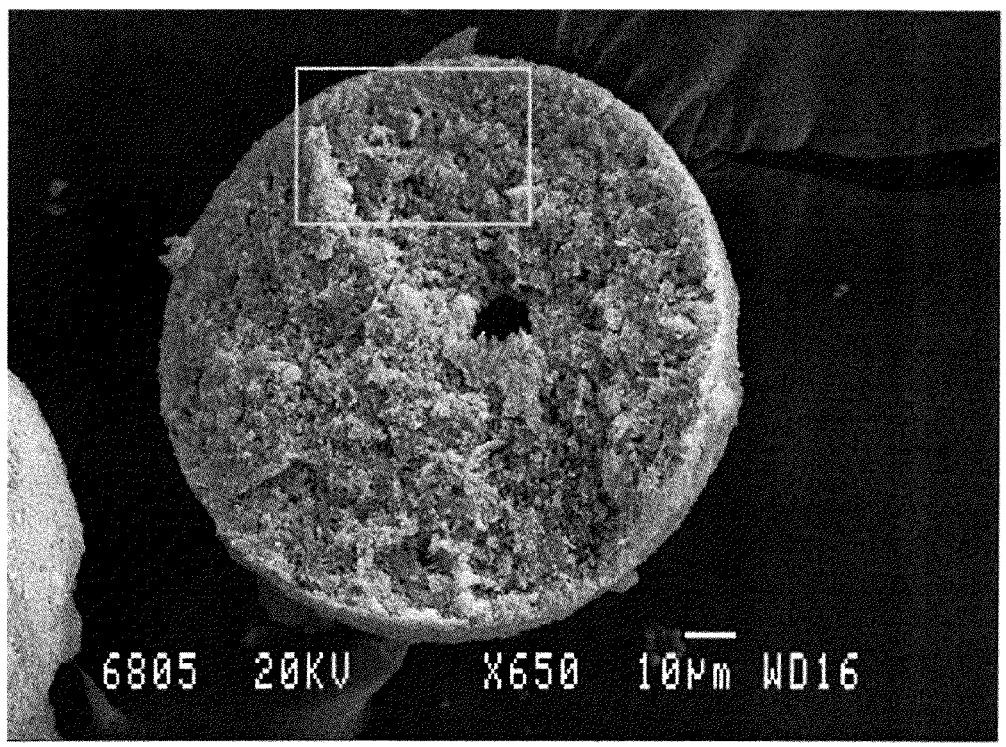
Figure 27C:
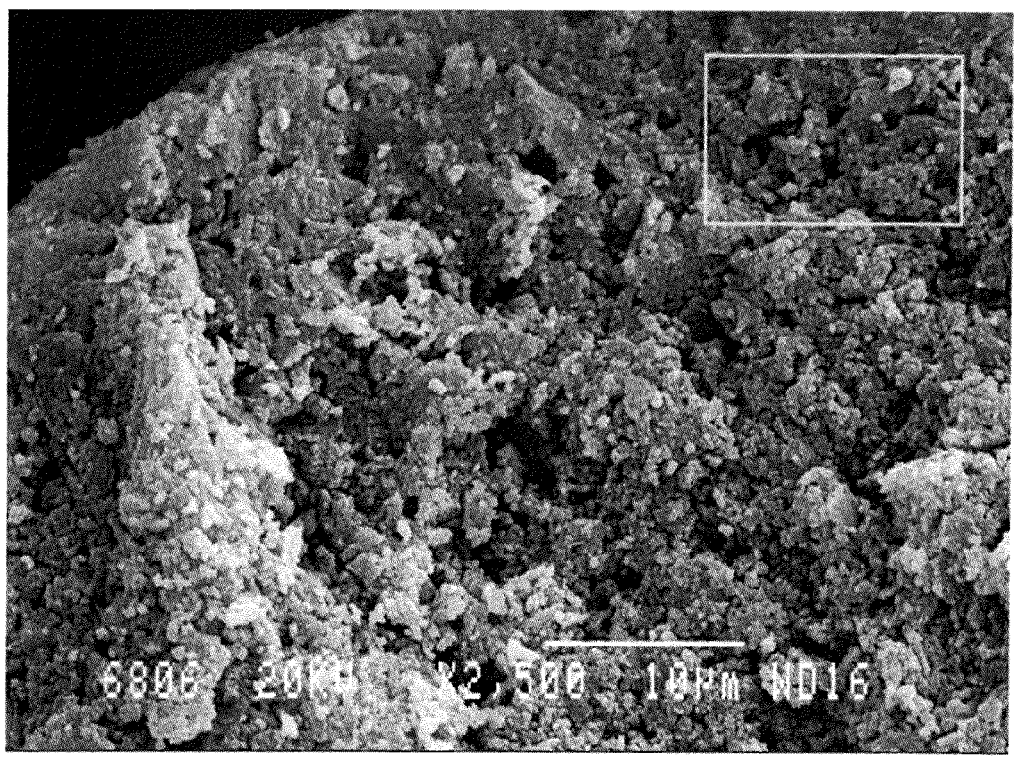
Figure 27D:
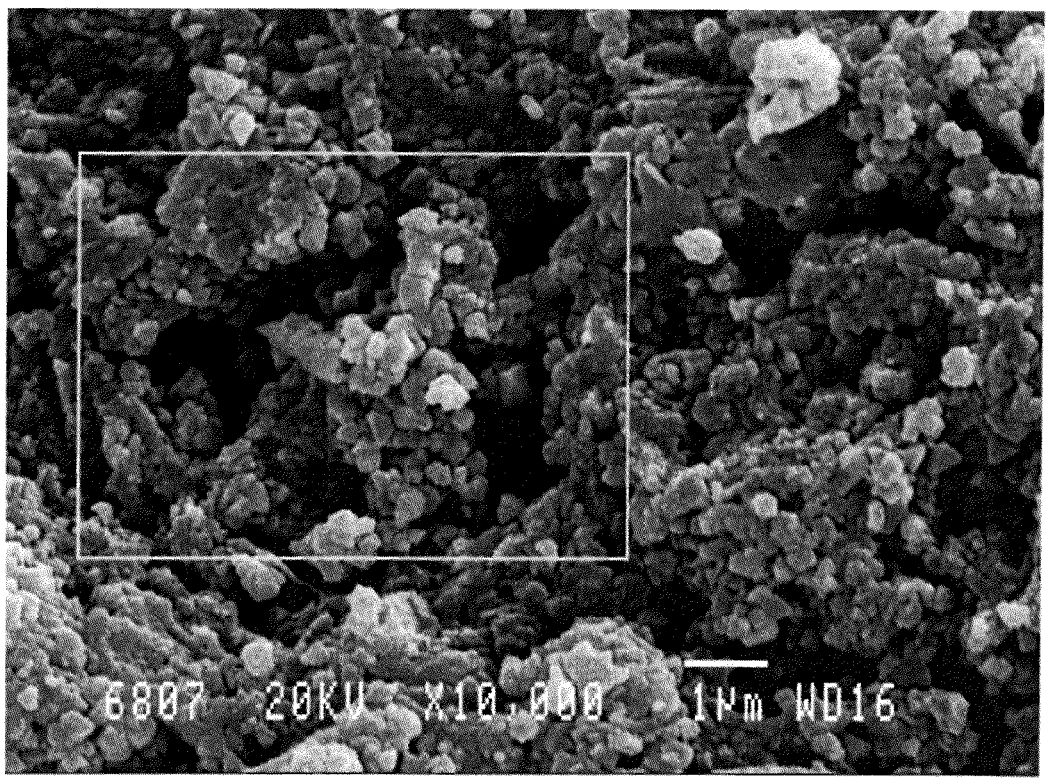
Figure 27E:
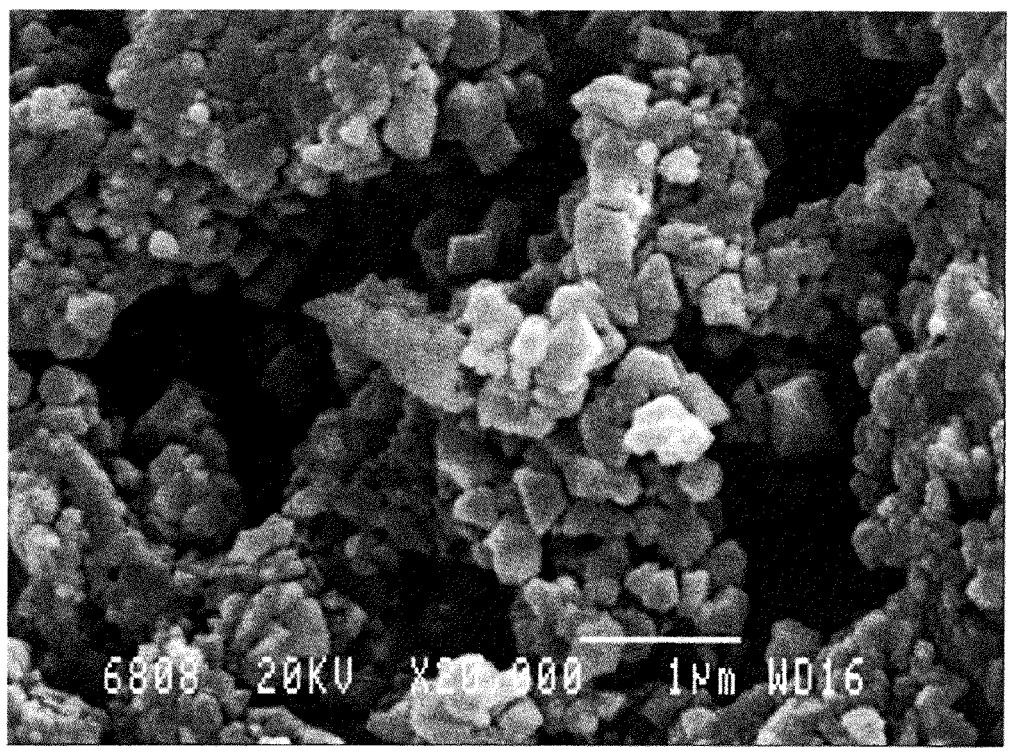
Figure 28:
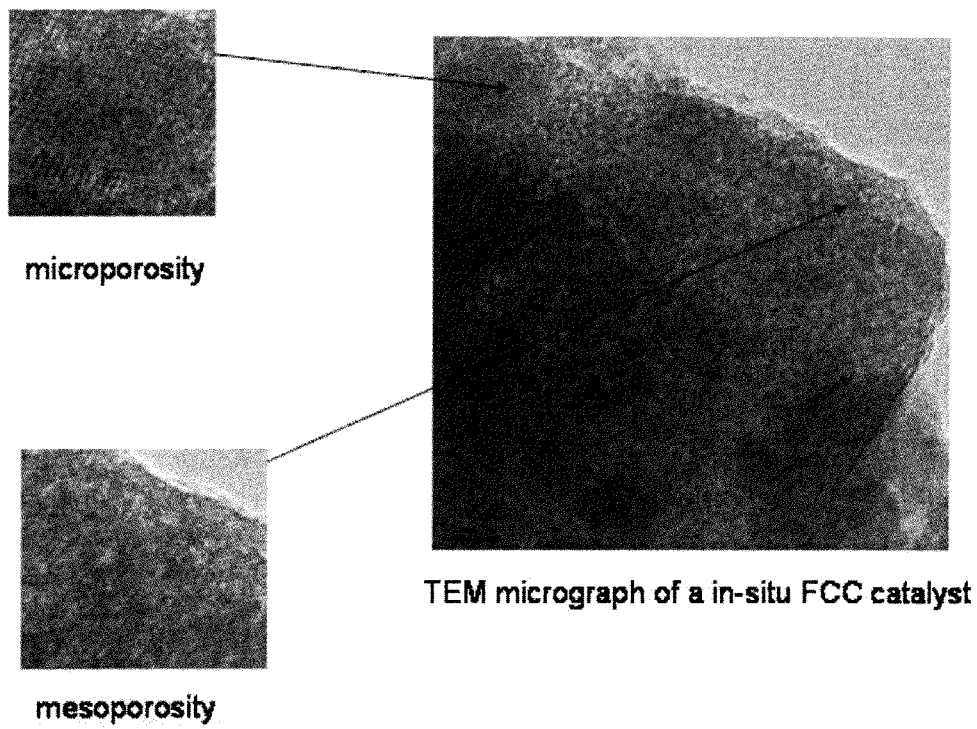

method) of the fully crystalline mesostructured zeolite is included in the inset. The presence of well developed narrow pore size mesoporosity in the mesostructured sample is evident by the sharp uptake at $P/P_0 \sim 0.3$;

FIG. 7 depicts the physisorption isotherm of $N_2$ at 77 K of a fully crystalline mesostructured zeolite H-MOR[MCM-41], labeled Meso-HMOR, and its unmodified zeolitic version, H-MOR. The pore size distribution (BJH method) of the fully crystalline mesostructured zeolite is included in the inset. The presence of well developed narrow pore size mesoporosity in the mesostructured sample is evident by the sharp uptake at $P/P_0 \sim 0.3$;

FIG. 8 depicts the physisorption isotherm of $N_2$ at 77 K of a fully crystalline mesostructured H-ZSM-5[MCM-41], labeled Meso-HZSM5, and its unmodified zeolitic version, HZSM5. The pore size distribution (BJH method) of the fully crystalline mesostructured zeolite is included in the inset. The presence of well developed narrow pore size mesoporosity in the mesostructured sample is evident by the sharp uptake at $P/P_0 \sim 0.3$;

FIG. 9 depicts pore volumes (darker columns) of fully crystalline mesostructured zeolites H—Y[MCM-41] (left), H-MOR[MCM-41] (center), and H-ZSM-5[MCM-41] (right) and their unmodified zeolitic versions (lighter columns) of H—Y (left), H-MOR (center), and H-ZSM-5 (right);

FIG. 10a depicts images obtained by TEM of detail of an H—Y[MCM-41] fully crystalline mesostructured zeolite. The electron diffraction pattern is included as an inset;

FIG. 10b depicts images obtained by TEM of detail of an H—Y[MCM-41] fully crystalline mesostructured zeolite at different focus. The electron diffraction pattern is included as an inset;

FIG. 11 depicts a TEM image of a fully crystalline mesostructured zeolite;

FIG. 12 depicts a TEM image of a fully crystalline mesostructured zeolite;

FIG. 13 depicts a schematic illustration of catalytic cracking of 1,3,5-triisopropyl benzene by an unmodified conventional zeolite H—Y;

FIG. 14 depicts a schematic illustration of catalytic cracking of 1,3,5-triisopropyl benzene by a fully crystalline mesostructured zeolite;

FIG. 15 depicts catalytic activity for 1,3,5-triisopropyl benzene cracking shown as conversion vs. time for a fully crystalline mesostructured zeolite H—Y[MCM-41], labeled Meso-HY, its unmodified zeolitic version HY, and a conventional AlMCM-41. A 50 mL/min stream of He saturated with 1,3,5-triisopropylbenzene at 120° C. was flowed at 200° C. over 50 mg of catalyst;

FIG. 16 depicts the catalytic cracking of 1,3,5-triisopropyl benzene with a fully crystalline mesostructured zeolite H—Y[MCM-41], labeled Meso-HY, to diisopropyl benzene and cumene. The H—Y[MCM-41] results are compared to the normalized results from a commercial sample of unmodified fully crystalline zeolite H—Y. Catalytic cracking with the fully crystalline mesostructured zeolite H—Y[MCM-41] results in higher selectivity and reduction in benzene production;

FIG. 17 depicts the hydrothermal stability of the fully crystalline mesostructured zeolite H—Y, H—Y[MCM-41], labeled Meso-HY, compared to the conventional non-mesolytic zeolite Al-MCM-41;

FIG. 18 depicts catalytic activity for 1,3,5-triisopropyl benzene cracking shown as conversion vs. time for a fully crystalline mesostructured zeolite H-MOR[MCM-48], labeled Meso-HMOR, and its unmodified zeolitic version H-MOR. A helium flow of 50 mL/min saturated with 1,3,5-triisopropylbenzene at 120° C. was introduced over 50 mg of each catalyst, H-MOR[MCM-48] and H-MOR, at 200° C.;

FIG. 19 depicts catalytic activity for 1,3,5-triisopropyl benzene cracking shown as conversion vs. time for a fully crystalline mesostructured zeolite H-ZSM-5[MCM-41], labeled Meso-H-ZSM-5, and its unmodified zeolitic version H-ZSM-5. A helium flow of 50 mL/min saturated with 1,3,5-triisopropylbenzene at 120° C. was introduced over 50 mg of each catalyst, H-ZSM-5[MCM-41] and H-ZSM-5, at 200° C.;

FIG. 20a depicts, on the left-hand side Y axis, the conversion of 1,3,5-triisopropylbenzene vs. time for the nanostructure H-MOR[ZNR] and the unmodified fully crystalline zeolite H-MOR. The ratio of benzene produced by H-MOR-to-benzene produced by H-MOR[ZNR] as a function of time is shown on the right-hand side Y axis. A helium flow of 50 mL/min saturated with 1,3,5-triisopropylbenzene at 120° C. was introduced over 50 mg of each catalyst, H-MOR[ZNR] and H-MOR, at 200° C.;

FIG. 20b depicts Microactivity test ("MAT") results of a conventional fully crystalline zeolite HY (Si/Al=15) and its fully crystalline mesostructured version HY[MCM-41];

FIG. 20c depicts the composition of the LPG fraction obtained by MAT of a conventional fully crystalline zeolite HY (Si/Al=15) and its fully crystalline mesostructured version HY[MCM-41];

FIG. 21 depicts the percentage of polyethylene ("PE") weight lost vs. temperature for the mixtures of catalysts in weight ratio to PE labeled: (A): no catalyst; (B): H-ZSM-5: PE, 1:2; (C): H-ZSM-5[MCM-41]:PE, 1:2; (D): H-ZSM-5: PE, 1:1; (E) H-ZSM-5:PE, 2:1; (F): H-ZSM-5[MCM-41]:PE, 1:1; and (G) H-ZSM-5[MCM-41]:PE, 2:1;

FIG. 22 depicts the FTIR spectra of a) H—Y[MCM-41], b) $NH_4$—Y[MCM-41], c) $NH_2(CH_2)_2NMe_3Cl$, d) $NH_2(CH_2)_2 NMe_3$-Y[MCM-41], d) $Rh(PPh_3)_3Cl$, and e) $Rh(PPh_3)_3NH_2 (CH_2)_2NMe_3$-Y[MCM-41];

FIG. 23 depicts MAT yield results where a fully crystalline mesostructured zeolite HY[MCM-41] is employed as an additive to a conventional unmodified zeolite HY for fluid catalytic cracking of a vacuum gas oil. The results from left to right on the X-axis show 100% HY with no additive, 10% HY[MCM-41] additive to the catalyst, 20% HY[MCM-41] additive to the catalyst, 50% HY[MCM-41] additive to the catalyst, and 100% HY[MCM-41];

FIG. 24 depicts full XRD scans for the initial material prepared in the Example and a control sample, both described in Table 1, showing sharp, well defined peaks that are characteristic of well crystallized Y faujasite zeolite;

FIG. 25 depicts the pore size distributions of the zeolitic microspheres prepared in the Example, both as-synthesized and after treatment to impart mesoporosity;

FIG. 26 depicts the XRD pattern of the zeolitic microspheres with additional mesoporosity (mesoporous in situ FCC), along with the XRD patterns of untreated zeolitic microspheres (in situ FCC) and a reference ultrastabilized Y zeolite (USY);

FIG. 27a is a scanning electron photomicrograph at 100× magnification showing the zeolitic microspheres having additional mesoporosity;

FIG. 27b is a scanning electron photomicrograph at 650× magnification showing a cross section of a zeolitic microsphere having additional mesoporosity;

FIG. 27c is a scanning electron photomicrograph at 2,500× magnification showing a cross section of a zeolitic microsphere having additional mesoporosity;

FIG. 27d is a scanning electron photomicrograph at 10,000× magnification showing a cross section of a zeolitic microsphere having additional mesoporosity;

FIG. 27e is a scanning electron photomicrograph at 20,000× magnification showing a cross section of a zeolitic microsphere having additional mesoporosity; and FIG. 28 is electron photomicrograph of an individual zeolite crystal within a zeolitic microsphere having additional mesoporosity (in situ FCC catalyst), particularly illustrating areas with the regular grid structure of micropores that is characteristic of crystalline zeolite Y faujasite, and also showing regions having a combination of the regular grid structure and larger, less ordered pores of a larger size (mesopores).

DETAILED DESCRIPTION

Various embodiments of the present invention relate to a method of enhancing the mesoporosity of inorganic materials having long-range crystallinity. Such inorganic materials can by prepared by treating an initial inorganic material with a pH controlling agent and a surfactant under time and temperature conditions. In one or more embodiments, the initial inorganic material can constitute a portion of a composite shaped article containing at least the inorganic material (e.g., a zeolite) and at least one non-zeolitic material. The resulting inorganic material with enhanced mesoporosity can have one or more of a variety of mesostructures. Following formation, in various embodiments, the mesostructured inorganic materials having enhanced mesoporosity can be variously modified and/or employed in a variety of processes.

As noted above, an initial inorganic material can be employed in forming the inorganic materials having long-range crystallinity and enhanced mesoporosity. In various embodiments, the initial inorganic material can have a 1-dimensional, 2-dimensional, or 3-dimensional pore structure. Additionally, the initial inorganic material can itself exhibit long-range crystallinity. Materials with long-range crystallinity include all solids with one or more phases having repeating structures, referred to as unit cells, that repeat in a space for at least 10 nm. A long-range crystalline inorganic material structure may have, for example, single crystallinity, mono crystallinity, or multi crystallinity. Multi crystalline materials include all solids having more than one phase having unit cells that repeat in a space for at least 10 nm. Furthermore, in various embodiments, the initial inorganic material can be fully crystalline. Additionally, the initial inorganic material can be a one-phase hybrid material. Examples of inorganic materials suitable for use as the initial inorganic material include, but are not limited to, metal oxides, zeolites, zeotypes, aluminophosphates, gallophosphates, zincophosphates, and titanophosphates. Combinations of two or more types of these inorganic materials can also be employed as the initial inorganic material. In addition, the inorganic material can be a zeolite-like material, which represents a growing family of inorganic and organic/inorganic molecular sieves. In one or more embodiments, the initial inorganic material comprises a zeolite. Examples of zeolites suitable for use as the initial inorganic material include, but are not limited to, faujasite (a.k.a., zeolite Y; "FAU"), mordenite ("MOR"), ZSM-5 ("MFI"), and CHA. Additionally, ultra-stable (e.g., zeolite USY) and/or acid forms of zeolites can also be employed. In various embodiments, the initial inorganic material can comprise faujasite, mordenite, ZSM-5, or mixtures of two or more thereof. In various embodiments, the initial inorganic material comprises faujasite.

In one or more embodiments, the initial inorganic material can be present as a part of a composite shaped article comprising at least one inorganic material (e.g., a zeolite) and at least one non-zeolitic material. In one or more embodiments, the inorganic material in the composite shaped article can be a zeolite. Furthermore, the inorganic material can comprise a zeolite selected from the group consisting of faujasite, mordenite, ZSM-5, CHA, or mixtures of two or more thereof. In various embodiments, the zeolite comprises faujasite. The composite shaped article can comprise the inorganic material (e.g., a zeolite) in an amount of at least 0.1 weight percent, at least 15 weight percent, or at least 30 weight percent based on the total weight of the composite shaped article. Furthermore, the composite shaped article can comprise the inorganic material (e.g., a zeolite) in an amount in the range of from about 0.1 to about 99 weight percent, in the range of from about 5 to about 95 weight percent, in the range of from about 15 to about 70 weight percent, or in the range of from 30 to 65 weight percent based on the total weight of the composite shaped article.

In various embodiments, the non-zeolitic material of the composite shaped article can comprise one or more components selected from the group consisting of inert stable oxides, inert stable carbides, inert stable nitrides, and mixtures of two or more thereof. Examples of inert stable oxides suitable for use include, but are not limited to, alpha-aluminum oxide, titanium dioxide, zirconium oxide, mullite, hydrous kaolin clay, and the residue of alkaline extraction of kaolin clay which has been calcined through the characteristic exotherm at about 1,780° F. without substantial formation of mullite. An example of an inert stable carbide includes, but is not limited to, silicon carbide. An example of an inert stable nitride includes, but is not limited to, silicon nitride. In other various embodiments, the non-zeolitic material of the composite shaped article can comprise a substantially insoluble alkaline oxide, such as, for example, magnesium oxide or calcium oxide. In one or more embodiments, the composite shaped article can have a total non-zeolitic material content of at least 15, at least 30, or at least 35 weight percent based on the total weight of the composite shaped article. Furthermore, the composite shaped article can have a total non-zeolitic material content in the range of from about 1 to about 99.9 weight percent, in the range of from about 5 to about 95 weight percent, in the range of from about 30 to about 85 weight percent, or in the range of from 35 to 70 weight percent based on the total weight of the composite shaped article.

The composite shaped article can be formed by a variety of methods. In various embodiments, the composite shaped article can be formed by first combining the non-zeolitic material with at least one zeolitic material to form an initial mixture. The zeolitic and non-zeolitic materials can be present in the initial mixture in amounts described above for the composite shaped article. Thereafter, the initial mixture can be shaped into the composite shaped article.

Alternatively, the composite shaped article can be prepared by (i) combining the non-zeolitic material and/or a precursor of the non-zeolitic material with a zeolite precursor to form an initial mixture; (ii) shaping the initial mixture into an initial composite shaped article; and (iii) converting at least a portion of the zeolitic precursor in the initial composite shaped article into a zeolite thereby forming the composite shaped article. Suitable zeolite precursors include, but are not limited to, hydrous kaolin clay, metakaolin, sodium silicate, and sodium aluminate, any of which or a combination thereof may be employed in forming the initial mixture of step (i). After shaping the initial mixture, the initial composite shaped article can be treated under any conditions suitable for converting at least a portion of the zeolite precursors into zeolitic material. For example, the initial composite shaped article can be calcined at temperatures ranging from about 1,000 to about 1,400° F., or from 1,100 to 1,300° F. In various embodiments, the calcined material can combined with additional zeolite precursors in a basic solution (e.g., a sodium hydroxide solution). The resulting mixture can be heated (e.g., from 100 to 300° F., or about 210° F.) while stirring for a time period in the range of from about 1 hour to about 1 week, in the range of from 12 hours to 2 days, or about 24 hours. Thereafter, the material can be filtered, washed with deionized water, and dried (e.g., at about 80° C.).

Regardless of the method employed, the initial mixture can be shaped into any desired shape suitable for the intended use of the final product. In various embodiments, the composite shaped article can have a shape selected from the group consisting of a pellet, a tablet, a microsphere, a bead, a honeycomb shape, or mixtures of two or more thereof. Any method known or hereafter discovered in the art can be employed for shaping the initial mixture. For example, the mixture can be shaped by extruding, molding, spray drying, pelletizing, or combinations thereof. In one or more embodiments, microspheres can be formed by spray drying the initial mixture. Once the material is shaped, it can be aged by, for example, being treated in air at a temperature ranging from, for example, about 10 to about 200° C. The shaped material can be treated for a time ranging from about 1 hour to about 1 week. Optionally, it can be heat treated a second time at a higher temperature. The second temperature can vary from about 200 to about 800° C. and for a time period from about 1 hour to about 1 week.

In various embodiments, the composite shaped article can be a Fluid Catalytic Cracking ("FCC") catalyst. As known to those of ordinary skill in the art, FCC catalysts typically contain a molecular sieve (e.g., a zeolite such as faujasite), a binder, a filler, and a matrix. Thus, in various embodiments, the composite shaped article can contain various other components known or hereafter discovered by those skilled in the art of FCC catalysis. FCC catalysts suitable for use as the composite shaped article include any known or hereafter discovered FCC catalysts. In various embodiments, the FCC catalyst can be a faujasite-containing catalyst.

In various embodiments, the initial inorganic material can be treated to alter a portion of the chemical structure of the initial inorganic material. For example, the inorganic material can be initially treated with an acid, such as hydrofluoric acid, which can dissolve a portion of silica in a zeolite and soften the structure. For instance, very stable zeolites having dense structures (e.g., ZSM-5) may benefit from pretreatment with acid. In other various embodiments, when a zeolite or a composite shaped article is employed as the initial inorganic material, it can be treated to extract a portion of the aluminum from the zeolite. Suitable methods for aluminum removal include, but are not limited to, acid extraction, acid extraction with a chelating acid (e.g., citric acid), chelating agent extraction (such as with ethylene diamine tetra-acetic acid ("EDTA")), $SiCl_4$ vapor treatment, and treatment with $(NH_4)_2SiF_6$. In various embodiments, aluminum extraction can be performed by contacting the initial inorganic material with an acid and/or a chelating agent. In various embodiments, when the initial inorganic material contains a zeolite having a $SiO_2/Al_2O_3$ ratio below about 20, the initial inorganic material undergoes aluminum extraction.

In cases where pretreatment for aluminum extraction is practiced, composite shaped articles can be formulated so as to be resistant to degradation by the pretreatment process. This can maintain good physical properties in the shaped article and may prevent excessive aluminum extraction from non-zeolitic constituents. If an excessive amount of aluminum is removed from the non-zeolitic constituents of the shaped article, it can result in increased chemical and processing costs to achieve adequate removal of aluminum from the zeolite constituents. This is in addition to the potential for weakening of the non-zeolitic material as a result of acid attack.

As a result of the potential for increased cost or degradation of the shaped article during either an aluminum extraction step or during the process of mesoporosity creation, the non-zeolitic material of the shaped article selected can be resistant to chemical attack under the chosen processing conditions. For example, when extracting aluminum with either an acid or a chelating acid, the non-zeolitic material can be selected based on its degree of resistance to degradation by acid attack, and also to aluminum removal by acid attack. Similarly, under alkaline conditions, such as may be used for mesoporosity creation (discussed below), there is potential for alkali attack upon the non-zeolitic material in the composite shaped article. Thus, the non-zeolitic material may be selected based on its degree of resistance to alkaline attack. In both cases, the term "resistant" means that the material is not degraded to an unacceptable degree. It is not necessary that "resistant" materials be completely unaffected by the respective chemical conditions.

Examples of materials that are resistant to both acidic and alkaline chemical attack include, but are not limited to, inert stable oxides, such as alpha-aluminum oxide, titanium dioxide, zirconium oxide, mullite, hydrous kaolin clay, and the residue of alkaline extraction of kaolin clay which has been calcined through the characteristic exotherm at about 1780° F. without substantial formation of mullite; inert, stable carbides, such as silicon carbide; and inert stable nitrides, such as silicon nitride. Examples of materials resistant to alkaline chemical attack but not acidic attack include, but are not limited to, substantially insoluble alkaline oxides, such as magnesium oxide and calcium oxide.

As noted above, the initial inorganic material can be treated with a pH controlling agent in a pH controlled medium. In one or more embodiments, the pH controlling agent can comprise an acid or a base. In various embodiments, the pH controlling agent comprises a base. Any base can be employed and in any concentration that produces a desired pH range in the pH controlled medium. In various embodiments, the pH controlled medium can have a pH in the range of from about 8 to about 12, in the range of from 9 to 11, or about 10. In other embodiments, the pH controlled medium can have a pH in the range of from about 10 to about 14, in the range of from 11 to 13, or about 12. Examples of bases suitable for use as the pH controlling agent include, but are not limited to, ammonium hydroxide, a tetraalkylammonium hydroxide (e.g., tetramethylammonium hydroxide), and sodium hydroxide. In various embodiments, the pH controlled medium can further comprise water, such that the pH controlling agent is employed as an aqueous solution.

In other embodiments, the pH controlling agent comprises an acid. Any acid can be employed and in any concentration that produces a desired pH range in the pH controlled medium. In various embodiments the pH controlled medium can have a pH in the range of from about 2 to about 6, in the range of from 3 to 5, or about 4. In other embodiments, the pH controlled medium can have a pH in the range of from about −2 to about 2, in the range of from −1 to 1, or about 0. Examples of acids suitable for use as the pH controlling agent include, but are not limited to, hydrofluoric acid and hydrochloric acid. It should be noted that acids may be of particular use when the initial inorganic material selected for use is a very stable zeolite, such as, for example, ZSM-5, mordenite, or CHA, as discussed above. In various embodiments, the initial inorganic material can first be treated in a pH controlled medium having a low pH for an initial time period. Thereafter, the pH of the pH controlled medium can be increased by adding a base, such as those described above, to increase the pH, such as to the ranges described above.

As noted above, the initial inorganic material can also be treated with a surfactant. The order of addition of the surfactant is not critical. In various embodiments, the surfactant can be present in the pH controlled medium prior to introducing the initial inorganic material. In other embodiments, the surfactant can be added to the pH controlled medium following addition of the initial inorganic material. In still other embodiments, a first portion or a first surfactant can be present at the time when the initial inorganic material is introduced and, thereafter, a second portion and/or a second surfactant can be added to the medium.

Surfactants suitable for use can be cationic, anionic, or neutral. In various embodiments, the surfactant comprises a cationic surfactant. In other embodiments, the surfactant comprises an anionic surfactant, a neutral surfactant, or a combination of these. Though not wishing to be bound by theory, it is believed that selection of the surfactant may affect the character of the mesopores introduced into the inorganic material. For instance, surfactants with larger substituents (such as longer pendant alkyl chains) may produce larger mesopores in the inorganic material. Specific examples of surfactants suitable for use include, but are not limited to, alkylammonium halides (e.g., cetyltrimethylammonium bromide ("CTAB")) and PLURONIC® (available from BASF, Florham Park, N.J.). In certain embodiments, when the pH controlled medium has a basic pH (e.g., from about 8 to about 14, or from 9 to 12), the surfactant employed can comprise a cationic surfactant, such as CTAB. In other embodiments, when the pH controlled medium has an acidic pH (e.g., from about −2 to about 6, about −2 to about 2, or about 0), the surfactant employed can comprise an anionic surfactant and/or a neutral surfactant, such as PLURONIC®.

The quantity of surfactant employed can be varied according to the type of surfactant employed and the type of initial inorganic material employed. In various embodiments, the surfactant can be present in a weight ratio with the initial inorganic material in the range of from about 0.01:1 to about 10:1, in the range of from about 0.5:1 to about 2:1, or of about 1:1 surfactant-to-inorganic material based on the combined weight of the surfactant and the initial inorganic material. In various embodiments, the weight of surfactant employed can be about half the weight of the initial inorganic material employed.

In addition to a surfactant, the pH controlled medium can optionally comprise one or more additional reagents. For example, a swelling agent, nanoparticles, biomolecules, a mineralizing agent, a co-surfactant, a metal oxide precursor, a silica solubilizing agent, an alumina solubilizing agent, a triblock copolymer, or any combination thereof, can be added to the pH controlled medium before and/or after introduction of the inorganic material. Such reagents can be selected to control a cross-sectional area of each of a plurality of mesopores introduced into the inorganic material. For instance, use of a swelling agent can expand the surfactant micelles, thereby resulting in larger mesopore formation in the inorganic material.

When contacting the initial inorganic material with a pH controlled medium and a surfactant, any time and temperature conditions can be employed that permit mesopore introduction in the initial inorganic material (e.g., the composite shaped article). Generally, the time and temperature conditions are related such that a higher temperature requires a shorter period of time to achieve a desired mesoporosity in the inorganic material resulting in a certain mesostructure. Conversely, a lower temperature may require a relatively longer period of time to achieve the same mesoporosity. Additionally, selection of time and temperature conditions can affect the type of mesostructure that is created in the inorganic material. Thus, by adjusting the synthesis conditions (e.g., pH, time, temperature, inorganic material type, surfactant concentration) different mesostructures (e.g., MCM-41, MCM-48, and MCM-50) can be produced. Because time and temperature are related, any suitable combination of time and temperature may be employed when treating the mixture. For example, the temperature can range from a value in the range of from about room temperature to about 60° C. In other embodiments, the temperature can be in the range of from about 60 to about 100° C., in the range of from 70 to 90° C., or about 80° C. In still other embodiments, the temperature employed can be in the range of from about 100 to about 200° C., in the range of from 100 to 150° C., or about 120° C. In yet other embodiments, the temperature can have a value of at least 100° C.

The time period employed for treatment of the inorganic material can be in the range of from about one hour to about two weeks. In other embodiments, the mixture described above can be held at room temperature and stirred for a time value within the range of from about 1 day to about 1 week. Alternatively, the mixture can be treated for a time period in the range of from about 4 hours to about 1 week.

In one or more embodiments, the controlled time and temperature conditions can take place under hydrothermal conditions, such as, for example, in a sealed reactor where autogenous pressure is created within the sealed reactor. During hydrothermal treatment, the mixture can be stirred by, for example, rotating the vessel (i.e., rotating a sealed reactor or an autoclave). Alternatively or in addition, the contents of the vessel can be stirred by employing one or more stirrers inside the vessel to stir the mixture during the hydrothermal treatment. Stirring the mixture can help avoid sedimentation and may improve distribution of the mixture within the vessel.

In various embodiments, when all or a portion of the surfactant is added to the pH controlled medium after the inorganic material has been added, treatment of the inorganic material can be done at different time/temperatures. For example, in various embodiments, an inorganic material can be treated in a pH controlled medium optionally containing a surfactant under a first set of time/temperature conditions. Thereafter, surfactant can be added to the mixture and the inorganic material can be treated under a second set of time/temperature conditions. Any of the time and temperature conditions described above may be used in such a multi-stage treatment process. Additionally, any of the foregoing process steps can be repeated as desired.

In various embodiments, the treatment described above can allow the initial inorganic material to form a plurality of mesopores having a controlled cross sectional area forming a mesostructure having long-range crystallinity. Suitable mesostructures include, but are not limited to, hexagonal, cubic, lamellar, foam, random, organized, and controlled. For example, an H—Y[MCM-41] is a mesostructure of an acidic form of faujasite (i.e., H—Y) having long-range crystallinity and having a hexagonal mesopore arrangement (i.e., [MCM-41]). Similarly, an H—Y[MCM-48] is a mesostructure of an acidic form of faujasite having long-range crystallinity and having a cubic pore arrangement. Also, an H—Y[MCM-50] is a mesostructure of an acidic form of faujasite having long-range crystallinity and having a lamellar pore arrangement.

The treated inorganic material (a.k.a., the mesostructured material (e.g., a fully crystalline mesostructured zeolite)) described above can undergo a variety of post-synthesis treatments. For example, steps for making a mesostructured material may be repeated or cycled to obtain a desired result. One or more of the hydrothermal treatment conditions, surfactant type, surfactant quantity, and the pH of the pH controlled medium may be altered in each successive cycle. For example, a treated inorganic material still present in the synthesis solution may be hydrothermally treated one or more additional times. Specifically, after hydrothermal treatment in the pH controlled media in the presence of surfactant and prior to other post-synthesis steps (e.g., filtration, drying, and calcination), one or more of the hydrothermal treatment, surfactant type, surfactant quantity, and pH may be altered in one or more subsequent cycles. Cycles may be employed to further improve the amount, quality, and ordering of the mesoporosity introduced in the inorganic material. Synthesis parameters such as, for example, pH, concentration of surfactant, water content, and mineralization agents, can be adjusted prior to successive hydrothermal treatment. Various cycles of hydrothermal treatment and parameter synthesis can be used. In various embodiments, a fully crystalline mesostructured zeolite can be formed in between about 1 and about 10 cycles, for example. In each cycle, the hydrothermal temperature can vary from about 50 to about 200° C., and the time period allowed for synthesis can vary from about 2 hours to about 2 weeks. Other time and temperatures described above for the initial treatment may also be used.

In various embodiments, after a first hydrothermal treatment, the resulting slurries having an initial pH in the range from about 8 to about 14 can be partially neutralized to a final pH of from about 8 to about 10 by employing acids. Acids suitable for use can be mineral or organic and include, for example, HCl, $HNO_3$, $H_2SO_4$, HF, acetic acid, or any combination of such acids. The quantity of surfactant including, for example, quaternary ammonium, phosphonium based surfactants, cationic, neutral or anionic surfactants, can be increased from about 5 to about 500%. In a second cycle, the same surfactant from the first cycle may be employed. Alternatively, in a second cycle, a second different surfactant or any combination of surfactants may be employed.

In an exemplary synthesis, a zeolite H—Y (Si/Al~15) was hydrothermally treated in a sodium hydroxide solution having a pH of 11 and containing the surfactant CTAB at a zeolite-to-CTAB ratio of 1 at 120° C. for 12 hours. After this treatment 0.2 cc/g of mesoporosity was introduced in the original zeolite, as measured by nitrogen adsorption at 77 K. Pore size distribution was fairly narrow and no mesopore ordering was observed under Transmission Electron Microscopy ("TEM"). In a second cycle, 1.0 M HCl was added until the pH reached 9, an excess of 50% of CTAB surfactant was added to provide a zeolite to CTAB ratio of 1 to 1.5, and second hydrothermal treatment at 120° C. for a 12 hours produced a 0.3 cc/g mesopore volume, a narrower pore size distribution, and same local mesopore ordering, observed by TEM. The materials as modified by changing synthesis parameters and hydrothermal conditions were characterized by X-ray diffraction, gas adsorption, and electronic microscopy. These techniques confirmed that it is possible to control of the synthesis conditions even after some mesoporosity is introduced in the inorganic material. In addition, the successive hydrothermal treatments enable controlled mesoporosity (i.e., controlled pore volume, controlled pore size, and/or controlled pore shape) in the mesostructured material (e.g., a fully crystalline mesostructured zeolite).

Following treatment with the pH controlling agent and the surfactant, the resulting treated inorganic material (which can be a mesostructure having long-range crystallinity) can be separated from the reaction medium. In various embodiments, the step of separating the mesostructured material from the reaction medium can be carried out by one or more methods selected from the group consisting of filtration, centrifugation, and sedimentation. Following separation, the treated inorganic material can be washed and dried. For example, the treated inorganic material can be washed once or repeatedly with water (e.g., deionized water). Additionally, the treated inorganic material can be dried at an elevated temperature. As used herein, the term "elevated temperature" is intended to denote any temperature greater than room temperature. For example, the treated inorganic material can be dried at a temperature in the range of from about 50 to about 100° C.

After separation, washing, and drying, at least a portion of any remaining surfactant can be removed by, for example, calcination or surfactant extraction. In one or more embodiments, the treated inorganic material can initially be calcined in nitrogen at a maximum temperature from about 500 to 760° C. (or about 1,000 to about 1,400° F.), or at about 550° C.; and then in air for surfactant removal. In various embodiments, the surfactant removal technique can be selected based, for example, on the time needed to remove all or substantially all of the surfactant from the treated inorganic material. In other various embodiments, residual surfactant can be removed via contacting the treated inorganic material with one or more extraction agents under conditions of time and temperature sufficient to extract at least a portion of the residual surfactant. Extraction agents can include, but are not limited to, solvents, acid/solvent mixtures, supercritical fluids, or mixtures thereof. Solvents suitable for use as extracting agents either alone or in combination with an acid include, but are not limited to, an alcohol (e.g., methanol, ethanol, and isopropyl alcohol), acetone, dimethylformamide, methylpyrrolidone, a halogenated solvent, acetonitrile, and mixtures of two or more thereof. Acids suitable for use in an acid/solvent extraction agent include, but are not limited to, inorganic acids, such as hydrochloric acid, nitric acid, or sulphuric acid; organic acids, such as a sulphonic acid, a carboxylic acid, or a halogenated acid; and mixtures of two or more thereof. Supercritical fluids suitable for use as extraction agents include, but are not limited to, carbon dioxide, an alcohol, ammonia, a halogenated methane, a halogenated hydrocarbon, and mixtures of two or more thereof. Whether by calcination and/or extraction agent, in the range of from about 65 to about 100, in the range of from about 75 to about 90, or about 80 weight percent of the surfactant can be removed from the treated inorganic material.

When the initial inorganic material employed is a composite shaped article as described above, the above-described process can be sufficient to increase the pore volume of at least one 10 angstrom subset of mesoporosity in the composite shaped article, thereby forming a shaped zeolitic material with enhanced mesoporosity. As used herein, a "subset of mesoporosity" refers to a sub-range of pore sizes within the 20 to 600 angstrom range. Thus, a "10 angstrom subset of mesoporosity" could be any 10 angstrom range of pore sizes between 20 and 600 angstroms (e.g., 22-32; 40-50; 135-145; or 499-509 angstroms). All that is required "to increase the pore volume of at least one 10 angstrom subset of mesoporosity," as stated above, is for there to exist at least one 10 angstrom range of pore sizes between 20 and 600 angstroms that increases in volume, even if the net mesoporosity over the entire 20 to 600 angstrom range stays the same or decreases.

In various embodiments, the increase in pore volume of the 10 angstrom subset can constitute an increase of at least 0.01, at least 0.04, or at least 0.08 cc/g in that 10 angstrom subset. Additionally, the increase in pore volume of the 10 angstrom subset can constitute an increase of at least 10, 20, 30, 40, 50, 60, 70, 80, 90, 100 or more percent of the pore volume of the 10 angstrom subset. In one or more embodiments, the selected 10 angstrom subset can be contained within a broader range of from 20 to 250 angstroms, from 20 to 80 angstroms, or from 30 to 70 angstroms. In various embodiments, the conditions employed during the above-described process can be sufficient to increase the pore volume of at least one 25 angstrom subset of mesoporosity in the composite shaped article. In still other embodiments, the conditions employed during the above-described process can be sufficient to increase the pore volume of at least one 50 angstrom subset of mesoporosity in the composite shaped article.

Additionally, when the initial inorganic material is a composite shaped article, the treatment described above can cause the formation of a plurality of intracrystalline mesopores in the zeolite of the composite shaped article. As used herein, the term "intracrystalline" is intended to denote that the additional mesoporosity is located within the zeolite, as opposed to the non-zeolitic material. Additionally, in various embodiments, the treatment described above can cause a net increase in the overall mesoporosity of the composite shaped article. For example, treatment as described above can cause a net increase in the mesoporosity of at least 0.01, at least 0.05, or at least 0.1 cc/g in the zeolite and/or the non-zeolitic material in the composite shaped article. Furthermore, treatment as described above can cause a net increase of at least 10, 20, 30, 40, 50, 60, 70, 80, 90, 100 or more percent in the overall mesoporosity of the composite shaped article. The resulting shaped zeolitic material having enhanced mesoporosity can have a total volume of mesopores in the range of from about 0.05 to about 0.9 cc/g, or in the range of from 0.1 to 0.8 cc/g.

As noted above, the resulting treated inorganic material can be in the form of a mesostructure. Furthermore, when the initial inorganic material comprises a zeolite, the treated inorganic material can be a mesostructured zeolite. The hybrid structure of mesostructured zeolites was studied via X-ray diffraction ("XRD"). FIGS. 1d-3 show the XRD patterns of H—Y[MCM-41], H-MOR[MCM-41], and H-ZSM-5 [MCM-41], respectively. As used herein, the naming convention for mesostructured zeolites (e.g., H—Y[MCM-41]) first includes the starting zeolite structure (e.g., H—Y) and then, placed adjacent in brackets, is the name of the mesostructure (e.g., [MCM-41]). The mesostructured zeolite H—Y[MCM-41] retains the full crystallinity of the zeolite H—Y, and features hexagonal pores [MCM-41]. The fully crystalline mesostructure surrounds these hexagonal mesopores that have been formed by the invention. Thus, the resulting structure is a fully crystalline H—Y material that features an [MCM-41] type of mesostructure. For convenience, this is designated as H—Y[MCM-41].

Figure 1A:
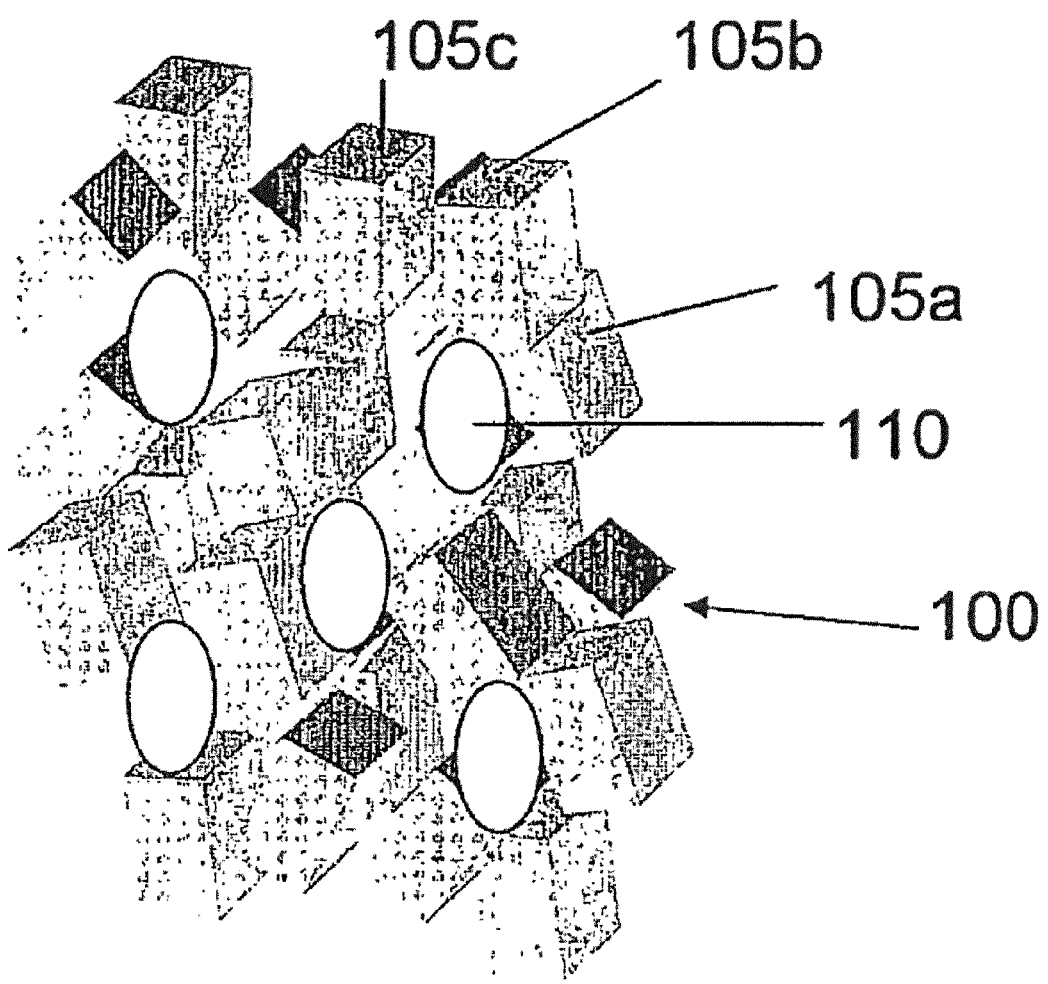
FIG. 1a is a schematic diagram of a prior art polycrystalline mesoporous material.
Figure 1B:
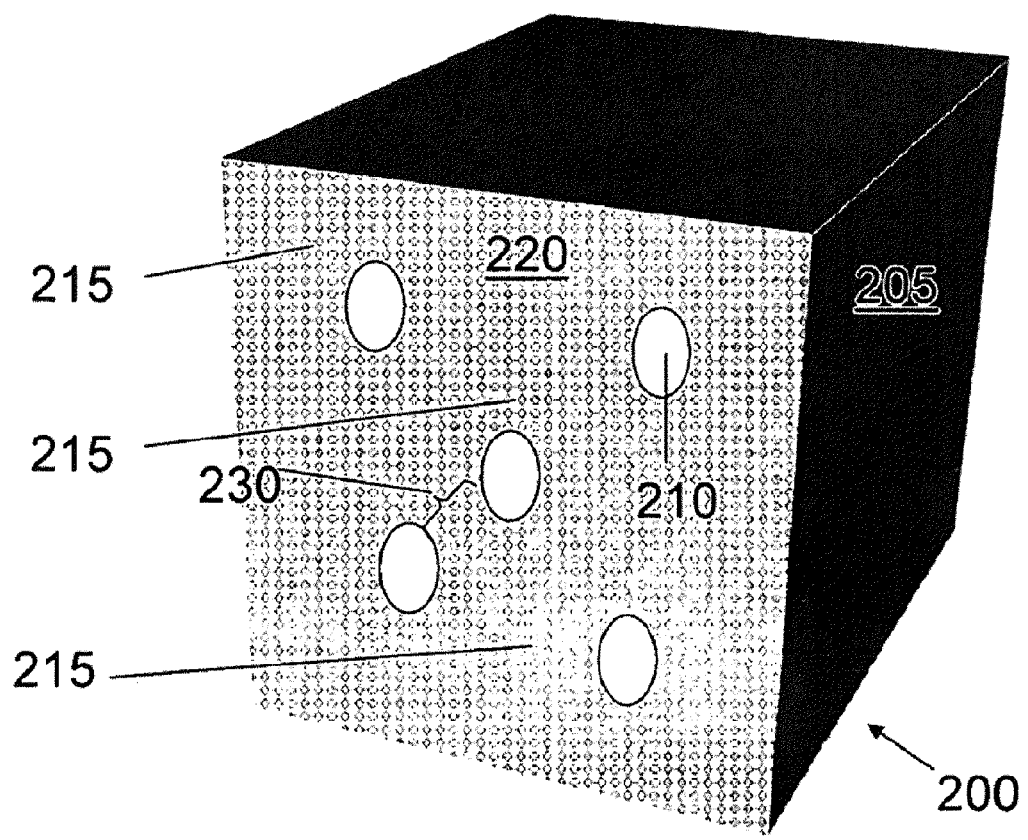
FIG. 1b is a schematic illustration of a fully crystalline mesostructured zeolite.
Figure 1C:
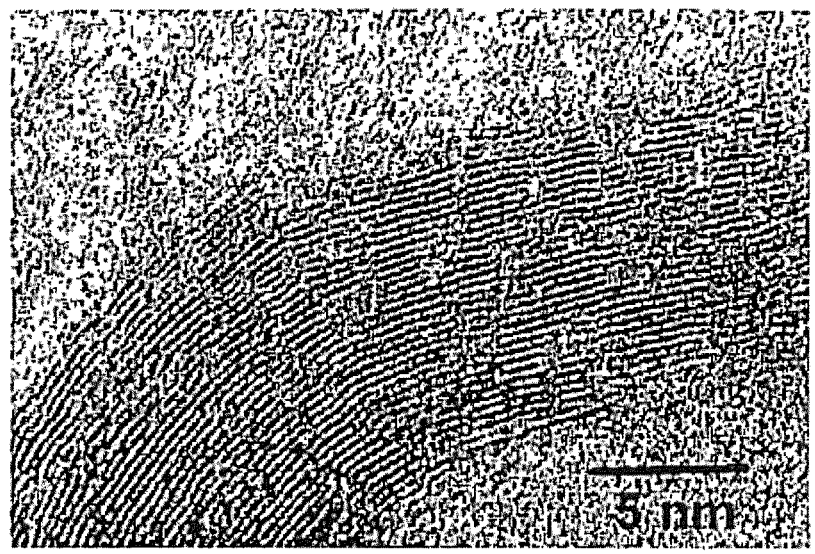
FIG. 1c depicts a transmission electron microscopy ("TEM") image of a nanostructured zeolite where the nanostructure shape includes nanorods.
Figure 1D:
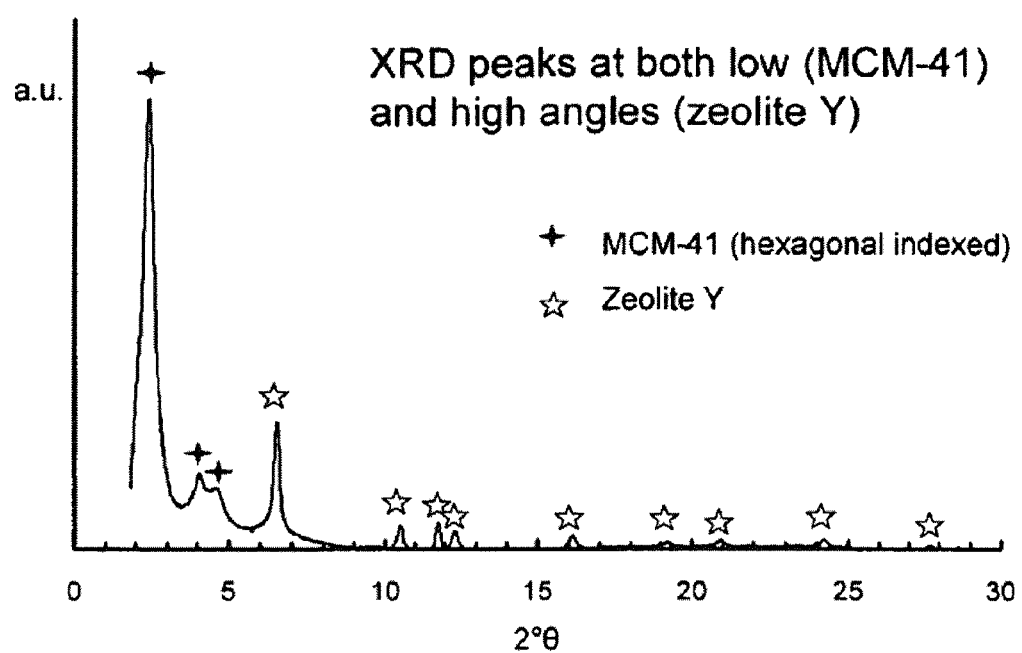
FIG. 1d depicts the X-ray diffraction ("XRD") pattern of a fully crystalline mesostructured zeolite H—Y[MCM-41]. Both the ordered mesostructure MCM-41 (revealed by the XRD peaks at low angles) and the unmodified zeolitic fully crystalline structure H—Y are present.
Figure 2:
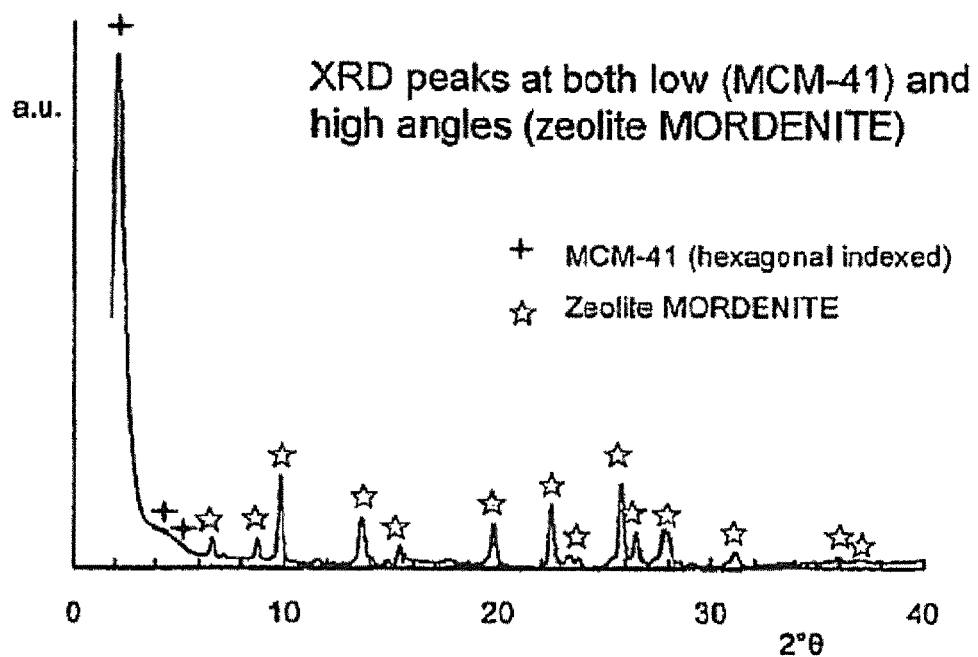
FIG. 2 depicts the X-ray diffraction pattern of the fully crystalline mesostructured zeolite H-MOR[MCM-41]. Both the ordered mesostructure MCM-41 (revealed by the XRD peaks at low angles) and the unmodified zeolitic fully crystalline structure H-MOR are present.
Figure 3:
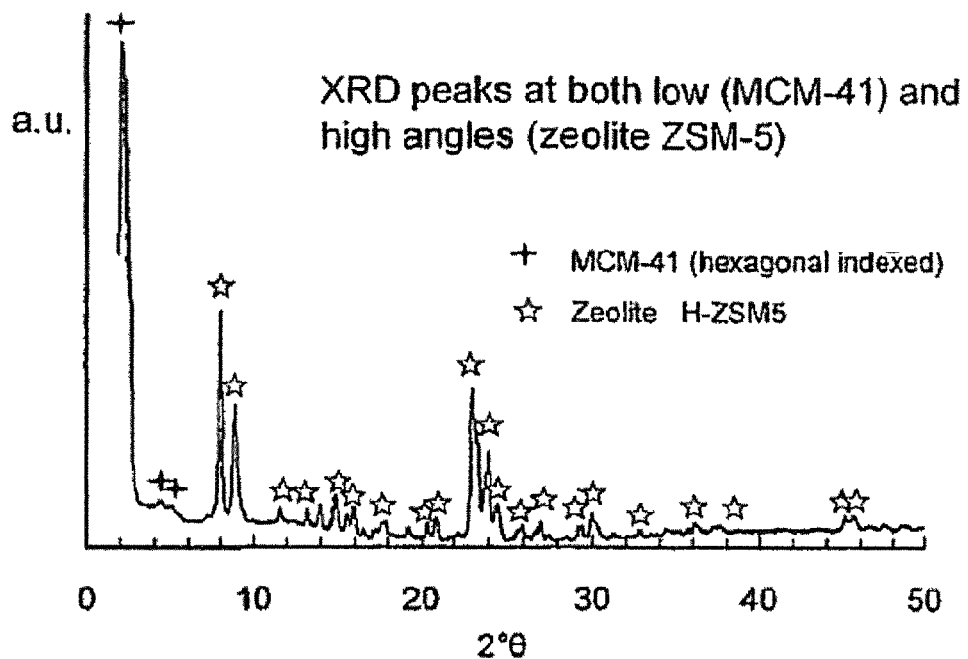
FIG. 3 depicts the X-ray diffraction pattern of the fully crystalline mesostructured zeolite H-ZSM-5[MCM-41]. Both the ordered mesostructure MCM-41 (revealed by the XRD peaks at low angles) and the unmodified zeolitic crystalline structure H-ZSM-5 are present.

FIG. 1d depicts the X-ray diffraction pattern of the mesostructured zeolite H—Y[MCM-41], and both the ordered mesostructure MCM-41 (revealed by the XRD peaks at low angles) and the zeolitic fully crystalline structure H—Y are present. FIG. 2 depicts the X-ray diffraction pattern of the mesostructured zeolite H-MOR[MCM-41], and both the ordered mesostructure MCM-41 (revealed by the XRD peaks at low angles) and the zeolitic crystalline structure H-MOR are present. FIG. 3 depicts the X-ray diffraction pattern of the mesostructured zeolite H-ZSM-5[MCM-41], and both the ordered mesostructure MCM-41 (revealed by the XRD peaks at low angles) and the zeolitic crystalline structure H-ZSM-5 are present. Referring now to FIGS. 1d-3, very intense peaks, both at low and high 2° Θ values, reveal both the ordered mesostructure and the zeolitic crystallinity of this family of materials. In all three cases, the peaks at low 2° Θ values can be indexed to hexagonal symmetry indicating the presence of MCM-41, whereas the well-defined XRD peaks at high 2° Θ values correspond, respectively, to the zeolites Y, MOR and ZSM-5. This observation is remarkable since no long-range crystallinity has been previously observed in mesoporous metal oxides and only semicrystallinity (due to the presence of zeolite nanoclusters) has been achieved in thick-wall mesoporous materials prepared using triblock copolymers.

Figure 4:
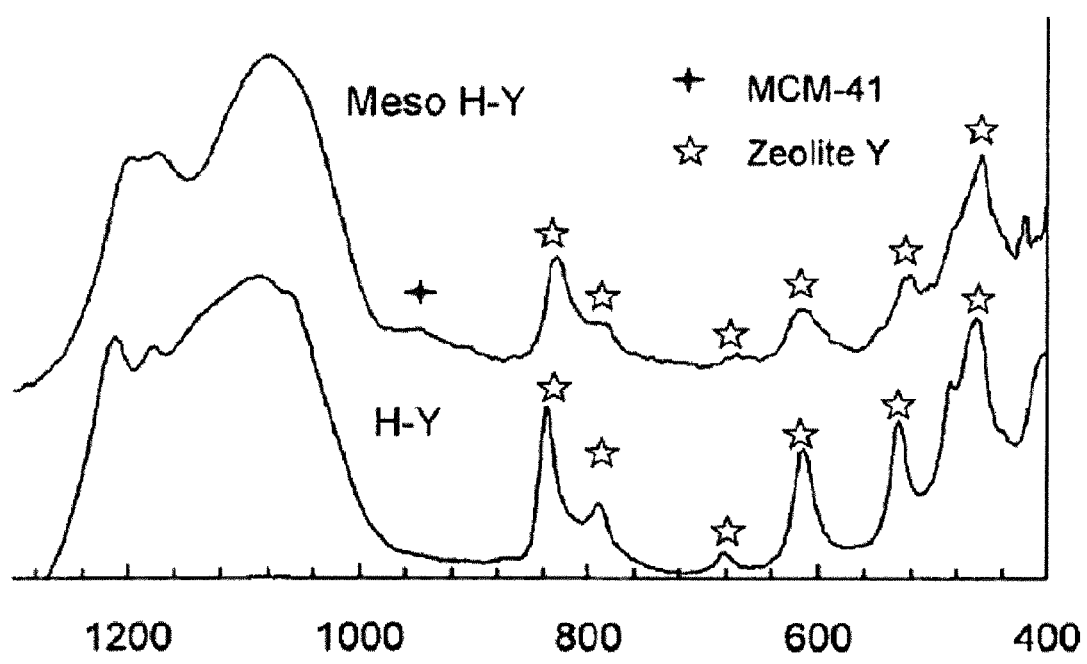
FIG. 4 depicts Fourier transform infrared spectroscopy ("FTIR") characterization peaks for the fully crystalline mesostructured zeolite H—Y[MCM-41], labeled Meso-H—Y, and the unmodified zeolite Y.
Figure 5:
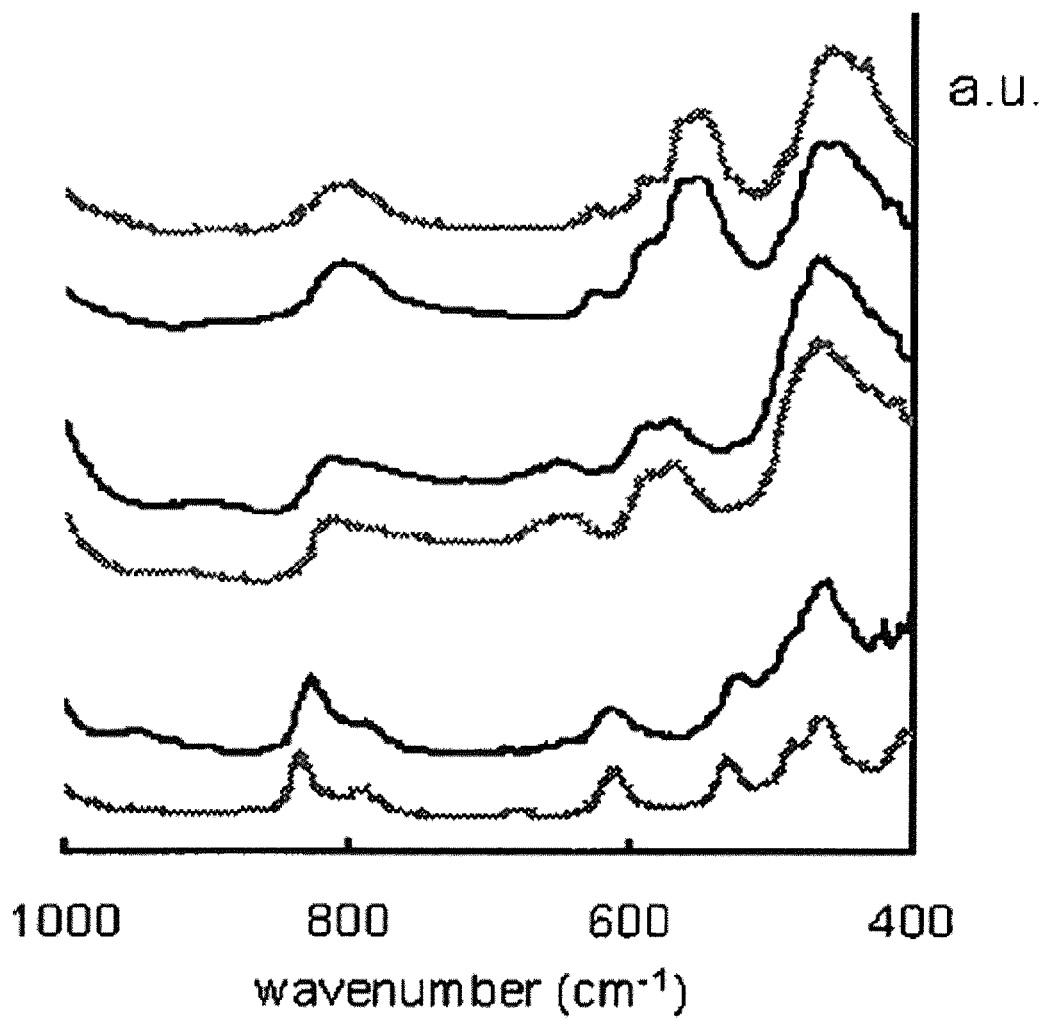
FIG. 5 depicts FTIR spectra of fully crystalline mesostructured zeolites H—Y[MCM-41] (upper top), H-MOR[MCM-41] (upper middle), and H-ZSM-5[MCM-41] (upper bottom); and FTIR spectra of their unmodified fully crystalline zeolitic versions H—Y (lower top), H-MOR (lower middle), H-ZSM-5 (lower bottom). A match between each fully crystalline mesostructured zeolite and its corresponding unmodified zeolite is observed, indicating the fully zeolitic connectivity present in the fully crystalline mesostructured zeolites.

The connectivity of the mesostructured zeolites was studied by Fourier transform infrared spectroscopy ("FTIR"), the results of which are shown in FIGS. 4-5. FIG. 4 depicts FTIR characterization peaks for the fully crystalline mesostructured zeolite H—Y[MCM-41] and zeolite H—Y. The FTIR spectra of the fully crystalline mesostructured zeolite H—Y [MCM-41], labeled Meso-H—Y, is on the top, and the FTIR spectra of the unmodified conventional fully crystalline zeolite H—Y is on the bottom. FIG. 5 depicts FTIR spectra of H—Y[MCM-41] (upper top), H-MOR[MCM-41] (upper middle), H-ZSM-5[MCM-41] (upper bottom), and FTIR spectra of their fully crystalline zeolitic versions in conventional, unmodified form, H—Y (lower top), H-MOR (lower middle), H-ZSM-5 (lower bottom). The spectra of the fully crystalline mesostructured zeolite H—Y[MCM-41] is the upper top spectra and the spectra of the unmodified fully crystalline zeolite H—Y is the lower top spectra. The spectra of the fully crystalline mesostructured zeolite H-MOR [MCM-41] is the upper middle spectra and the spectra of the unmodified fully crystalline zeolite H-MOR is the lower middle spectra. The spectra of the fully crystalline mesostructured zeolite H-ZSM-5[MCM-41] is the upper bottom spectra and the spectra of the unmodified fully crystalline zeolite H-ZSM-5 is the lower bottom spectra. In FIG. 5 a match between each fully crystalline mesostructured zeolite and its corresponding unmodified fully crystalline zeolite is observed, indicating the zeolitic connectivity is present in fully crystalline mesostructured zeolites. FIG. 5 shows a remarkable match between the IR spectra of the fully crystalline mesostructured zeolites H—Y[MCM-41], H-MOR [MCM-41], and H-ZSM-5[MCM-41] and those of the their corresponding unmodified fully crystalline zeolitic versions, H—Y, H-MOR, H-ZSM-5, contrary to highly stable Al-MCM-41, which presents only one IR broad peak, due to imperfect zeolitic connectivity. The peak at 960 $cm^{-1}$ in the H—Y[MCM-41] mesostructured zeolite sample, characteristic of silanol groups on the wall surfaces, provides additional evidence of the mesoporous/zeolitic hybrid nature of mesostructured zeolites.

Figure 6:
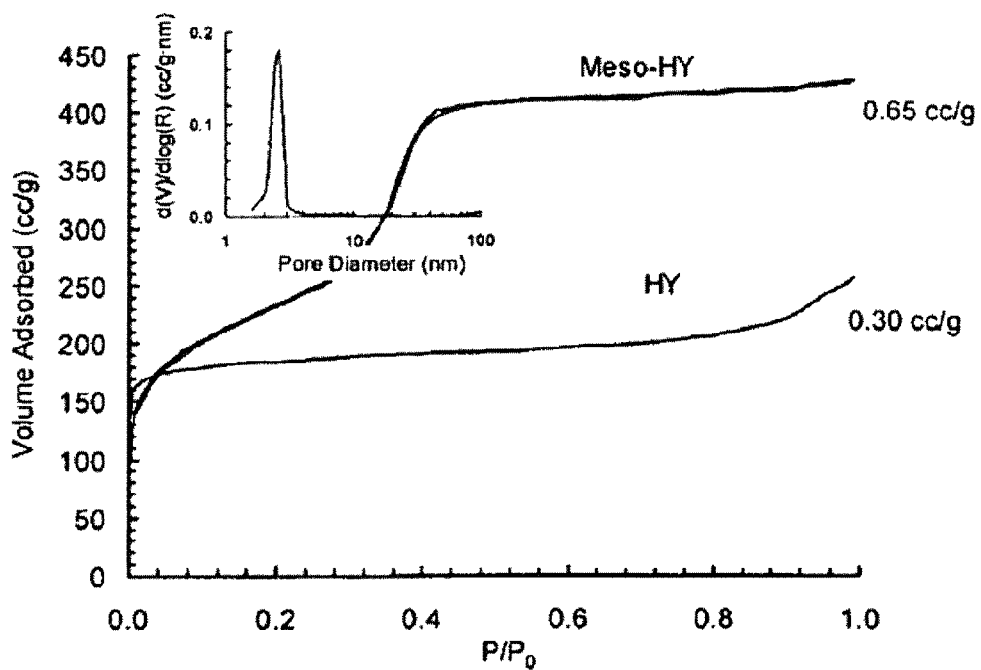
FIG. 6 depicts the physisorption isotherm of $N_2$ at 77 K of a fully crystalline mesostructured zeolite H—Y[MCM-41], labeled Meso-HY, and its unmodified zeolitic version, H—Y. The pore size distribution (Barrett, Joyner, Halenda ("BJH")

The presence of well-defined mesoporosity in mesostructured zeolites can be suitably studied by nitrogen physisorption at 77 K. FIGS. 6-8 show the nitrogen isotherms at 77 K of fully crystalline mesostructured zeolites H—Y[MCM-41], H-MOR[MCM-41], and H-ZSM-5 [MCM-41], respectively, and their unmodified zeolitic versions, H—Y, H-MOR, and H-ZSM-5. The presence of well developed narrow pore size diameter distribution mesoporosity is evident in each mesostructured sample. The pore size of the mesoporosity is controlled such that a diameter and/or a cross sectional area of each of the mesopores in a specific fully crystalline mesostructured zeolite falls within a narrow pore size diameter distribution. In one or more embodiments, more than 95% of the mesopores have a pore size (e.g., a diameter and/or a cross sectional area) that falls within plus or minus 75%, 30%, or 10% of the average pore size. Each pore wall or mesopore surface that surrounds a diameter controlled mesopore can be substantially similar in size. Furthermore, the fully crystalline mesostructured zeolites can have a controlled mesoporosity pore size cross sectional area. Where the mesopores are substantially cylindrical in shape in addition to having a pore size cross sectional area, these pores have a pore size diameter. However, where the shape of the mesopores are not cylinder-like and are, for example, slit shaped, worm-like (e.g., with a changing diameter throughout at least a portion of the depth of the mesopore surface that surrounds an exemplary mesopore), or non-defined shapes, then at least a portion of such a mesopore surface can have a controlled mesopore cross sectional area. The size of the mesopores is controlled by, for example, the selected surfactant and/or quantity of surfactant used when making a fully crystalline mesostructured zeolite from a conventional unmodified fully crystalline zeolite. Prior attempts to incorporate mesostructures into zeolites have been unable to achieve such a controlled mesoporosity that results in substantially all mesopores in a zeolite having a substantially similar size (e.g., diameter and/or cross sectional area) and a controlled pore arrangement (e.g., [MCM-41] having a hexagonal pore arrangement). Rather, prior attempts to foil mesostructures in zeolites have resulted in any or a combination of a broader pore size distribution ranging from small, medium, to large size pores, different shaped pores, and uncontrolled arrangements.

In various embodiments, a significant volume of mesoporosity can be introduced into the initial inorganic material. For example, referring to FIG. 6, the mesopore volume roughly doubles when the zeolite is mesostructured. In accordance with principles of the invention, in the sample of FIG. 6, the unmodified zeolite H—Y had a mesopore volume of 0.30 cc/g whereas the fully crystalline mesostructured zeolite labeled Meso-HY, which was H—Y[MCM-41], had a mesopore volume of 0.65 cc/g. Conventional zeolites adsorb nitrogen only at low pressures, producing type I isotherms that are characteristic of microporous materials. However, fully crystalline mesostructured zeolites show sharp nitrogen uptakes at higher partial pressures (e.g., $P/P_0 \sim 0.3$), which is a characteristic feature of mesostructured materials with narrow pore-size distribution (pore diameter ~2.5 nm). FIGS. 6-8 show similar results for fully crystalline mesostructured zeolites H—Y[MCM-41], H-MOR[MCM-41], and H-ZSM-5 [MCM-41], and their unmodified conventional zeolitic versions H—Y, H-MOR, and H-ZSM-5.

FIG. 9 depicts mesostructured zeolite pore volumes (darker columns) of H—Y[MCM-41] (left), H-MOR[MCM-41] (center), and H-ZSM-5 [MCM-41] (right) and their zeolitic versions (lighter columns) of H—Y (left), H-MOR (center), and H-ZSM-5 (right). As seen in FIG. 9, compared to conventional zeolites, the fully crystalline mesostructured zeolites have more than double the pore volume due to the incorporation of a well-developed, narrow distribution of pore-size diameter mesoporosity. Referring still to FIG. 9, the volume of mesoporosity that is incorporated can be controlled. The fully crystalline mesostructured zeolite mesoporosity volume can be controlled by, for example, the quantity of surfactant added as a percentage of the quantity of zeolite. Other factors that contribute to mesoporosity volume include the pH, time, and temperature conditions employed. In one or more embodiments, the volume of the controlled pH medium that is added can be an amount suitable to achieve the desired surfactant concentration in view of the amount of zeolite. The pore volume is expressed in cubic centimeters of pores over the grams of the zeolite ("cc/g"). The fully crystalline mesostructured zeolite pore volume can be in the range of from about 0.05 cc/g to about 2 cc/g, or from about 0.5 cc/g to about 1 cc/g. The mesopore size is controlled and the mesopore volume can be controlled, at least in part, by the type and the quantity of surfactant used to create the zeolite mesostructure from the zeolite. The time and temperature conditions may also contribute to the mesopore size and/or the mesopore volume.

In various embodiments, the treated inorganic material prepared as described above can retain substantially the same exterior surface contour (e.g., has substantially the same external size and external shape) and cover substantially the same perimeter as the unmodified initial inorganic material. When the initial inorganic material is a zeolite, suitable unmodified conventional zeolites may range in size from about 400 nm to about 5 microns. In one or more embodiments, the conditions employed to form the mesopores can be selected so as to not substantially change the external size, external shape or the perimeter of the unmodified zeolite. When a zeolite is employed as the initial inorganic material, the density of the resulting fully crystalline mesostructured zeolite can be less than the density of the unmodified zeolite; the density difference may be due to the zeolite removed when the mesopores were formed. In addition, where the fully crystalline mesostructured zeolite is produced from a fully crystalline conventional unmodified zeolite, the fully crystalline mesostructured zeolite can maintain the full crystallinity of the unmodified conventional zeolite.

Where the unmodified conventional zeolite has a chemical composition in its framework, after mesopores are formed in the conventional zeolite, the chemical composition in the resulting fully crystalline mesostructured zeolite framework can remain substantially the same as the chemical composition in the unmodified conventional zeolite framework that was used as source material. The chemical composition of the unmodified conventional zeolite can vary from the external surface (e.g., about the zeolite perimeter) to the inner core. However, the chemical composition of unmodified conventional zeolite framework, whether consistent or variable from the perimeter to the inner core of the zeolite, can be unchanged when the mesopores are formed in the zeolite. Thus, in various embodiments, forming mesopores to create the fully crystalline mesostructured zeolite does not chemically alter the framework of the conventional zeolite. The zeolite stoichiometry can also be unchanged from the unmodified conventional fully crystalline zeolite to the fully crystalline mesostructured zeolite.

Previous attempts by others to form mesostructures in zeolites have resulted in a change in the chemical composition of the framework of the unmodified conventional zeolite. For example, in zeolites containing Si and Al, prior methods treat the zeolite with a base selected to remove more Al than Si from the zeolite. Where such dealumination methods are employed, at least a portion of the chemical composition in the framework of the zeolite changes, specifically, the tetracoordinated alumina ratio changes. In various embodiments described herein, when employing an initial zeolite containing Si and Al, the alumina within the resulting mesostructured zeolite framework can remain tetracoordinated.

Direct evidence for the hybrid single-phase nature of mesostructured zeolites was obtained via transmission electronic microscopy ("TEM"). FIGS. 10a and 10b show two details of the H—Y[MCM-41] mesostructured zeolite microstructure at different foci in which both the crystallinity and ordered mesoporosity can be observed in a single phase. Additional TEM images of mesostructured zeolites are depicted in FIGS. 11-12.

Additional evidence of the hybrid nature of mesostructured zeolites comes from catalysis. In various embodiments, the thickness of the pore wall (i.e., the interior wall between adjacent mesopores) can be a value within the range of from about 1 nm to about 50 nm (e.g., ~2 nm). In addition to other properties, the pore wall thickness makes the mesostructures having long-range crystallinity suitable for catalysis. Their characteristic, in addition to the presence of mesopores and high surface area, appears to allow access to bulkier molecules and reduce intracrystalline diffusion resistance in the long-range crystalline mesostructured zeolites as compared to conventional unmodified long-range crystalline zeolites. Enhanced catalytic activity for bulky molecules is observed in mesostructured zeolites compared to conventional zeolites. For example, semicrystalline mesoporous materials, such as nanocrystalline aluminosilicate PNAs and Al-MSU-S(MFI), show significantly lower activity for cumene cracking (which is usually correlated to strong Bronsted acidity) than conventional H-ZSM-5. Mesostructured zeolites, however, show even greater activity than zeolites, most likely due to their fully zeolitic structure and the presence of mesopores. For example, H-ZSM-5[MCM-41] converts 98% of cumene at 300° C., whereas commercial H-ZSM-5 converts 95% in similar conditions.

In various embodiments, the treated inorganic material prepared as described above can be modified according to one or more of the following methods, which can be used alone or in combination. For example, at least a portion of the exterior surface (i.e., the geometric surface of the inorganic material) and/or at least a portion of the mesopore surfaces of the mesostructured material (e.g., a fully crystalline mesostructured zeolite) can be modified. Similarly, the surfaces of a crystalline nanostructure, including the external surface of one or more nanostructure members, the surface of one or more pores defined within the members, and/or voids defined between adjacent members, can be modified.

Specifically, the mesostructured material (e.g., a fully crystalline mesostructured zeolite) can accommodate small, medium, and/or large bulky molecules on its surfaces (e.g., the mesoporous surfaces and/or the exterior surface). In various embodiments, the ion exchange properties of the mesostructured materials can be used to introduce chemical species. Much of the surface area that is available and accordingly modified is the surface area of the mesoporous surfaces. The available mesopore surface area in the mesostructured material is controlled, at least in part, by the controlled pore volume. As such, the mesostructured material can be functionalized with a wide variety of chemical groups by various techniques.

In one or more embodiments, various metal alkoxides containing various chemical functionalities can be reacted and grafted to the surface of a mesostructured material (e.g., a fully crystalline mesostructured zeolite) by hydrolysis of the alkoxy groups. In one or more embodiments, a metal trialkoxide (R-M(OR')$_3$) can be grafted to the surface of the mesostructured material. For example, trialkoxydes (R-M(OR')$_3$) where R is, for example, an amine, a phosphine, a carboxylic acid, an alcohol, or a thiol; where M is Si, Al, Ti, Sn, or Zn; and where R' is methyl, ethyl, propyl, ethyl, or butyl, are reacted by hydrolysis of the alkoxy group to the surface of the mesostructured material.

These surface-modified mesostructured materials can be prepared by initially degasifying the mesostructured material, which can be in acidic form, under vacuum at a temperature from about 150 to about 550° C. for a time from about 2 to about 24 hours. Alternatively, the sample can be degasified in an inert atmosphere, or it can be air dried at temperatures from about 150 to about 550° C. for a time from about 2 to about 24 hours. The degasified mesostructured material can then be suspended in a dispersing medium. Suitable dispersing mediums can include organic solvents such as, for example, hexane, toluene, xylene, benzene, or any combination of these. Suitable metal alkoxides include, for example, silicon, aluminum, gallium, germanium, zinc, iron, tin, or titanium alkoxides or any combination of these metal alkoxides. The metal alkoxides can include functional groups such as, for example, amines, phosphines, carboxylic acids, hydroxides, thiols, or any combination of these functional groups. A metal alkoxide and/or a functional group can be dissolved in the dispersing medium prior to or after the degasified mesostructured material is suspended in the dispersing medium. The resulting medium can be held at temperatures ranging from about room temperature to about 200° C. Refluxing conditions may also be employed. The sample can be stirred and can be held at the determined temperature for a time period in the range of from about 1 hour to about 1 week. Thereafter, the modified mesostructured material can be filtered, washed (e.g., with the chemical used as a dispersing medium), and dried. The sample can be dried at temperatures ranging from about 20 to about 120° C. and at atmospheric pressure, under inert gas, or under vacuum. The sample can be dried for a time period ranging from about 1 hour to about 1 week. This treatment can be repeated or cycled from, for example, 1 time to about 10 times. In accordance with this treatment, metal alkoxides containing various chemical functionalities can be loaded onto the mesoporous surface and/or the exterior surface of the mesostructured material.

In an exemplary synthesis, 1 gram of fully crystalline mesostructured zeolite H—Y[MCM-41] was degasified under vacuum at 250° C. and was suspended in a 50-mL toluene solution containing 1.5 grams of 3-aminopropyl trimethoxysilane under an argon atmosphere. The suspension was stirred for 12 hours under reflux conditions. Thereafter, the solid was filtered, washed with toluene, and dried at room temperature for 12 hours. Alkylamine grafting was confirmed by infrared spectroscopy.

In other various embodiments, charged chemical species can be introduced to the mesostructured material (e.g., a fully crystalline mesostructured zeolite) by simple ion exchange. Suitable chemical species that can be incorporated by ion exchange include, for example, metal cations, ammonium ions, phosphinium ions, quaternary amines, quaternary phosphines, choline derived compounds, amino acids, metal complexes, or combinations of two or more thereof.

In preparing such materials, a mesostructured material can be suspended in an aqueous solution of a salt of the cation this is to be exchanged by ion exchange. Suitable salts include, for example, sulfates, nitrates, chlorides, or any combination thereof. Suitable cations include, for example, metals, cations of the elements, quaternary ammonium compounds, choline derived compounds, and quaternary phosphonium compounds. The ion and mesostructured material mixture can be stirred for a time ranging from about 1 hour to about 1 week at a temperature ranging from room temperature to about 200° C. Refluxing conditions may also be employed. The sample can then be filtered, washed with water, and dried. The drying temperatures may range from about 20 to about 120° C. at, for example, atmospheric pressure, under inert gas, or under vacuum. The drying time can range from about 1 hour to about 1 week. This treatment can be repeated or cycled from, for example, 1 time to about 10 times. In accordance with this treatment, suitably sized charged chemical species can be loaded onto the mesoporous surface and/or the exterior surface of the mesostructured material. Also in accordance with this treatment, smaller sized charged chemical species can be disposed in the microporous walls.

In an exemplary synthesis, 1 gram of a fully crystalline mesostructured zeolite $NH_4$—Y[MCM-41] was stirred in 100 mL of a 0.01 M $Pt(NH_3)_4(NO_3)_2$ aqueous solution for 12 hours at 70° C. The solid was then filtered, washed with deionized water, and dried at 40° C. for 12 hours. This process was repeated three times. Approximately, 1.5 weight percent $Pt(NH_3)_4^{2+}$ was added to the fully crystalline mesostructured zeolite by this ion exchange method.

In other various embodiments, the mesostructured materials (e.g., a fully crystalline mesostructured zeolite) can be neutralized. Specifically, the acidic properties of the mesostructured materials can be used to introduce various chemical species by reaction of the acid sites of the solids with bases containing chemical functionalities of interest. In accordance with this modification of an external surface of the mesostructured material, the mesostructured material can be exposed to a base containing the desired chemical group and the neutralization is simply allowed to happen. These neutralization reactions can be done in a gas, liquid, or solid phase. Also, the external surface of a zeolite can be neutralized by the reaction of the acid sites located on the external surface of the mesostructured zeolite by bulky bases, passivating agents, or poisons.

In preparing such materials, a mesostructured material can be suspended in a dispersing medium in which a certain base is dissolved. Suitable bases include, for example, hydroxides, ammonia, amines, phosphine, or phosphine based bases, or their combinations. The mixture can be stirred for a time period ranging from about 1 hour to about 1 week and can be held at temperatures ranging from room temperature to about 200° C. The sample can then be filtered, washed, and dried. The drying temperature can range from about 20 to about 120° C. at, for example, atmospheric pressure, under inert gas, or under vacuum. The drying time can range from about 1 hour to about 1 week. This treatment can be repeated or cycled from, for example, 1 time to about 10 times. In accordance with this treatment, various chemical species containing chemical functionalities of interest can be loaded onto the mesoporous surfaces and/or the exterior surface of the mesostructured material. Smaller sized chemical species can also be disposed in the microporous walls.

For example, in one exemplary neutralization reaction, 1 gram of a degasified H—Y[MCM-41] fully crystalline mesostructured zeolite was suspended in 20 mL of hexane containing 0.4 mL of triphenylphosphine and stirred for 4 hours in an argon atmosphere. The sample was then filtered, washed with hexane, and dried at room temperature for about 12 hours.

In other various embodiments, various chemical species can be incorporated into and/or with a mesostructured material (e.g., a fully crystalline mesostructured zeolite) using the methods described before, (e.g., ion exchange or neutralization), and can thereafter be reacted to produce a desired solid phase. For example, the fully crystalline mesostructured zeolite $NH_4$—Y[MCM-41] can be ion exchanged with a Pt $(NH_3)_4^{2+}$ and then heat treated in air at a certain temperature and then in hydrogen at a lower temperature. Heat treatment includes, for example, calcination at temperatures from about 300 to about 600° C. for a time ranging from about 1 hour to about 1 day under dry air flow and then under hydrogen flow. The hydrogen concentration can range from 1 to 100% at a temperature from about 200 to about 400° C. for a time period in the range of from about 1 hour to about 1 day. In accordance with this method, when $Pt(NH_3)_4$—Y[MCM-41] was calcined, $Pt(NH_3)_4^{2+}$ ions reduce to produce highly dispersed Pt nanoparticles on the surface of the mesostructured material.

In other various embodiments, the surface of a mesostructured material (e.g., a fully crystalline mesostructured zeolite) can be coated with various chemical compounds. For example, metal alkoxides (e.g., $M(OR')_4$) can be reacted to the surface of the mesostructured material allowing the hydrolysis and the formation of a metal oxide coating on the surface of the mesostructured material. This method includes the passivation of the mesopore surfaces of zeolites. For example, this method enables the formation of a silica coating on the surface of the solid to block the active sites located on the mesopore surfaces of a mesostructured zeolite. In this way, when a zeolite is employed as part of all of the initial inorganic material, the accessibility of the sites in the pore walls can be increased, thereby keeping the shape selectivity typical of conventional zeolites.

In preparing such materials, a mesostructured material (e.g., a fully crystalline mesostructured zeolite), optionally in acidic form, can be degasified under vacuum at temperatures between about 150 and 550° C. for a time between about 2 hours to about 24 hours. Alternatively, the sample can be degasified under an inert atmosphere or air dried at temperatures from about 150 to about 550° C. for a time from about 2 hours to about 24 hours. The degasified mesostructured material can be suspended in an appropriate dispersing medium such as, for example, organic solvents including hexane, toluene, xylene, or benzene, or any combination of these solvents. A metal alkoxide, for example, silicon, aluminum, tin, or titanium alkoxides, can be dissolved in the dispersing medium prior to or after the suspension of the degasified mesostructured material. The mixture can be stirred for a time period ranging from about 1 hour to about 1 week and the mixture can be held at a temperature from room temperature to about 200° C. Refluxing conditions can also be employed. The sample then be filtered, washed with, for example, the chemical used as a dispersing medium, and dried. The drying temperatures can range from about 20 to about 120° C. at, for example, atmospheric pressure, under inert gas, or under vacuum. The drying time can range from about 1 hour to about 1 week. This treatment can be repeated or cycled from, for example, 1 time to about 10 times.

In other various embodiments, various solid phases, for example, metals, sulfides, oxides, or combinations of these, can be loaded on the surface of the mesostructured material (e.g., a fully crystalline mesostructured zeolite). Various solid phases can be incorporated on the surface of mesostructured material by, for example, impregnation and, if needed, further thermal or chemical treatment. For example, an aqueous nickel acetate solution can be added to a fully crystalline mesostructured zeolite until incipient wetness of the solid. The drying of the solution can be performed slowly, and the resulting solid can be thermally treated. This procedure can yield nickel oxide nanoparticles on the surface of the mesostructured material. Other solid phases that can similarly be loaded by impregnation onto the mesostructured material include sulfide nanoparticles, molybdenum oxide, sulfide, or any other suitable solids known or hereafter discovered in the art.

In preparing such materials, the mesostructured material (e.g., a fully crystalline mesostructured zeolite) can be degasified in vacuum at temperatures from about 150 to about 550° C. for a time period ranging from about 2 hours to about 24 hours. Alternatively, the sample can be degasified under inert atmosphere or dried air at temperatures from about 150 to about 550° C. for a time period in the range of from about 2 hours to about 24 hours. An aqueous solution of the chemical that is to be loaded can be added to the mesostructured material. The contact between the solid and the solution can be maintained for time period from about 1 hour to about 1 week. The contact can be done under vacuum, in an inert atmosphere, or at any air pressure. The final material can be filtered and dried. The drying temperatures can range from about 20 to about 120° C. and be at, for example, atmospheric pressure, under inert gas, or under vacuum. The drying time can range from about 1 hour to about 1 week. This treatment can be repeated or cycled, for example, from 1 time to about 10 times. In accordance with this treatment, various solid phases can be loaded onto the mesoporous surfaces and/or the exterior surface of the mesostructured material.

In an exemplary synthesis, 1 gram of a fully crystalline mesostructured zeolite H—Y[MCM-41] was impregnated (to incipient wetness) with 0.8 mL of a an aqueous solution (0.064 mol $l^{-1}$) of ammonium heptamolybdate. Thereafter, the solid was calcined at 500° C. under flowing air. Well dispersed molybdenum oxide nanoparticles were formed inside the micropores, on the surface of the mesopores, and on the exterior surface of the mesostructure.

In other various embodiments, physicochemical properties of mesostructured materials (e.g., fully crystalline mesostructured zeolites) can be controlled by chemical vapor deposition ("CVD") of various compounds including, for example, metal alkoxides, on to a surface of a mesostructured material. In such embodiments, the mesostructured material can be degassed in vacuum at a temperature ranging from about 200 to about 400° C. It can then be exposed to the chemical compound deposited by CVD. The chemical compound can be, for example, tetramethoxysilane, provided at a certain temperature. This technique can also be used to introduce nanoparticles, carbon, and metal oxide coatings on to the surface of a mesostructured material.

In preparing such materials, the mesostructured material can be degasified in vacuum at temperatures ranging from about 150 and about 550° C. for a time period ranging from about 2 hours to about 24 hours. Alternatively, the sample can be degasified under inert atmosphere or dried air at temperatures ranging from about 150 to about 550° C. for a time ranging from about 2 hours to about 24 hours. Then, the sample can be exposed to the vapors of a chemical compound such as, for example, hydrocarbons, metal complexes, metals, organometalic compounds, or combinations thereof at a temperature and pressure selected to stabilize the vapor phase. This treatment can be conducted for a time period in the range of from about 1 hour to about 1 week. The time period selected depends of the degree of deposition desired. The final material can be washed and dried. The drying temperatures can range from about 20 to about 120° C. at, for example, atmospheric pressure, under inert gas, or under vacuum. The drying time can range from about 1 hour to about 1 week. This treatment can be repeated or cycled from, for example, 1 time to about 10 times. In accordance with this treatment, various chemical compounds can be loaded onto the mesoporous surfaces and/or the exterior surface of the material. Certain small sized vapor molecules may also penetrate the micropores.

In an exemplary synthesis, 1 gram of fully crystalline mesostructured zeolite H—Y[MCM-41] was placed in a quartz reactor and heat treated in a nitrogen atmosphere at 450° C. After 4 hours, the temperature was increased to 700° C. and then a flow of 2.0% propylene in nitrogen was passed at 100 cc/g for 4 hours. This treatment produced a continuous coating of pyrolitic carbon onto the surface of the fully crystalline mesostructured zeolite.

In other various embodiments, a variety of catalysts can be supported on the surface of mesostructured materials (e.g., a fully crystalline mesostructured zeolite). In this way, homogeneous catalysts can be heterogenized. Catalysts can be supported on, for example, the mesopore surfaces and/or on the exterior surface of the mesostructure. Suitable techniques that dispose a catalyst on the mesostructured material include direct ion exchange and chemical species used as ligands to functionalize a surface of the mesostructured material.

In other various embodiments, cationic homogeneous catalysts can be direct ion exchanged with mesostructured materials (e.g., a fully crystalline mesostructured zeolites). Cationic homogeneous catalysts can be used to heterogenize bulky metal complexes to the surface of mesostructured materials. In accordance with this method, cationic species having properties including, for example, optical properties, magnetic properties, electronic properties, bioactivity, or combinations thereof can be heterogenized or immobilized on a surface of the mesostrucutred material.

Chemical species that contain both a cationic end and a terminal end functional group can be ion exchanged with mesostructured materials. These terminal groups can be used as ligands for heterogenization. Accordingly, the cationic end can be direct ion exchanged with the mesostructured material and the terminal end functional group can modify the chemistry of the surface of the mesostructured material.

In preparing such materials, a mesostructured material can be suspended in an aqueous solution of a salt of the cation that will be ion exchanged. Salts include, for example, sulfates, nitrates, chlorides, or any combinations thereof. Suitable cations include, for example, metals, cations of the elements, quaternary ammonium compounds, choline-derived compounds, and quaternary phosphonium compounds. Any other suitable salts and/or cations known or hereafter discovered may also be employed. The mixture can be stirred for a time ranging from about 1 hour to about 1 week and can be held at temperatures from room temperature to about 200° C. Refluxing conditions may also be employed. Thereafter, the sample can be filtered, washed with water, and dried. The drying temperatures can range from about 20 to about 120° C. at, for example, atmospheric pressure, under inert gas, or under vacuum. The drying time can range from about 1 hour to about 1 week. This treatment can be repeated or cycled from, for example, 1 time to about 10 times. In accordance with this treatment, desirable properties and/or functional groups can be heterogenized to the mesopore surfaces and/or the exterior surface of the mesostructured material.

In an exemplary synthesis, 1 gram of fully crystalline mesostructured zeolite NH$_4$Y[MCM-41] was stirred in 50 mL of a 0.1 M 5,10,15,20-tetrakis (N-methyl-4-pirydyl) porphyrin pentachloride solution at room temperature for 12 hours. The solid was filtered and washed with deionized water. This process was repeated three times. Finally, the solid was dried under vacuum at 40° C. for 12 hours. As a result of this treatment method, tetrakis (N-methyl-4-pirydyl) porphyrin pentachloride was present on the surface of the fully crystalline mesostructured zeolite.

In another exemplary synthesis, 1 gram of NH$_4$Y[MCM-41] was stirred in 50 mL of a 0.1 M choline p-toluenesulfonate salt solution at room temperature for 12 hours. The solid was filtered and washed with deionized water. This process was repeated three times. Finally, the solid was dried under vacuum at 40° C. for 12 hours. As a result of this treatment method, choline p-toluenesulfonate was present on the surface of the fully crystalline mesostructured zeolite.

In other various embodiments, the surface of a mesostructured material (e.g., a fully crystalline mesostructured zeolite) can first be functionalized with a chemical species that acts as a ligand and can subsequently be reacted with a metal complex containing ligands. Various chemical species that can act as ligands can be incorporated on the surface of mesostructured material. Methods for incorporating suitable chemical species that act as ligands on the surface of the mesostructured material include, for example, reaction of the mesostructured material with metal alkoxides, ion exchange, neutralization, and other methods selected according to the specific heterogenation application (i.e., the desired chemical species to act as a ligand on the surface of the mesostructured material). In order to heterogenize homogeneous catalysts, chemical species with select properties can be incorporated with ligands to form a metal complex. Suitable chemical species that may be employed as ligands in the metal complex include, for example, amines, phosphines, or combinations thereof.

Following functionalization of the mesostructured material, a metal complex containing ligands can be exposed and allowed to bind to ligands incorporated on the surface of the fully crystalline mesostructured zeolite. Catalyst heterogenization occurs when at least one of the ligands in the metal complex is substituted by at least one ligand attached to the surface of the mesostructured material. Alternatively, catalyst heterogenization occurs when at least one ligand attached to the surface of the mesostructured material is substituted by at least one of the ligands in the metal complex.

In preparing such materials, a mesostructured material containing a chemical group that can be used as a ligand can be degasified under vacuum at a temperature ranging from about 150 to about 550° C. Degasification can take place over a time ranging from about 2 to about 24 hours. Alternatively, the sample can be degasified under inert atmosphere or air dried at temperatures ranging from about 150 to about 550° C. and for a time ranging from about 2 to about 24 hours. The removal of the chemical group (i.e., the ligand) should be avoided; accordingly, the degasification temperatures can range from about 60 to about 200° C. The degasified mesostructured material can be suspended in an appropriate dispersing medium such as, for example, organic solvents including hexane, toluene, xylene, benzene, or any combination thereof. Homogeneous catalysts, for example, metal complexes, enzymes, supramolecular species, organic compounds, or combinations thereof, can be dissolved in the dispersing medium prior to or after suspending the degasified mesostructured material. The resulting mixture can be stirred for a time ranging from about 1 hour to about 1 week at a temperature ranging from room temperature to about 200° C. Refluxing conditions may also be employed. The sample can then be filtered, washed with, for example, the chemical used as dispersing medium, and dried. The drying temperatures can range from about 20 to about 120° C. and be at, for example, atmospheric pressure, under inert gas, or under vacuum. The drying time can range from about 1 hour to about 1 week. This treatment can be repeated or cycled from, for example, 1 time to about 10 times. In accordance with this treatment, catalysts, for example, homogeneous catalysts, can be attached to the mesostructure surface.

In an exemplary synthesis, 1 gram of 3-aminopropyl functionalized fully crystalline mesostructured zeolite H—Y [MCM-41] was reacted in 150 mL of anhydrous ethanol containing 0.1 mol of a metal complex $Rh(CO)Cl(L)_2$ (where L is a phosphine based ligand) at room temperature for 24 hours under inert atmosphere. After this time, the solid was filtered, washed with anhydrous ethanol and dried at 40° C. under vacuum. The metal complex $Rh(CO)Cl$ was on the surface of the fully crystalline mesostructured zeolite.

In other various embodiments, the chemical composition framework (i.e., the stoichiometry) of a mesostructured material (e.g., a fully crystalline mesostructured zeolite) can be altered. Specifically, metals atoms within the mesostructured material framework can be removed and/or substituted with other elements. Various techniques can be used to substitute some of the metal atoms of the mesostructured material framework with other elements. For example, $Al^{3+}$ can be replaced by $Si^{4+}$ by reaction with $SiCl_4$ in gas phase at high temperature. Other methods to dealuminate mesostructured materials include chemical reaction with EDTA and $(NH_4)_2 SiF_6$, typically under refluxing conditions and at high steam temperatures.

In preparing such materials, the mesostructured material can be exposed to a medium (solid, liquid, or gas) that partially dissolves the mesostructured material. Suitable mediums include, for example, steam, HF, HCl, NaOH, $HNO_3$, $F_2$, EDTA, citric acid, or oxalic acid at different concentrations, or any combination thereof. When the mesostructured material is an aluminosilicate (e.g., a zeolite), the medium can remove one or more of the components of the mesostructured material, such as, for example, silica and/or alumina, thereby enriching the mesostructured material framework in the component that was not removed. This treatment can result in a loss in crystallinity in the mesostructured material.

In an exemplary synthesis, 1 gram of H—Y[MCM-41] (Si/Al~5) was stirred in 20 mL of a 0.25 M oxalic acid solution at room temperature for 12 hours. The solid was filtered, washed with deionized water, and dried at 60° C. for 12 hours. This treatment resulted in dealumination and crystallinity loss in the mesostructured zeolite.

In various embodiments, the treated inorganic material described above (e.g., a fully crystalline mesostructured zeolite) can be combined with one or more binders and shaped as desired. Suitable binders, such as aluminum oxide, silicon oxide, amorphous aluminosilicates, clays, titania, zirconia, and others can be blended with the mesostructured material, molded, extruded, and heat treated to fabricate pellets, beads, powders (e.g., spray dried substances), layers, a monolith, or any other shapes for use in chemical processing. Binders can similarly be blended with crystalline nanostructures and processed to fabricate shapes for use in chemical processing.

Other phases may be also added to the treated inorganic material for other purposes, such as increasing sulfur tolerance, increasing metal tolerance, increasing catalytic activity, increasing lifetime, increasing selectivity, increasing bottoms upgrading, increasing hydrothermal stability, or any combination thereof. Types of materials employed as other phases include, for example, alumina, silica, calcium oxide, magnesium oxide, antimony passivators, nanosized zeolites, and ZSM-5 zeolite. Suitable methods and techniques for adding phases to the mesostructured materials and to the crystalline nanostructured zeolites are described herein.

In preparing such materials, a mesostructured material, a surface-modified version of a mesostructured material, a crystalline nanostructure zeolite, or a surface-modified version of a crystalline nanostructure zeolite, can be mixed with one or more binders (such as, but not limited to, clays, alumina, silica, or cellulose). These materials can be mixed with the binders in any ratio and with an appropriate amount of water to form a paste that can be mixed. The mixture can be shaped by various methods such as, for example, extruding, molding, spray drying, and pelletizing. Once the solid is shaped, it can be aged by, for example, being treated in air at a temperature ranging from, for example, about 20 to about 200° C. The solid can be treated for a time ranging from about 1 hour to about 1 week. Optionally, in order to increase the solids mechanical properties, it can be heat treated a second time at a higher temperature. The second temperature can vary from about 200 to about 800° C. and for a time period from about 1 hour to about 1 week.

In an exemplary synthesis, 8 grams of a fully crystalline mesostructured zeolite H—Y[MCM-41] was physically mixed with 1.5 grams of bentonite, 0.3 grams of kaolin, and 0.2 g of hydroxyethyl cellulose (dry mixing). Four grams of water was added to the mixture. The resulting medium was additionally mixed. The paste was then extruded, aged, dried, sieved, and calcined at 450° C. for 12 hours.

Exemplary Syntheses of Fully Crystalline Mesostructured Zeolites

As discussed above, FIG. 1A is a schematic illustration of a prior art amorphous mesoporous material 100. As shown in FIG. 1A, zeolite nucleii 105a, 105b, 105c were aggregated around surfactant micelles under controlled conditions to form a solid. Thereafter, the aggregated nuclei 105a, 105b, 105c were washed in water and dried, and the surfactant was extracted to provide a desired mesopore-sized pore volume 110. Each of the zeolite nuclei, for example, 105a, 105b, 105c, is a nanosized crystal. When they are aggregated, the material 100 is polycrystalline because the nuclei material lacks the long-range regular lattice structure of the crystalline state (i.e., the aggregated nuclei are not fully crystalline or truly crystalline). In contrast with FIG. 1A, FIG. 1B is a schematic illustration of a fully crystalline mesostructured zeolite 200, which features a fully crystalline zeolite structure 205 with mesopores 210 penetrating throughout the volume of the zeolite structure 205. The mesostructure 215 that surrounds the mesopores 210 is fully crystalline. The pore wall or interior wall between adjacent mesopores has a wall thickness 230. As illustrated in FIG. 1B, the mesostructure 215 and the mesopores 210 are viewed from a side 220 of the zeolite structure 205. Although not depicted in this schematic illustration, the mesostructure and the mesopores can be viewed from other sides of the mesostructured zeolite 200.

Referring still to FIGS. 1A and 1B, unlike the fully crystalline mesostructure 215 of the fully crystalline mesostructured zeolite 200 depicted in FIG. 1B, in the aggregated crystalline mesoporous zeolite nuclei material 100, the pore walls that surround the mesopore-sized pore volume 110 are discontinuous, featuring multiple zeolite nuclei crystals (e.g., 105a, 105b, 105c).

As discussed above, the synthesis of fully crystalline mesostructured zeolites is applicable to a wide variety of materials. One strategy is based on the short-range reorganization of a zeolite structure in the presence of a surfactant to accommodate mesoporosity without loss of zeolitic full crystallinity. A zeolite is added to a pH controlled solution containing a surfactant. Alternatively, a zeolite is added to a pH controlled solution and thereafter a surfactant is added. The pH controlled solution can be, for example, a basic solution with a pH ranging from about 8 to about 12, or from about 9 to about 11, or, the basic solution pH can be about 10. The strength of the base and the concentration of the basic solution are selected to provide a pH within the desired range. Any suitable base can be employed that falls within the desired pH range.

As described above, suitable surfactants that can be employed include cationic, anionic, neutral surfactants, or combinations thereof. The quantity of surfactant is varied according to, for example, the surfactant and the zeolite that are mixed. For example, in one embodiment, the weight of surfactant is about equal to the weight of zeolite added to the solution. Alternatively, the weight of surfactant can be about half of the weight of zeolite added to the solution.

The resulting mixture can be hydrothermally treated for a period of time that is selected to allow the fully crystalline zeolite to achieve a desired mesostructure. For example, an H—Y[MCM-41] is a fully crystalline acidic form of faujasite having a fully crystalline mesostructure surrounding a hexagonal pore arrangement. Similarly, an H—Y[MCM-48] is a fully crystalline acidic form of faujasite having a fully crystalline mesostructure surrounding a cubic pore arrangement, and an H—Y[MCM-50] is a fully crystalline acidic form of faujasite having a having a fully crystalline mesostructure surrounding a lamellar pore arrangement. Generally, the time and temperature are related such that a higher temperature requires a shorter period of time to achieve a desired mesoporosity and a certain mesostructure as compared to a lower temperature, which would require a relatively longer period of time to achieve the same mesoporosity. Because time and temperature are related, any suitable combination of time and temperature may be employed when hydrothermally treating the mixture. For example, the temperature ranges from about room temperature to about 60° C.; alternatively, the temperature ranges from 100 to about 200° C. Where the temperature is about 60° C. or greater, the controlled temperature conditions can take place under hydrothermal conditions, for example, in a sealed reactor. The time ranges from about one hour to about two weeks.

In two synthesis experiments, the parameters of time, temperature, zeolite type and quantity, and surfactant type and quantity are kept constant; however, the pH in the first synthesis is 9 and the pH in the second synthesis is 11. As a result of the different pH values in the two synthesis experiments, the two fully crystalline zeolite mesostructures differ from one another. Specifically, the fully crystalline zeolite mesostructure synthesized with the 9 pH solution features fewer mesopore surfaces, because fewer mesopores were incorporated into the conventional fully crystalline zeolite, compared to the fully crystalline zeolite mesostructure synthesized with the 11 pH, which has more mesopore surfaces. Through not wishing to be bound by theory, it is believed that the higher base concentration resulted in increased mesoporosity.

In another exemplary synthesis, a zeolite is added to a diluted $NH_4OH$ solution containing cetyltrimethylammonium bromide ("CTAB") surfactant. The mixture is hydrothermally treated at about 100 to about 200° C., about 120 to about 180° C., about 140 to about 160° C., or about 150° C., for about 20 hours or overnight, during which the zeolite structure undergoes short-range rearrangements to accommodate the MCM-41 type of mesostructure. Higher surfactant concentrations and longer hydrothermal treatments would produce mesostructured zeolites with the MCM-48 type of mesostructure. After washing and drying, the surfactant is removed by, for example, calcination or surfactant extraction. In one embodiment, the resulting material is calcined in $N_2$ at a maximum temperature from about 500 to 600° C., or at about 550° C., and then in air for surfactant removal. The surfactant removal technique is selected based, for example, on the time needed to remove all of the surfactant from the mesostructured zeolites. This synthetic scheme could be used to produce mesostructured zeolites with various zeolitic structures.

Without being bound to any one theory, it is believed that the controlled pH solution softens the conventional fully crystalline zeolite surface enabling the surfactant to penetrate the zeolite creating the mesostructured zeolite. More specifically, the pH conditions that are employed enable the surfactant to penetrate the structure of the zeolite; however, it is not believed that the pH conditions dissolve the zeolite. As the surfactant penetrates the zeolite thereby forming mesopores, the penetrated portion is exposed to the controlled pH solution and is softened, enabling further penetration by the surfactant. The penetration continues in this fashion throughout the volume of the zeolite. The penetration through the zeolite volume may be in any single direction or in a combination of directions. For example, the penetration may be through the x direction, the y direction, the z direction, or any combination thereof. The penetration direction or rate is not necessarily linear. Penetration may be ordered or, optionally, the penetration and consequently the mesopores may be disordered or random. Optionally, one or more of the mesopores intersect, interconnect, converge, and/or align, which impacts the arrangement of the resulting mesoporous fully crystalline mesostructure. The surfactant enables penetration into the fully crystalline zeolite, creating mesopores. The type of surfactant determines, at least in part, the size of the mesopore including, for example, the size of the mesopore diameter and/or the size of the mesopore cross section. Penetration into the conventional fully crystalline zeolite is not observed where a controlled pH solution, for example, a base having a pH of 10 held at controlled time and temperature conditions, is mixed with a zeolite without a surfactant.

As mentioned above, certain conventional fully crystalline zeolites are very stable (e.g., ZSM-5, MOR, CHA etc.), and it is difficult to incorporate mesoporosity into these zeolites. In such cases, strong basic solutions having, for example, a pH ranging from about 11 to about 14, or from about 12 to about 13, or an acidic solution, having, for example, a pH ranging from about 2 to about 6, or from about 3 to about 5, or at about 4, may be desired to dissolve silica and soften the conventional fully crystalline zeolite surface to enable the surfactant to penetrate and create mesopores through the fully crystalline zeolite.

Conventional fully crystalline zeolites with a dense structure (e.g. ZSM-5) are more resistant to acids and bases relative to fully crystalline zeolites with less dense structures. Zeolites with a low solubility (e.g., ZSM-5) and/or a dense structure are relatively stable with respect to penetration by acids and bases; accordingly, a diluted tetramethyl ammonium hydroxide ("TMA-OH") having a pH ranging from about 10 to about 14 or a solution of acid, for example hydrofluoric acid, having a pH ranging from about 2 to about 6 can be used instead of a dilute $NH_4OH$ solution, having a pH ranging from about 9 to about 10, in the synthesis scheme. More specifically, base treatment alone, even at very high pH, might not be sufficient to soften some of the very stable zeolites. The acid HF dissolves silica and softens the structure of the densely structured conventional fully crystalline zeolite (e.g., ZSM-5). After softening the conventional fully crystalline zeolite by exposing it to HF, the pH can be increased by including a base solution having a pH from about 9 to about 11, and a suitable surfactant is added in a quantity selected according to, for example, the quantity of zeolite and the desired mesosporosity volume. The mixture can be treated under appropriate time and temperature conditions to provide the desired mesoporosity and resulting mesostructure in a fully crystalline mesostructured zeolite.

In another exemplary synthesis, a fully crystalline zeolite is added to an acid solution having a pH from about −2 to about 2, or from about −1 to about 1, or about 0, containing a neutral surfactant, for example, PLURONIC® (available from BASF, Florham Park, N.J.). The mixture is exposed to appropriate temperature conditions for a period of time selected to achieve a desired mesostructure. The mixture can be held at room temperature and stirred for from about 1 day to about 1 week. Alternatively, the mixture is hydrothermally treated. In one embodiment, the mixture is hydrothermally treated at about 120° C. for from about 4 hours to about 1 week. The resulting mesopores having a pore diameter measuring from about 5 to 60 nm. A mesopore surface surrounds each mesopore of the mesostructure.

As described above, the mesopore size and architecture may also be conveniently tuned, such as by the use of surfactants with different aliphatic chain lengths, non-ionic surfactants, triblock copolymers, swelling agents, etc. For example, use of a surfactant with a longer chain length increases pore size; conversely, use of a surfactant with a shorter chain length results in smaller pore sizes. Additionally, the use of a swelling agent can expand the surfactant micelles, resulting in larger pore sizes. Any of these mesopore size and mesostructure architecture altering techniques may be used alone or in combination. Also, post-synthesis treatments (e.g., silanation, grafting, surface functionalization, ion-exchange, immobilization of homogeneous catalysts and deposition of metal nanoclusters) can be employed to further improve the textural properties of the materials and/or modify their surface chemistry.

Another aspect features mesostructures such as illustrated in FIG. 1C. Such mesostructures can be achieved based on the dissolution of a zeolite in a pH controlled medium, either in an acidic or basic medium, followed by hydrothermal treatment in the presence of a surfactant. Suitable surfactants that may be employed include cationic, anionic, neutral surfactants, and/or combinations thereof. The quantity of surfactant is varied according to, for example, the selected surfactant and the selected zeolite. For example, the weight of surfactant can be about equal to the weight of zeolite added to the solution; alternatively, the weight of surfactant can be about half of the weight of zeolite ad that dissolves the zeolite ranges from about 10 to about 14. Where the pH controlled medium is acidic, the pH ranges from about −2 to about 2; when using HF, the pH range is from about 2 to about 6. Under these more extreme pH conditions, a mesoporous solid can be obtained where the pore walls are initially amorphous. The pore walls can later be transformed to a zeolitic phase, with or without affecting the mesoporous structure. More specifically, after the zeolite is exposed to this aggressive pH treatment, the pH can be adjusted to about 10 by adding, for example, $NH_4OH$ and surfactant (e.g., CTAB) to produce self-assembling partially dissolved zeolites. This synthesis mixture can be hydrothermally treated or stirred at room temperature over a period of time to obtain a highly stable mesoporous amorphous aluminosilicate. More specifically, if the synthesis mixture is hydrothermally treated at, for example, from about 100 to about 150° C., a highly stable mesoporous amorphous aluminosilicate can be obtained. Alternatively, the synthesis mixture can be stirred at room temperature for sufficient time (from about 4 hours to about 1 day) to obtain a highly stable mesoporous amorphous aluminosilicate. The mesoporous amorphous aluminosilicate maintains its mesoporosity after boiling for 48 hours under reflux conditions. The acidity of the material produced is higher than that of amorphous mesoporous materials obtained from non-zeolitic silica and alumina sources. Where the synthesis mixture is hydrothermally treated for a longer period of time (from about 12 hours to about 2 weeks) a zeolitic mesostructure is obtained. By adjusting the synthesis conditions (e.g., pH, time, temperature, zeolite type, surfactant concentration) different zeolite nanostructures (e.g., nanotubes, nanorings, nanorods, nanowires, nanoslabs, nanofibers, nanodiscs, etc.) can be produced. Referring again to FIG. 1C, a nanostructure including, for example, nanorods is made from adjacent members (e.g., a first nanorod adjacent a second nanorod). Voids can be formed between adjacent members (e.g., adjacent nanorods). Each nanostructure member defines a plurality of pores (e.g., each nanorod has pores in its structure). Different members can join together within a single nanostructure, for example, a nanorod may be adjacent a nanoring.

Zeolitic nanorods ("ZNRs") have been prepared by this approach in three steps: (i) basic treatment of a zeolite in a pH controlled medium to partially dissolve the zeolite and produce a suspension of amorphous aluminosilicate, (ii) pH adjustment and surfactant addition to produce MCM-41, and (iii) hydrothermal treatment of the resulting solid at a temperature typically ranging from about 100 to about 200° C. for from about 12 hours to about 2 weeks. During the last step, the MCM-41 (the hexagonal pore arrangement) mesostructure is first transformed to MCM-48 (the cubic pore arrangement) and is then transformed to MCM-50 (the lamellar pore arrangement), while the amorphous pore walls are transformed to a crystalline zeolitic phase. MCM-50 is a lamellar structure and is a precursor to zeolitic nanostructures including, for example, nanotubes, nanorings, nanorods, nanowires, nanoslabs, etc. The specific nanostructure formed by using steps (i)-(iii) is determined by the selected zeolite, surfactant, temperature, time, and pH. The zeolite and other conditions can be selected to achieve a single nanostructure shape (e.g., all nanorod) or, alternatively, multiple nanostructure shapes. Without being bound to any single theory, it appears that nanostructures are achieved, at least in part, because the zeolite dissolved by a pH controlled solution into a suspension of amorphous aluminosilicate retains some degree of the zeolitic connectivity that is characteristic of a zeolite starting material. It is expected that some of the IR spectra bands characteristic of zeolites remain present in the dissolved solution (i.e., in the suspension of amorphous aluminosilicate). In contrast, if, rather than dissolving a zeolite to produce a suspension of amorphous aluminosilicate, an alumina, a silica, or an amorphous aluminosilicate were exposed to steps (ii)-(iii), described above, the nanostructure fails to form. The building blocks of connectivity present in dissolved zeolite solution appear to play a part in forming nanostructures.

Although the nanostructures are crystalline they are not fully crystalline. They have a few units in one direction and are semi crystalline or are polycrystalline. Semi crystalline and polycrystalline refer to, for example, nanosized crystals, crystal nuclei, or crystallites that, for example, aggregate to form a solid. Unit cells are the simplest repeating unit in a crystalline structure or crystalline material. Nanostructures have an open structure. They have a high surface area due to an extended structure in the space as well as due to spaces between multiple structures or voids within the structures themselves. Generally, these nanostructures also have a high external surface area. In one embodiment, one nanostructure is adjacent another nanostructure. FIG. 1C depicts a TEM image of a nanosostructured zeolite where the nanostructure shape includes nanorods. The nanorods have a thickness measuring about 5 nm. As depicted, the nanorods sit adjacent one another and the nanorods curve. The background of the curved rods seen in the TEM image is noise and it should be ignored.

Applications

The unique structure of mesostructured zeolites will be useful to a variety of fields, and should address certain limitations associated with conventional zeolites. As catalysis is an important field of application for zeolites, special emphasis is placed on the catalytic applications of mesostructured zeolites.

The combination of a mesostructure, a high surface-area, and controlled pore or interior thickness as measured between adjacent mesopores should provide for access to bulky molecules and reduce the intracrystalline diffusion barriers. Thus, enhanced catalytic activity for bulky molecules should be observed over mesostructured zeolites, as compared to conventional zeolites. See FIGS. 13-14. The subject matter of FIGS. 13-20a involves reactions with 1,3,5-triisopropylbenzene being catalytically cracked to form 1,3-diisopropyl benzene. The 1,3,5-triisopropylbenzene is representative of molecules present in crude oil and 1,3-diisopropyl benzene is representative of a product within the gasoline range. These experiments are a surrogate for molecules present in crude oil that are cracked to form gasoline.

FIG. 13 depicts the process of catalytic cracking of 1,3,5-triisopropyl benzene by zeolite H—Y. Catalytic cracking is selectivity and/or efficiency limited, because diffusion is limited by the small pore size of the zeolite H—Y. Because the conventional unconverted zeolite crystal has limited diffusion, it is difficult for the initial reaction product (e.g., 1,3-diisopropyl benzene) to exit the zeolite. As a result, over cracking occurs and light compounds are formed resulting in excess formation of undesirable products, such as cumene, benzene, and coke. FIG. 14 depicts the process of catalytic cracking of 1,3,5-triisopropyl benzene by a mesostructured zeolite. In contrast to catalytic cracking with the unmodified conventional zeolite H—Y, the larger pore size, the controlled mesopore volume, and the controlled interior or pore wall thickness present in the fully crystalline mesostructured zeolite facilitates the exit of desired products (i.e., 1,3-diisopropyl benzene) from the mesostructure, and over cracking that produces cumene, benzene, and coke is avoided. As a result, there is a higher conversion of the desired product, 1,3-diisopropyl benzene.

Acid catalysts with well-defined ultra-large pores are highly desirable for many applications, especially for catalytic cracking of the gas oil fraction of petroleum, whereby slight improvements in catalytic activity or selectivity would translate to significant economic benefits. As a test reaction, we have examined the catalytic cracking of 1,3,5-triisopropylbenzene (critical dimension 0.95 nm) to produce 1,3-diisopropyl benzene. FIG. 15 depicts catalytic activity for 1,3,5-triisopropyl benzene cracking shown as percent conversion to 1,3-diisopropyl benzene vs. time for the mesostructured zeolite H—Y[MCM-41], which is labeled Meso-HY, the zeolite H—Y, and a conventional Al-MCM-41. Catalytic cracking was performed when 50 mL/min of He saturated with 1,3,5-triisopropylbenzene at 120° C. was flowed at 200° C. over 50 mg of each catalyst. The H—Y[MCM-41] mesostructured zeolite demonstrated superior catalytic activity for this cracking reaction after 400 minutes at 200° C. (93% conversion) compared to the H—Y zeolite (71% conversion) and the mesoporous Al-MCM-41 (39% conversion) (see FIG. 15). This result was attributed to its combination of strong acidity and mesostructured nature. The mesopores and the mesostructure surrounding the mesopores greatly facilitated the hydrocarbon diffusion within the H—Y[MCM-41] catalyst thereby improving conversion. The H—Y[MCM-41] mesostructured zeolite is stable and maintains mesostructure integrity even under harsh conditions. FIG. 17 depicts the hydrothermal stability of H—Y[MCM-41], labeled Meso-HY, compared to the non-mesolytic zeolite Al-MCM-41. For example, the boiled mesostructured zeolite H—Y[MCM-41], labeled Meso-HY, also maintained its physicochemical integrity even after being boiled for several days, exhibiting a high 1,3,5-triisopropylbenzene activity (87% conversion to 1,3-diisopropyl benzene after 400 minutes) even after such severe treatment. The term boiled is used for convenience; however, the specific treatment to the material includes suspending the solid in water and heating the water and solid material under reflux conditions. See FIG. 17. This outcome illustrates the superior hydrothermal stability of H—Y [MCM-41] over the amorphous Al-MCM-41 catalyst, which lost its activity and ordered mesostructure after exposure to similar conditions. These results show that hydrothermally stable H—Y[MCM-41] is a crystalline material and its crystallinity contrasts the amorphous Al-MCM-41 catalyst that structurally collapsed after boiling, rendering it unable to convert appreciable quantities via catalytic cracking.

FIG. 19 depicts catalytic activity for 1,3,5-triisopropyl benzene cracking shown as percent conversion vs. time for H-ZSM-5[MCM-41], labeled Meso-H-ZSM-5, and its zeolitic version, H-ZSM-5. A 50 mL/min He flow saturated with 1,3,5-triisopropylbenzene at 120° C. was flowed at 200° C. over 50 mg of each catalyst, H-ZSM-5[MCM-41] and H-ZSM-5. H-ZSM-5 is used as an important additive in cracking catalysts to increase propylene production and improve octane number in gasoline. However, due to its small pores, H-ZSM-5 is inactive in 1,3,5-triisopropylbenzene cracking at 200° C. (<1% conversion to 1,3-diisopropyl benzene after 400 min). The incorporation of MCM-41 mesostructure in this zeolite (H-ZSM-5[MCM-41]) successfully achieved substantial activity, with 40% conversion of 1,3,5-triisopropylbenzene to 1,3-diisopropyl benzene after 400 min (see FIG. 19). In this case, the activity was attributed to the mesopores and strong acidity of the mesostructured zeolite.

More than 135 different zeolitic structures have been reported to date, but only about a dozen of them have commercial applications, mostly the zeolites with 3-D (3-dimensional) pore structures. The incorporation of 3-D mesopores may be beneficial for zeolites with 1-D and 2-D pore structures as it would greatly facilitate intracrystalline diffusion. Zeolites with 1-D and 2-D pore structures are not widely used, because the pore structure is less then optimal. To illustrate the potential of mesostructure processing of zeolites with low pore interconnectivity, H-MOR with 1-D pores were prepared with an MCM-48 mesostructure by exposing the H-MOR zeolite with 1-D pores to a pH controlled solution in the presence of a surfactant under suitable time and temperature conditions, described above. The resulting H-MOR [MCM-48] with 3-D mesostructured structures was examined for the catalytic cracking of 1,3,5-triisopropylbenzene at 200° C. FIG. 18 depicts catalytic activity for 1,3,5-triisopropyl benzene cracking shown as conversion to 1,3-diisopropyl benzene vs. time for H-MOR[MCM-48] labeled Meso-HMOR, and its zeolitic version, H-MOR. A 50 mL/min He flow saturated with 1,3,5-triisopropylbenzene at 120° C. was flowed at 200° C. over 50 mg of each catalyst, H-MOR [MCM-48] and H-MOR. Catalytic cracking with H-MOR [MCM-48] exhibited 50% conversion after 400 minutes, which was significantly higher compared to the 7% conversion achieved by H-MOR (see FIG. 18). Zeolites with 1-D pore structures show a more dramatic improvement when exposed to the mesostructure process as compared to the zeolites with 2-D pore structures, but this is to be expected because the 1-D pore structure zeolites begin with provide more limited diffusion. When exposed to the mesostructure process, zeolites with 2-D pore structures result in 3-D mesostructures. Exposing 1-D and 2-D pore structure zeolites to the instant process for forming mesostructures in fully crystalline inorganic material may increase the usefulness of these otherwise underused zeolites.

Mesostructured zeolites not only showed much higher catalytic activity, but also enhanced selectivity over zeolites. Referring now to FIG. 16, a commercially available zeolite H—Y was employed to catalytically crack 1,3,5-triisopropylbenzene. The resulting products were 1,3-diisopropyl benzene, benzene, and cumene and the fractional composition results were normalized to be 100%. The mesostructured zeolite, labeled Meso-HY, which is H—Y[MCM-41], was employed to catalytically crack 1,3,5-triisopropylbenzene under identical conditions employed with H—Y. Increased production of 1,3-diisopropyl benzene (about 110% of the 1,3-diisopropyl benzene produced with the zeolite H—Y) and decreased production of benzene and cumene (about 75% of the benzene and cumene produced with the zeolite H—Y) was observed. In this example, H—Y[MCM-41] mesostructured zeolite produced only 75% of the benzene generated by the H—Y zeolite. See FIG. 16. Benzene is a toxic compound whose presence in gasoline is being increasingly restricted by legislation. The benzene production was even lower in the case of H-MOR[MCM-48], and was minimal in the case of H-ZSM-5[MCM-41]. The decrease in benzene production has been observed in small zeolite crystals, and was related to the intrinsic ability of crystals with higher surface areas to limit successive cracking reactions. It also reduced the formation of coke, which is an undesired end-product of the cracking process that can be responsible for catalyst deactivation. Thus, the mesostructured zeolites not only provided for higher catalytic activity and selectivity, but also longer catalyst life time.

Zeolitic nanorods another form of mesostructured zeolite, also enhance catalytic activity by increasing active-site accessibility. The rod-shape ZNRs are only nanometer-sized in diameter, so internal diffusional resistance is minimal. These new mesostructured zeolites (also referred to as nanostructures) were tested as cracking catalysts for the gas oil fraction of petroleum to assess their potential. FIG. 20a depicts, on the left-hand side Y axis, the percent conversion of 1,3,5-triisopropylbenzene to 1,3-diisopropyl benzene versus time for H-MOR[ZNR] and H-MOR. The ratio of benzene produced by H-MOR-to-benzene produced by H-MOR[ZNR] as a function of time is also shown on the secondary Y axis located on the right-hand side of FIG. 20a, and an arrow is present on the line that connects this data. A helium flow of 50 mL/min saturated with 1,3,5-triisopropylbenzene at 120° C. was introduced over 50 mg of each catalyst, H-MOR[ZNR] and H-MOR, at 200° C.

In the cracking of 1,3,5-triisopropylbenzene, the conventional H-MOR zeolite showed a low activity (7% conversion to 1,3-diisopropyl benzene after 400 min) due to its medium-sized (0.65 to 0.70 nm), 1-D pores. In contrast, H-MOR [ZNR] achieved a much higher catalytic activity under similar conditions (52% conversion to 1,3-diisopropyl benzene) (see FIG. 20a). This significant increase in catalytic activity was attributed to ZNRs' higher surface areas, readily accessible active sites, and improved intracrystalline diffusivity.

Besides increased activity, ZNRs also showed improved selectivity due to their nanostructured rod-shape morphology. For example, H-MOR[ZNR] produced 3 times less benzene per mole of 1,3,5-triisopropylbenzene converted as compared to the commercial zeolite H-MOR (see the secondary Y axis on the right-hand side of FIG. 20a). Benzene may include, for example, benzene derivatives such as, for example, toluene, xylene, and other related derivative compounds. This significant increase in selectivity also helped to reduce coke formation, which has been a major problem with conventional cracking catalysts, especially those containing 1-D pores, such as mordenite.

The simple, inexpensive, and generalized synthesis strategies described herein allow for the preparation of ZNR, a crystalline material with walls that are only several nanometers thick (e.g., 3-20 nm), in which nanorings and junctions are common. The novel synthesis strategies were based on the "programmed" zeolitic transformation of mesoporous materials, which avoided the typical drawbacks of nanoscaled zeolite synthesis (e.g., low yield, difficulty in separation, and high pressure drops) and did not require the use of a layered precursor. The unique crystalline structure of ZNRs provided for improved catalytic conversion of bulky molecules by increasing the accessibility to its microporosity, while reducing interparticle and intraparticle diffusion barriers.

Referring now to FIGS. 20b and 20c, mesostructured zeolites were tested for crude oil refining via Microactivity Test ("MAT;" ASTM D-3907). This is a well known and widely accepted technique to estimate the performance of fluid catalytic cracking ("FCC") catalysts. Vacuum gas-oil was used as feed in a fluid-bed stainless steel reactor. The experiments were conducted under identical conditions with mesostructured zeolites and their conventional zeolites counterparts.

FIG. 20b depicts MAT results of a conventional fully crystalline zeolite H—Y (Si/Al~15) and its fully crystalline mesostructured version H—Y[MCM-41]. MAT conditions included a reaction temperature of 500° C., a catalyst contact time of 60 seconds, a catalyst charge of 1 gram, a catalyst/vacuum gas oil ratio of 2, and a WHSV of 30 g/h/g. The conversion (i.e., how much of the vacuum gas oil feed was converted into product), with all yield normalized to 100% for comparison purposes, for the unmodified fully crystalline zeolite H—Y was 61.22%, and for the fully crystalline mesostructured zeolite H—Y[MCM-41] was 67.20%. Although not depicted in FIG. 20b, the results of this test provided liquid petroleum gases ("LPG") fraction of H—Y of 17.45% and LPG fraction of H—Y[MCM-41] of 15.27%.

FIG. 20c depicts the composition of the LPG fraction obtained by MAT of a conventional fully crystalline zeolite H—Y (Si/Al~15) and its fully crystalline mesostructured version H—Y[MCM-41], described above in conjunction with FIG. 20b. The composition of the LPG fraction was analyzed to determine the components of the LPG fraction. Where the fully crystalline zeolite H—Y was used, the LPG fraction was 17.45%. Where the fully crystalline mesostructured zeolite HY[MCM-41] was used, the LPG fraction was 15.27%. In addition, the fully crystalline mesostructured zeolites produced more olefins, which are desired products. Referring now to the X-axis on FIG. 20c, the label C3 indicates propane, the label C3=indicates propene, the label i-C4 indicates isobutane, the label n-C4 indicates normal butane, the label i-C4=indicates isobutene, and the label n-C4=indicates normal butene. Specifically, the fully crystalline mesostructured zeolite produced increased propene, isobutene, and normal butene in the LPG fraction as compared to the unmodified fully crystalline zeolite. Further, the fully crystalline mesostructured zeolite produced a lesser fraction of LPG than with its counterpart conventional unmodified fully crystalline zeolite. The internal wall thickness of the fully crystalline mesostructured zeolite is less than the internal wall thickness of the unmodified fully crystalline zeolite. Thus the thinner internal walls in the fully crystalline mesostructured zeolites reduced hydrogen transfer reactions, which are responsible for the undesired conversion of olefins to paraffins. Accordingly, an increased number of desired olefins are produced where fully crystalline mesostructured zeolites are used instead of conventional unmodified fully crystalline zeolites.

In the MAT, generally, the samples were displayed in a fluidized-bed stainless steel reactor. Reaction temperature was 500° C., the amount of catalyst was 3.0 g, the catalyst/oil ratio was 2.0, the WHSV was 30 g/h/g, and the contact time was 60 seconds. These tests showed that using H—Y[MCM-41] in place of conventional H—Y resulted in a 43% increase in gasoline production, a 75% increase in propylene and a 110% increase in butenes. Additionally, there is a 32% decrease in coke formation, a 23% decrease in total dry gas, and a 12% decrease in LPG. The presence of mesopores in the H—Y[MCM-41], which has at least double the surface area of H—Y, favors the cracking of the larger molecules present in the crude oil, which cannot be transformed within the micropores of conventional zeolites. Typically, conventional zeolites have pores measuring about 0.7 nm, which are too small to efficiently process desirable products, for example, alkyl benzene, contained in heavy crude oil fractions. Larger pore sizes are required to facilitate improved surface area contact (including within the pore walls or mesopore surfaces) with the hydrocarbon materials. For comparison, the diameter of each of the mesopores, which are surrounded by the mesopore surfaces of the fully crystalline mesostructure of the invention, can measure, e.g., about 2 nm. The increased production of light olefins was related to the reduction of hydrogen transfer reaction due to the presence of favorable interior or pore wall thickness in the fully crystalline mesostructured zeolites (e.g., ~2 nm) as opposed to the thick crystals of conventional zeolites (e.g., ~1000 nm). This interior or pore wall thickness also results in reduction of over-cracking, significantly reduces coke formation, and reduces production of total dry gas and LPG.

Pyrolysis of plastics has gained renewed attention due to the possibility of converting these abundant waste products into valuable chemicals while also producing energy. Acidic catalysts, such as zeolites, have been shown to be able to reduce significantly the decomposition temperature of plastics and to control the range of products generated. However, the accessibility of the bulky molecules produced during plastic degradation has been severely limited by the micropores of zeolites.

The catalytic degradation of polyethylene ("PE") by commercially available zeolites and their corresponding mesostructured zeolites was studied by thermal gravimetric analysis ("TGA"). FIG. 21 depicts the percentage of polyethylene weight lost vs. temperature for the following mixtures of catalysts in weight ratio to PE. The curves labeled (A)-(G) depict results of the following degradation curves: (A): no catalyst, (B): H-ZSM-5:PE, 1:2; (C): H-ZSM-5[MCM-41]: PE, 1:2; (D): H-ZSM-5:PE, 1:1; (E) H-ZSM-5:PE, 2:1; (F): H-ZSM-5[MCM-41]:PE, 1:1; and (G) H-ZSM-5[MCM-41]: PE, 2:1. In all cases, fully crystalline mesostructured zeolites allow for reduced decomposition temperatures compared to unmodified commercial zeolites (by ~35° C. in the case of (C) H-ZSM-5[MCM-41] vs. (B) H-ZSM-5), even at high catalyst:PE ratios (see FIG. 21). In fact, referring to the curve labeled (F), with an H-ZSM-5[MCM-41]:PE weight ratio of 1:1, a lower decomposition temperature was achieved compared to that required by referring to curve labeled (E), a ZSM-5:PE weight ratio of 2:1.

With their improved accessibility and diffusivity compared to conventional zeolites, fully crystalline mesostructured zeolites may also be employed in place of unmodified conventional zeolites in other applications, such as gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, pollution remediation, etc. Many of these applications suffer currently from limitations associated with the small pores of zeolites, especially when bulky molecules are involved. Mesostructured zeolites present attractive benefits over zeolites in such applications.

Organic dye and pollutant removal from water is of major environmental importance, and represents the third major use of zeolites (accounting for 80 tons of zeolites per year). However, most of the organic dyes are bulky, which make their removal slow or incomplete, requiring a huge excess of zeolites in the process. Fully crystalline mesostructured zeolites offer significant advantage over unmodified conventional zeolites in organic dye and pollutant removal with their larger surface area and pore size.

Application in Petrochemical Processing

The mesostructured materials can have one or more of controlled pore volume, controlled pore size (e.g., cross sectional area and/or diameter), and controlled pore shape. Hydrocarbon reactions, including petrochemical processing, are mass-transfer limited. Accordingly, a fully crystalline mesostructured catalyst with controlled pore volume, pore size, and/or pore shape can facilitate transport of the reactants to and within active catalyst sites within the fully crystalline mesostructured catalyst and transport the products of the reaction out of the catalyst. Fully crystalline mesostructured inorganic materials, for example, zeolites, enable processing of very large or bulky molecules, with dimensions of, for example, from about 2 to about 60 nm, from about 5 to about 50 nm, and from about 30 to about 60 nm.

Hydrocarbon and/or petrochemical feed materials that can be processed with the mesostructured materials (e.g., fully crystalline mesostructured zeolitic materials) and/or the crystalline nanostructure materials include, for example, a gas oil (e.g., light, medium, or heavy gas oil) with or without the addition of resids. The feed material can include thermal oils, residual oils, (e.g., atmospheric tower bottoms ("ATB"), heavy gas oil ("HGO"), vacuum gas oil ("VGO"), and vacuum tower bottoms ("VTB")), cycle stocks, whole top crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy and/or sour and/or metal-laden crude oils, and waxy materials, including, but not limited to, waxes produced by Fischer-Tropsch synthesis of hydrocarbons from synthesis gas. Hydrotreated feedstocks derived from any of the above described feed materials may also be processed by using the fully crystalline mesostructured zeolitic materials and/or the crystalline nanostructure materials.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (indole, carbazole), basic N-compounds (pyridine, quinoline, acridine, phenenthridine), and weakly basic N-compounds (hydroxipyridine and hydroxiquinoline) and their substituted H-, alkyl-, phenyl- and naphthyl-substituted derivatives, many of which are large, bulky materials. Sulfur and nitrogen species are removed for production of clean fuels and resids or deeper cut gas oils with high metals content can also be processed using the mesostructured materials and/or the crystalline nanostructure materials described herein.

In various embodiments, the mesostructured material and/or the crystalline nanostructured material can be employed in chemical processing operations including, for example, catalytic cracking, fluidized catalytic cracking, hydrogenation, hydrosulfurization, hydrocracking, hydroisomerization, oligomerization, alkylation, or any of these in combination. Any of these chemical processing operations may be employed to produce, for example, a petrochemical product by reacting a petrochemical feed material with the mesostructured material and/or the crystalline nanostructured materials described herein.

In various embodiments, the mesostructured material and/or the crystalline nanostructured material can be used as an additive to other catalysts and/or other separation materials including, for example, a membrane, an adsorbent, a filter, an ion exchange column, an ion exchange membrane, or an ion exchange filter.

In various embodiments, the mesostructured material and/or the crystalline nanostructured material can be used alone or in combination as an additive to a catalyst. The mesostructured material and/or the crystalline nanostructured material can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydroisomerization, oligomerization, alkylation, or any of these in combination. For example, the addition of small amounts of fully crystalline mesostructured zeolites and/or crystalline nanostructured zeolites to conventional commercially available FCC catalysts allows for improvement in the catalytic performance.

Generally, FCC uses an FCC catalyst, which is typically a fine powder with a particle size of about 10 to 200 microns. The FCC catalyst can be suspended in the feed and propelled upward into a reaction zone. A relatively heavy hydrocarbon or petrochemical feedstock (e.g., a gas oil) can be mixed with the FCC catalyst to provide a fluidized suspension. The feed stock can be cracked in an elongated reactor, or riser, at elevated temperatures to provide a mixture of petrochemical products that are lighter hydrocarbon products than were provided in the feed stock. Gaseous reaction products and spent catalyst are discharged from the riser into a separator where they can be regenerated. Typical FCC conversion conditions employing FCC catalysts include a riser top temperature of about 500 to about 595° C., a catalyst/oil weight ratio of about 3 to about 12, and a catalyst residence time of about 0.5 to about 15 seconds. The higher activity of the mesostructured catalysts and/or the crystalline nanostructure catalyst can enable less severe processing conditions, such as, for example, lower temperature, lower catalyst to oil ratios, and/or lower contact time.

In various embodiments, a small amount of mesostructured material (e.g., fully crystalline mesostructured zeolites) and/or crystalline nanostructured material blended with conventional FCC catalysts can enable pre-cracking of the bulkier molecules by the mesostructured material and/or crystalline nanostructured material contained in the blend. Conventional FCC catalysts have pore sizes too small to accommodate bulkier molecules. After the bulkier molecules have been pre-cracked they are processed in the small pores of the conventional FCC catalyst.

FIG. 23 depicts MAT yield results where a fully crystalline mesostructured zeolite H—Y[MCM-41] was employed as an additive to a conventional unmodified zeolite H—Y for fluid catalytic cracking of a vacuum gas oil. The results from left to right on the x-axis show 100% H—Y with no additive, 10% H—Y[MCM-41] additive to the catalyst, 20% H—Y[MCM-41] additive to the catalyst, 50% H—Y[MCM-41] additive to the catalyst, and 100% H—Y[MCM-41]. MAT conditions include a reaction temperature of 500° C., catalyst contact time of 60 seconds, a catalyst charge of 1 gram, a catalyst-to-vacuum gas oil ratio of 2, and a WHSV of 30 g/h/g. In FIG. 23, the bar labeled LCO shows the yield of light cycle oil and the bar labeled HCO shows the yield of fractions heavier than gasoline.

Referring still to FIG. 23, the addition of the fully crystalline mesostructured zeolite to the conventional FCC catalyst produced a significant impact over the yield structure that does not correspond to the linear combination of both materials. The data suggests the pre-cracking effect of a fully crystalline mesostructured zeolite additive to a catalyst. A significant conversion improvement in the heavier fractions ("HCO") was obtained at 10% fully crystalline mesostructured zeolite. The incremental amounts of fully crystalline mesostructured zeolites, 20% and 50%, does not produce an increase in gasoline production or conversion, and does not decrease the HCO as compared to the 10% additive quantity. This data supports the pre-cracking effect of the fully crystalline mesostructured zeolite additive. The higher amount of total dry gas, LPG, and coke produced when fully crystalline mesostructured zeolites as used as FCC additives may be due to the higher conversion obtained when the fully crystalline zeolite materials were employed. A similar pre-cracking effect can be expected where a crystalline nanostructure zeolite is employed as an additive.

In various embodiments, mesostructured materials (e.g., fully crystalline mesostructured zeolites) and/or crystalline nanostructure materials can be blended with conventional catalysts. The additive mesostructured materials and/or crystalline nanostructure materials can be incorporated into the conventional catalyst pellet. Shaped (e.g., pelletized) mesostructured materials and/or crystalline nanostructure materials can be mixed with the catalyst pellet. Alternatively, a conventional catalyst and the mesostructured and/or nanostructured materials can be layered together. Any such mixture can be used in a refining application, for example, in fluidized catalytic cracking directly as is done with other additives. The amount of mesostructured zeolite added and the manner by which it is blended can be used to tune the yield and/or the structure of the products.

In one or more embodiments, the addition of or incorporation of mesostructured materials (e.g., fully crystalline mesostructured zeolites) and/or crystalline nanostructured materials to conventional commercially available Thermofor Catalytic Cracking ("TCC") catalysts provides an improvement in the catalytic performance. The TCC process is a moving bed process that uses pellet or bead shaped conventional catalysts having an average particle size of about one-sixty-fourth to one-fourth inch. Hot catalyst beads progress with a hydrocarbon or petrochemical feed stock downwardly through a cracking reaction zone. The hydrocarbon products are separated from the spent catalyst and recovered. The catalyst is recovered at the lower end of the zone and recycled (e.g., regenerated). Typically, TCC conversion conditions include an average reactor temperature from about 450 to about 510° C., a catalyst/oil volume ratio of from about 2 to about 7, and a reactor space velocity of from about 1 to about 2.5 vol/hr/vol. Mesostructured materials and/or crystalline nanostructured materials can be substituted for TCC catalysts to improve the catalytic cracking of petrochemical or hydrocarbon feed stocks to petroleum product. Alternatively, the mesostructured materials and/or crystalline nanostructured materials can be blended with the TCC catalyst.

In various embodiments, mesostructured materials (e.g., fully crystalline mesostructured zeolites) and/or crystalline nanostructured materials can be used as catalyst additives in any other catalytic application. For example, they may be used as additives in processes where bulky molecules must be processed.

In other various embodiments, mesostructured materials (e.g., fully crystalline mesostructured zeolites) and/or crystalline nanostructured materials can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesostructured materials using surface modification methods, for example, ion exchange, described herein. The hydrogenation catalytic activity of mesostructured materials modified to support various metals (e.g., doped with metals) shows a higher hydrogenation activity for bulky aromatic compounds as compared to other conventional materials, for example, metal supported on alumina, silica, metal oxides, MCM-41, and conventional zeolites. The mesostructured materials modified to support various metals also show, compared to conventional materials, a higher tolerance to sulfur, for example, sulfur added as thiophene and dibenzothiophene, which are common bulky components of crude oil that often end up in gas oil fractions.

In other various embodiments, mesostructured materials (e.g., fully crystalline mesostructured zeolites) and/or crystalline nanostructured materials can be used in hydrodesulfurization ("HDS"), including, for example, deep HDS, hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feed stocks such as, for example, $H_2S$. Deep HDS is currently done with active metal sulfides on alumina, silica/alumina, and alumina/zeolite.

Generally, during HDS the feed stock is reacted with hydrogen in the presence of an HDS catalyst. Oxygen and any sulfur and nitrogen present in the feed is reduced to low levels. Aromatics and olefins are also reduced. The HDS reaction conditions are selected to minimize cracking reactions, which reduce the yield of the most desulfided fuel product. Hydrotreating conditions typically include a reaction temperature from about 400 to about 900° F., a pressure between 500 to 5,000 psig, a feed rate (LHSV) of 0.5 $hr^{-1}$ to 20 $hr^{-1}$ (v/v), and overall hydrogen consumption of 300 to 2,000 scf per barrel of liquid hydrocarbon feed (53.4-356 $m^3$ $H_2$/$m^3$ feed).

Suitable active metal sulfides include, for example, Ni and Co/Mo sulfides. Zeolites provide strong acidity, which improves HDS of refractory sulfur species through methyl group migration. Zeolites also enhance the hydrogenation of neighboring aromatic rings. Zeolite acidity enhances the liberation of $H_2S$ from the metal sulfide increasing the tolerance of the catalyst to inhibitors. However, bulky methylated polyaromatic sulfur species are not able to access the acidic sites of conventional zeolites. In contrast, the controlled mesoporosity and strong acidity of fully crystalline mesostructured zeolites provide accessibility to the acidic sites and acidity that allows for the deeper HDS required for meeting future environmental restrictions.

In other various embodiments, mesostructured materials (e.g., fully crystalline mesostructured zeolites) and/or crystalline nanostructured materials can be used in hydrocracking. Metals, including noble metals such as, for example, Ni, Co, W, and Mo, and metal compounds are commercially used in hydrocracking reactions. These metals can be supported on mesostructured materials by previously described methods. The mesostructured materials including metals can be employed for hydrocracking of various feedstocks such as, for example, petrochemical and hydrocarbon feed materials.

Typically, hydrocracking involves passing a feed stock (i.e., a feed material), such as the heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be effected by contacting the particular fraction or combination of fractions with hydrogen in the presence of a suitable catalyst at conditions, including temperatures in the range of from about 600 to about 900° F. and at pressures from about 200 to about 4,000 psia, using space velocities based on the hydrocarbon feedstock of about 0.1 to 10 $hr^{-1}$.

As compared to conventional unmodified catalyst supports such as, for example, alumina, silica, and zeolites, the mesostructured materials including metals allow for the hydrocracking of higher boiling point feed materials. The mesostructured materials including metals produce a low concentration of heteroatoms and a low concentration of aromatic compounds. The mesostructured materials including metals exhibit bifunctional activity. The metal, for example a noble metal, catalyzes the dissociative adsorption of hydrogen and the mesostructured material provides the acidity.

The controlled pore size and controlled mesopore surface in the mesostructured materials including metals can make the bifunctional activity more efficiently present in the mesostructured catalysts as compared to a bifunctional conventional catalyst. In addition to the zeolitic acidity present in the fully crystalline mesostructured zeolites, the controlled pore size enables larger pores that allow for a high dispersion of the metal phase and the processing of large hydrocarbons.

In other embodiments, mesostructured materials (e.g., fully crystalline mesostructured zeolites) and/or crystalline nanostructured materials can be used in hydroisomerization. Various metals and mixtures of metals, including, for example, noble metals such as nickel or molybdenum and combinations thereof in, for example, their acidic form, can be supported on mesostructured materials.

Typically, hydroisomerization is used to convert linear paraffins to branched paraffins in the presence of a catalyst and in a hydrogen-rich atmosphere. Hydroisomerization catalysts useful for isomerization processes are generally bifunctional catalysts that include a dehydrogenation/hydrogenation component and an acidic component. Paraffins were exposed to fully crystalline mesostructured zeolites including metals and were isomerized in a hydrogen flow at a temperature ranging from about 150 to about 350° C. thereby producing branched hydrocarbons and high octane products. The fully crystalline mesostructured zeolites including metals permit hydroisomerization of bulkier molecules than is possible with commercial conventional catalysts due, at least in part, to their controlled pore size and pore volume.

In other embodiments, mesostructured materials (e.g., fully crystalline mesostructured zeolites) and/or crystalline nanostructured materials can be used in the oligomerization of olefins. The controlled pore shape, pore size, and pore volume improves the selectivity properties of the mesostructured materials. The selectivity properties, the increased surface area present in the mesopore surfaces, and the more open structure of the mesostructured materials can be used to control the contact time of the reactants, reactions, and products inside the mesostructured materials. The olefin can contact the mesostructured materials at relatively low temperatures to produce mainly middle-distillate products via olefin-oligomerization reactions. By increasing the reaction temperature, gasoline can be produced as the primary fraction.

Where the mesostructured materials are used in FCC processes, the yield of olefins production can be increased relative to FCC with conventional zeolites. The increased yield of olefins can be reacted by oligomerization in an olefin-to-gasoline- and/or -diesel process, such as, for example, MOGD (Mobile Olefins to Gas and Diesel, a process to convert olefins to gas and diesel). In addition, olefins of more complex structure can be oligomerized using the mesostructured materials described herein.

The LPG fraction produced using mesostructured materials has a higher concentration of olefins compared to other catalysts, including, for example, various conventional FCC catalysts, zeolites, metals oxides, and clays under catalytic cracking conditions both in fixed bed and fluidized bed reactor conditions. The mesopore size of the mesostructured materials readily allows the cracked products to exit the mesostructured materials. Accordingly, hydrogen transfer reactions are reduced and the undesired transformation of olefins to paraffins in the LPG fraction is reduced. In addition, over-cracking and coke formation are limited, which increases the average life time of the catalyst.

The controlled pore size, pore volume, and mesopore surfaces provide an open structure in the mesostructured materials. This open structure reduces the hydrogen transfer reactions in the gasoline fraction and limits the undesired transformation of olefins and naphthenes into paraffins and aromatics. As a result, the octane number (both RON and MON) of the gasoline produced using the mesostructured materials is increased.

The acidity and the controlled mesoporosity present in the mesostructured materials can enable their use in alkylation reactions. Specifically, olefins and paraffins react in the presence of the mesostructured materials to produce highly branched octanes. The highly branched octane products readily exit the open structure of the fully crystalline mesostructured materials, thereby minimizing unwanted olefin oligomerization.

In other embodiments, the mesostructured materials (e.g., fully crystalline mesostructured zeolites) and/or crystalline nanostructured materials can be used to process a petrochemical feed material to petrochemical product by employing any of a number of shape selective petrochemical and/or hydrocarbon conversion processes. In one embodiment, a petrochemical feed can be contacted with the mesostructured material under reaction conditions suitable for dehydrogenating hydrocarbon compounds. Generally, such reaction conditions include, for example, a temperature of from about 300 to about 700° C., a pressure from about 0.1 to about 10 atm, and a WHSV from about 0.1 to about 20 $hr^{-1}$.

In other embodiments, a petrochemical feed can be contacted with the mesostructured materials (e.g., fully crystalline mesostructured zeolites) and/or crystalline nanostructured materials under reaction conditions suitable for converting paraffins to aromatics. Generally, such reaction conditions include, for example, a temperature of from about 300 to about 700° C., a pressure from about 0.1 to about 60 atm, a WHSV of from about 0.5 to about 400 $hr^{-1}$, and an $H_2/HC$ mole ratio of from about 0 to about 20.

In other embodiments, a petrochemical feed can be contacted with the mesostructured materials (e.g., fully crystalline mesostructured zeolites) and/or crystalline nanostructured materials under reaction conditions suitable for converting olefins to aromatics. Generally, such reaction conditions include, for example, a temperature of from about 100 to about 700° C., a pressure from about 0.1 to about 60 atm, a WHSV of from about 0.5 to about 400 hr$^{-1}$, and an H$_2$/HC mole ratio from about 0 to about 20.

In other embodiments, a petrochemical feed can be contacted with the mesostructured materials (e.g., fully crystalline mesostructured zeolites) and/or crystalline nanostructured materials under reaction conditions suitable for isomerizing alkyl aromatic feedstock components. Generally, such reaction conditions include, for example, a temperature of from about 230 to about 510° C., a pressure from about 3 to about 35 atm, a WHSV of from about 0.1 to about 200 hr$^{-1}$, and an H$_2$/HC mole ratio of from about 0 to about 100.

In other embodiments, a petrochemical feed can be contacted with the mesostructured materials (e.g., fully crystalline mesostructured zeolites) and/or crystalline nanostructured materials under reactions conditions suitable for disproportionating alkyl aromatic components. Generally, such reaction conditions include, for example, a temperature ranging from about 200 to about 760° C., a pressure ranging from about 1 to about 60 atm, and a WHSV of from about 0.08 to about 20 hr$^{-1}$.

In other embodiments, a petrochemical feed can be contacted with the mesostructured materials (e.g., fully crystalline mesostructured zeolites) and/or crystalline nanostructured materials under reaction conditions suitable for alkylating aromatic hydrocarbons (e.g., benzene and alkylbenzenes) in the presence of an alkylating agent (e.g., olefins, formaldehyde, alkyl halides and alcohols). Generally, such reaction conditions include a temperature of from about 250 to about 500° C., a pressure from about 1 to about 200 atm, a WHSV of from about 2 to about 2,000 hr$^{-1}$, and an aromatic hydrocarbon/alkylating agent mole ratio of from about 1/1 to about 20/1.

In other embodiments, a petrochemical feed can be contacted with the mesostructured materials (e.g., fully crystalline mesostructured zeolites) and/or crystalline nanostructured materials under reaction conditions suitable for transalkylating aromatic hydrocarbons in the presence of polyalkylaromatic hydrocarbons. Generally, such reaction conditions include, for example, a temperature of from about 340 to about 500° C., a pressure from about 1 to about 200 atm, a WHSV of from about 10 to about 1,000 hr$^{-1}$, and an aromatic hydrocarbon/polyalkylaromatic hydrocarbon mole ratio of from about 1/1 to about 16/1.

Generally, suitable conditions for a petrochemical or hydrocarbon feed to contact the mesostructured materials (e.g., fully crystalline mesostructured zeolites) and/or crystalline nanostructured materials include temperatures ranging from about 100 to about 760° C., pressures ranging from above 0 to about 3,000 prig, a WHSV of from about 0.08 to about 2,000 hr$^{-1}$, and a hydrocarbon compound mole ratio of from 0 to about 100.

Application in Compound Removal

The microporosity, mesoporosity, and ion exchange properties present in the mesostructured materials (e.g., fully crystalline mesostructured zeolites) and/or in crystalline nanostructured materials can enable removal of inorganic and organic compounds from solutions. Suitable solutions can be aqueous or organic solutions. Accordingly, the mesostructured materials (e.g., fully crystalline mesostructured zeolites) and/or crystalline nanostructured materials can be employed in water treatment, water purification, pollutant removal, and/or solvent drying.

For example, 1 gram of Na$^+$ and a fully crystalline mesostructured zeolite is suspended in 1 L of a methylene blue aqueous solution, stirred for 12 hours, and filtered. The fully crystalline mesostructured zeolite removes the methylene blue from the aqueous solution. Other configurations such as fixed bed, filters, and membranes can be also used in addition to the mesostructured materials (e.g., fully crystalline mesostructured zeolites) and/or crystalline nanostructured materials. Optionally, fully crystalline mesostructured zeolites and/or crystalline nanostructured zeolites can be employed as additives with conventional separation means, for example, fixed bed, filters, and membranes. The fully crystalline mesostructured zeolites and/or crystalline nanostructured zeolites can be substituted for other separation means in, for example, fixed bed, filters, and membranes. The fully crystalline mesostructured zeolites and/or crystalline nanostructured zeolites can be recycled by ion exchange, drying, calcinations or other conventional techniques and reused.

Application in Adsorption

The mesostructured materials (e.g., fully crystalline mesostructured zeolites) and/or crystalline nanostructured materials can be used to adsorb gaseous compounds including, for example, volatile organic compounds ("VOCs"), which are too bulky to be adsorbed by conventional unmodified zeolites. Accordingly, pollutants that are too bulky to be removed by conventional unmodified zeolites can be removed from a gaseous phase by direct adsorption. When the mesostructured or nanostructured material is a zeolite, the fully crystalline mesostructured zeolites and/or crystalline nanostructured zeolites can be employed for adsorption in various adsorption configurations such as, for example, membranes, filters and fixed beds. Adsorbed organic compounds can be desorbed from the fully crystalline mesostructured zeolites and/or crystalline nanostructured zeolites by heat treatment. Thus, the fully crystalline mesostructured zeolites and/or crystalline nanostructured zeolites can be recycled and then reused.

Application in Gas Separation

Fully crystalline mesostructured zeolites and/or crystalline nanostructured zeolites can be grown on various supports by employed techniques such as, for example, seeding, hydrothermal treatment, dip coating, and/or use of organic compounds. They can be physically mixed with conventional zeolites or metal oxides. Continuous layers of fully crystalline mesostructured zeolites and/or crystalline nanostructured zeolites can be used as membranes and/or catalytic membranes on, for example, porous supports.

Fully crystalline mesostructured zeolites and/or crystalline nanostructured zeolites are unique molecular sieves containing both microporosity and mesoporosity. They may be employed in various configurations including, for example, membranes for separation of gases based on physicochemical properties such as, for example, size, shape, chemical affinity, and physical properties.

Application in Fine Chemicals and Pharmaceuticals

A fully crystalline mesostructured zeolite has increased active site accessibility as compared to the same zeolite in conventional form. Similarly, crystalline nanostructure zeolites have increased active site accessibility compared to the same zeolite in conventional form. Accordingly, the activity of some important chemical reactions used in fine chemical and pharmaceutical production can be improved by substituting a conventional zeolite used in the process for a fully crystalline mesostructured zeolite and/or a crystalline nanostructure zeolite. In addition, a fully crystalline mesostructured zeolite and/or a crystalline nanostructure zeolite may be employed as an additive to a catalyst typically employed in such fine chemical and pharmaceutical production reactions. Suitable processes that can be improved by using a fully crystalline mesostructured zeolite and/or a crystalline nanostructure zeolite include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxyalylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

Application in Slow Release Systems

Chemicals and/or materials having useful properties such as, for example, drugs, pharmaceuticals, fine chemicals, optic, conducting, semiconducting magnetic materials, nanoparticles, or combinations thereof, can be introduced to mesostructured materials (e.g., fully crystalline mesostructured zeolites) and/or a crystalline nanostructured materials using one or more of the modifying methods described herein. For example, chemicals and/or materials may be incorporated into the mesostructured materials by, for example, adsorption or ion exchange. In addition, such useful chemicals can be combined with the mesostructured materials and/or crystalline nanostructure materials by creating a physical mixture, a chemical reaction, heat treatment, irradiation, ultrasonication, or any combination thereof.

The release of the chemicals and/or materials having useful properties can be controlled. Controlled release may take place in various systems such as, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation, and/or magnetic fields.

Kits

One or more embodiments also provide kits for conveniently and effectively implementing various methods described herein. Such kits can comprise any of the mesostructured and/or nanostructured materials (e.g., zeolitic structures) described herein, and a means for facilitating their use consistent with various methods. Such kits may provide a convenient and effective means for assuring that the methods are practiced in an effective manner. The compliance means of such kits may include any means that facilitate practicing one or more methods associated with the materials described herein. Such compliance means may include instructions, packaging, dispensing means, or combinations thereof. Kit components may be packaged for either manual or partially or wholly automated practice of the foregoing methods. In other embodiments involving kits, a kit is contemplated that includes block copolymers, and optionally instructions for their use.

Example

An example of a shaped zeolitic material was made as follows. Initially, a 30% solids slurry in water was made containing an insoluble portion comprising 62% by weight kaolin clay that had been calcined through its exotherm at about 1,780° F. without substantial formation of mullite (SATINTONE® 5HB, available from BASF) and 38% by weight hydrous kaolin clay (ASP-200, available from BASF); and a soluble portion consisting of sodium silicate solution (N®, available from PQ Corp.) in an amount where the silica in the sodium silicate was 8% of the combined weight of Satintone and ASP clays in the slurry. The resulting slurry was spray dried into microspheres having nominal diameters of between about 40 and 100 microns using a Stork-Bowen model BE-1240 spray dryer with an inlet temperature of about 400° C. and an outlet temperature of about 120° C. The resultant microspheres were calcined for between 2 and 4 hours at a temperature of between about 1,100 and 1,300° F. to dehydrate the hydrous kaolin constituent and convert it to the metakaolin phase.

Calcined microspheres were converted into zeolite-containing shaped articles by crystallization of sodium Y faujasite zeolite within the microspheres, as follows. Crystallization initiator (seeds) was prepared by adding, in order with mild stirring to a PYREX® glass beaker: 214.5 g of deionized water, 64.4 g of 50% sodium hydroxide solution, and 38.8 g of sodium aluminate solution containing 23.5% $Al_2O_2$ and 19.4% $Na_2O$. To that was added rapidly and with vigorous stirring, 256.0 g of sodium silicate solution (D™, available from PQ Corp.). The mixture was allowed to age for 20 hours at 37° C. The reaction was then quenched by adding sodium silicate solution comprising 194.6 g of D™ sodium silicate solution and 31.7 g of deionized water, and cooling to ambient temperature. To that mixture was added 800 g of N® sodium silicate solution. In a 1 liter PYREX® resin kettle, 229.2 g of quenched seeds were combined with 257.0 g of N® sodium silicate solution, 85.2 g of 50% sodium hydroxide solution, and 254.8 g of water. With mixing, to that was added 250 g of calcined microspheres, as prepared above, containing SATINTONE® 5HB calcined kaolin and metakaolin. With continued slow stirring to suspend the solids, the mixture was heated to about 210° F. and maintained at that temperature for 24 hours. After 24 hours, the material was filtered over Whatman 42 paper, washed with deionized water, and dried at 80° C. to produce zeolitic microspheres.

Samples of the zeolitic microspheres were analyzed by X-ray diffraction for crystallinity, zeolite unit cell size (an indirect measure of the $SiO_2/Al_2O_3$ ratio of the zeolite) and by argon adsorption to determine their pore size distribution. The results of the X-ray diffraction analysis are shown in Table 1 below. For comparison, results are also shown for CBV-100 zeolite, a high purity sodium Y faujasite produced by Zeolyst. The results show that the zeolitic microspheres contained about 64% by weight Y faujasite zeolite with a unit cell size and silica to alumina ratio equivalent to that of CBV-100.

Also included for comparison is FIG. 24, which presents the full X-ray diffraction scans for the two materials showing sharp, well defined peaks characteristic of well crystallized Y faujasite zeolite.

TABLE 1

| X-Ray Diffraction of Zeolitic Microspheres | | | |
|---|---|---|---|
| Material | Unit Cell Size | $SiO_2/Al_2O_3$ Ratio | Crystallinity |
| Zeolitic Microspheres | 24.673(1) | 5.17 | 64 |
| CBV-100 | 24.683(2) | 5.06 | 100 |

A portion of the zeolitic microspheres were processed as follows to impart mesoporosity into the shaped articles. 4.17 g of zeolitic microspheres were added to 15.0 mL of water (solution A). Then a solution (B) containing 0.96 g of citric acid dissolved in 5.76 mL of water was added dropwise, with stirring to solution A over 10 minutes. The resultant mixture (A+B) was stirred for an additional 1 hour at room temperature. The solid was separated from the mixture by filtration, washed with deionized water, and dried to produce acid-treated microspheres.

Additional mesoporosity was formed within the acid-treated microspheres as follows. 1.67 g of acid-treated microspheres was added to a solution (C) containing 0.50 g of cetyltrimethylammonium bromide ("CTAB") dissolved in 6.25 mL of water. Then 0.90 mL of concentrated (30%) ammonium hydroxide solution was added. The mixture was stirred for 10 minutes and then maintained overnight without stirring in a sealed vessel at 80° C. for 24 hours. The resultant solid was filtered, washed with deionized water, and dried. CTA entrained within the treated microspheres was removed by heat treatment, first in $N_2$ at 550° C. for 4 hours (degradation/carbonization) and then in synthetic air at 550° C. for 8 hours (burning).

The pore size distributions of the zeolitic microspheres both as-synthesized and after treatment to impart mesoporosity are shown in FIG. 25. The graph of FIG. 25 shows that the as-synthesized microspheres already contained a significant amount of mesoporosity at about 60 angstroms diameter. This is believed to be the result of alkaline extraction of silica from the kaolin clay that had been calcined through its exotherm, leaving an alumina-rich alkaline extraction residue of calcined clay. The metakaolin constituent of the precursor microspheres is believed to have been substantially consumed and converted to zeolite during the crystallization reaction. The volume of mesopores in the as-synthesized material was about 0.09 cc/g.

After treatment to impart additional mesoporosity, there were 2 distinct changes in the pore structure of the material. First, the material no longer exhibited mesopores in the range around 60 Å diameter. Instead, it showed mesopores at around 40 Å diameter, and the volume of mesopores was nearly doubled to about 0.17 cc/g.

The X-ray diffraction pattern of the zeolitic microspheres with additional mesoporosity (mesoporous in situ FCC) is shown in FIG. 26, along with the diffraction patterns of untreated zeolitic microspheres (in situ FCC) and a reference ultrastabilized Y zeolite ("USY"). The graph of FIG. 26 shows that, except for a slight reduction in peak intensity consistent with the lower microporosity of the mesoporous microspheres relative to the untreated zeolitic microspheres, the patterns are the same. This indicates that there were no other crystalline phases produced during the processing to impart additional mesoporosity to the zeolitic microspheres. Also, there is no "amorphous hump" in the range of about 10 to 25 degrees 2 theta for the mesoporous microspheres, indicating that there was no substantial formation of non-crystalline material due to the processing to impart additional mesoporosity.

Shown in FIGS. 27a-e are a series of scanning electron photomicrographs at increasing magnification showing the zeolitic microspheres having additional mesoporosity. They illustrate the generally spherical shape of the microspheres that is substantially retained after processing to impart additional mesoporosity, and that the microspheres are comprised of a multiplicity of separate particles aggregated into porous shapes. Individual zeolite crystals may be seen most clearly in the photomicrograph at 20,000× (FIG. 27e). They are the angular structures with an average size of about 0.1-0.4 micrometers (μm).

FIG. 28 displays transmission electron photomicrographs of an individual zeolite crystal within a zeolitic microsphere having additional mesoporosity (in situ FCC catalyst). They show areas with the regular grid structure of micropores that is characteristic of crystalline zeolite Y faujasite, and also show regions having a combination of the regular grid structure and larger, less ordered pores of a larger size (mesopores). This illustrates that at least a portion of the additional mesoporosity was located within crystalline zeolite (i.e., zeolite intracrystalline mesoporosity).

Selected Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

The term "catalyst" is art-recognized and refers to any substance that notably affects the rate of a chemical reaction without itself being consumed or significantly altered.

The term "cracking" is art-recognized and refers to any process of breaking up organic compounds into smaller molecules.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

The term "including" is used to mean "including but not limited to." "Including" and "including but not limited to" are used interchangeably.

"MCM-41" refers to a Mobil composite of matter that is an amorphous mesoporous silica with a hexagonal pore arrangement, where the mean pore diameter is in the range of about 2 to 10 nm.

"MCM-48" refers to a Mobil composite of matter that is an amorphous mesoporous silica with a cubic pore arrangement, where the mean pore diameter is in the range of about 2 to 10 nm.

"MCM-50" refers to a Mobil composite of matter that is an amorphous mesoporous silica with a lamellar pore arrangement, where the mean pore diameter is in the range of about 2 to 10 nm.

The term "mesoporous" is art-recognized and refers to a porous material comprising pores with an intermediate size, ranging anywhere from about 2 to about 60 nanometers (20 to 600 angstroms).

The term "mesostructure" is art-recognized and refers to a structure comprising mesopores which control the architecture of the material at the mesoscopic or nanometer scale, including ordered and non-ordered mesostructured materials, as well as nanostructured materials (i.e., materials in which at least one of their dimension is in the nanometer size range) such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. A mesostructured zeolite may be in the form of ordered mesoporosity (as in, for example MCM-41, MCM- 48 or SBA-15), non-ordered mesoporosity (as in mesocellular foams ("MCF")), or mesoscale morphology (as in nanorods and nanotubes). The notation zeolite[mesostructure] is used to designate the different types of mesostructured zeolites.

"MOR" refers to mordenite, which is a zeolite comprising approximately 2 moles of sodium and potassium and approximately 1 mole of calcium in its orthorhombic crystal structure. This term also includes the acidic form of MOR which may also be represented as "H-MOR."

"MSU-S (MFI)" represents a mesoporous material made with nanosized zeolites with a pore range of about 2-15 nm. The (MFI) refers to its structure.

"MSU-S (BEA)" represents a mesoporous material made with nanosized zeolites with a pore range of about 1-15 nm. The (BEA) refers to its structure.

"PNA" represents a semicrystallized form of MCM-41.

"SBA-15" represents mesoporous (alumino) silicas with pore diameters up to 30 nm arranged in a hexagonal manner and pore walls up to 6 nm thick.

The term "surfactant" is art-recognized and refers to any surface-active agent or substance that modifies the nature of surfaces, often reducing the surface tension of water. Cetyltrimethylammonium bromide is a non-limiting example of a surfactant.

"Y" represents a faujasite which is a zeolite comprising 2 moles of sodium and 1 mole of calcium in its octahedral crystal structure. This term also includes the acidic form of Y which may also be represented as "H—Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, E1APO, MeAPSO, and E1APSO), gallophosphates, zincophophates, titanosilicates, etc.

"ZSM-5" or "ZSM-5 (MFI)" represents a Mobil synthetic zeolite-5. This term also includes the acidic form of ZSM-5 which may also be represented as "H-ZSM-5." The (MFI) relates to its structure.

A comprehensive list of the abbreviations utilized by organic chemists of ordinary skill in the art appears in the first issue of each volume of the Journal of Organic Chemistry; this list is typically presented in a table entitled Standard List of Abbreviations.

Contemplated equivalents of the zeolitic structures, subunits and other compositions described above include such materials which otherwise correspond thereto, and which have the same general properties thereof (e.g., biocompatible), wherein one or more simple variations of substituents are made which do not adversely affect the efficacy of such molecule to achieve its intended purpose.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of preparing a shaped zeolitic material with enhanced mesoporosity, said method comprising:
   (a) forming a composite shaped article comprising at least one zeolite and at least one non-zeolitic material, wherein said zeolite comprises faujasite, mordenite, ZSM-5, CHA, or mixtures thereof; and
   (b) contacting said composite shaped article with at least one pH controlling agent and at least one surfactant under conditions sufficient to increase the pore volume of at least one 10 angstrom subset of mesoporosity in said composite shaped article, thereby forming said shaped zeolitic material with enhanced mesoporosity, wherein said pH controlling agent comprises an acid or a base,
   wherein increase of at least 0.05 cc/g in said zeolite of said composite shaped article.

2. The method of claim 1, wherein step (a) includes the substeps of:
   (i) combining said non-zeolitic material and/or a precursor of said non-zeolitic material and a zeolite precursor to thereby form an initial mixture;
   (ii) shaping said initial mixture into an initial composite shaped article comprising said non-zeolitic material and/or said precursor of said non-zeolitic material and said zeolitic precursor; and
   (iii) converting at least a portion of said zeolitic precursor in said initial composite shaped article into said zeolite to thereby form said composite shaped article.

3. The method of claim 1, wherein step (a) includes the substeps of:
   (i) combining said at least one non-zeolitic material and said at least one zeolite to thereby form an initial mixture; and
   (ii) shaping said initial mixture into said composite shaped article.

4. The method of claim 1, wherein said at least one non-zeolitic material is selected from the group consisting of inert stable oxides, inert stable carbides, inert stable nitrides, and mixtures thereof.

5. The method of claim 1, wherein said at least one non-zeolitic material is selected from the group consisting of α-aluminum oxide, titanium dioxide, zirconium oxide, mullite, hydrous kaolin clay, the residue of alkaline extraction of kaolin clay that has been calcined through the characteristic exotherm at about 1,780° F. without substantial formation of mullite, silicon carbide, silicon nitride, and mixtures thereof.

6. The method of claim 1, further comprising treating at least a portion of said shaped zeolitic material to extract at least a portion of aluminum therefrom.

7. The method of claim 6, wherein said extraction is performed by contacting at least a portion of said shaped zeolitic material with an acid and/or a chelating agent.

8. The method of claim 1, wherein said zeolitic composite shaped article is selected from the group consisting of a pellet, a tablet, a microsphere, a bead, a honeycomb shape, and mixtures thereof.

9. The method of claim 1, wherein said zeolite comprises faujasite.

10. The method of claim 1, further comprising (c) calcining said shaped zeolitic material with enhanced mesoporosity at a temperature in the range of from about 1,000 to about 1,400° F.

11. The method of claim 1, wherein said contacting of step (b) is performed in an aqueous medium.

12. The method of claim 1, wherein said surfactant comprises a cationic surfactant.

13. The method of claim 1, wherein said surfactant comprises cetyltrimethylammonium bromide.

14. The method of claim 1, wherein the pH of the reaction medium formed in step (b) is in the range of from about 8 to about 12.

15. The method of claim 1, wherein the reaction temperature of step (b) is in the range of from about 60 to about 100° C.

16. The method of claim 1, wherein said composite shaped article comprises said zeolite in an amount in the range of from about 0.1 to about 99 weight percent.

17. The method of claim 1, wherein said contacting of step (b) causes the formation of a plurality of intracrystalline mesopores in said zeolite.

18. The method of claim 1, wherein said contacting of step (b) causes a net increase in the overall mesoporosity of said composite shaped article.

19. The method of claim 1, wherein said contacting of step (b) causes a net increase of at least 10 percent in the overall mesoporosity of said composite shaped article.

20. The method of claim 1, wherein said increase in pore volume of said 10 angstrom subset constitutes an increase of at least 0.01 cc/g in said 10 angstrom subset.

21. The method of claim 1, wherein said increase in pore volume of said 10 angstrom subset constitutes an increase of at least 10 percent of the pore volume of said 10 angstrom subset.

22. The method of claim 1, wherein said 10 angstrom subset is contained within a broader range of 20 to 250 angstroms.

23. The method of claim 1, wherein said contacting of step (b) is performed under conditions sufficient to increase the pore volume of at least one 25 angstrom subset of mesoporosity in said composite shaped article.

24. The method of claim 1, wherein said shaped zeolitic material with enhanced mesoporosity has a total volume of mesopores in the range of from about 0.05 to about 0.9 cc/g.

25. The method of claim 1, wherein said pH controlling agent comprises a base.

26. The method of claim 1, wherein said pH controlling agent comprises ammonium hydroxide.

27. A shaped zeolitic material with enhanced mesoporosity prepared by the method of claim 1.

* * * * *